United States Patent
van Os

(10) Patent No.: US 8,793,611 B2
(45) Date of Patent: Jul. 29, 2014

(54) DEVICE, METHOD, AND GRAPHICAL USER INTERFACE FOR MANIPULATING SELECTABLE USER INTERFACE OBJECTS

(75) Inventor: Marcel van Os, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 566 days.

(21) Appl. No.: 12/788,280

(22) Filed: May 26, 2010

(65) Prior Publication Data
US 2011/0167382 A1 Jul. 7, 2011

Related U.S. Application Data

(60) Provisional application No. 61/292,687, filed on Jan. 6, 2010.

(51) Int. Cl.
*G06F 3/048* (2013.01)
*G06Q 10/10* (2012.01)

(52) U.S. Cl.
CPC ........... *G06Q 10/109* (2013.01); *Y10S 715/963* (2013.01)
USPC .......................................... 715/800; 715/963

(58) Field of Classification Search
USPC ........... 715/963, 810, 800; 345/156, 173, 179
See application file for complete search history.

(56) References Cited

U.S. PATENT DOCUMENTS

| | | | |
|---|---|---|---|
| 5,513,309 A | 4/1996 | Meier et al. | 395/155 |
| 5,565,894 A | 10/1996 | Bates et al. | |
| 5,627,567 A | 5/1997 | Davidson | |
| 5,649,133 A | 7/1997 | Arquié | 395/348 |
| 5,757,358 A | 5/1998 | Osga | |
| 5,936,625 A * | 8/1999 | Kahl et al. | 715/775 |
| 5,946,647 A | 8/1999 | Miller et al. | |
| 6,249,290 B1 | 6/2001 | Herndon et al. | |
| 6,717,600 B2 | 4/2004 | Dutta et al. | |
| 7,075,512 B1 | 7/2006 | Fabre et al. | |
| 7,103,852 B2 | 9/2006 | Kairis, Jr. | |
| 7,164,410 B2 | 1/2007 | Kupka | |
| 7,197,718 B1 | 3/2007 | Westerman et al. | |
| 7,213,214 B2 | 5/2007 | Baar et al | |
| 7,489,306 B2 | 2/2009 | Kolmykov-Zotov et al. | |
| 7,614,008 B2 | 11/2009 | Ording | 715/773 |
| 7,694,290 B2 | 4/2010 | Liu et al. | |

(Continued)

OTHER PUBLICATIONS

International Search Report and Written Opinion dated Nov. 29, 2010, received in International Application No. PCT/US2010/047433, which corresponds to U.S. Appl. No. 12/567,697.

(Continued)

*Primary Examiner* — Rashawn Tillery
(74) *Attorney, Agent, or Firm* — Morrison & Foerster LLP

(57) ABSTRACT

A multifunction device displays a plurality of selectable user interface objects. Each respective selectable user interface object has a respective activation region. The device detects a first input; and, in response to detecting the first input, the device selects the first selectable user interface object and the device additionally: deactivates the activation region of the first selectable user interface object, or reduces the activation region of the first selectable user interface object to a smaller area than the default activation region. The device also enlarges an activation region of a selectable user interface object that is adjacent to the first selectable user interface object such that the enlarged activation region of the adjacent selectable user interface object occupies at least a portion of an area previously occupied by the default activation region of the first selectable user interface object.

33 Claims, 44 Drawing Sheets

(56) References Cited

U.S. PATENT DOCUMENTS

| | | |
|---|---|---|
| 7,747,958 B2 | 6/2010 | Luo et al. |
| 7,814,055 B2 * | 10/2010 | Hullot et al. ............ 707/628 |
| 8,051,380 B2 * | 11/2011 | Knapp et al. ............ 715/751 |
| 8,166,409 B2 | 4/2012 | Koike et al. |
| 2005/0039142 A1 * | 2/2005 | Jalon et al. ............ 715/823 |
| 2005/0132291 A1 * | 6/2005 | Wagner et al. ............ 715/716 |
| 2006/0132460 A1 | 6/2006 | Kolmykov-Zotov et al. |
| 2006/0195790 A1 | 8/2006 | Beaupre et al. |
| 2007/0097151 A1 | 5/2007 | Rosenberg |
| 2007/0152980 A1 | 7/2007 | Kocienda et al. |
| 2008/0022225 A1 | 1/2008 | Erl |
| 2008/0077871 A1 | 3/2008 | Baar et al. |
| 2008/0165148 A1 | 7/2008 | Williamson et al. |
| 2008/0177782 A1 | 7/2008 | Poston et al. |
| 2008/0252661 A1 | 10/2008 | Hilton |
| 2008/0273813 A1 | 11/2008 | Takashima |
| 2009/0007122 A1 | 1/2009 | Peyton et al. |
| 2009/0073132 A1 | 3/2009 | Lee et al. |
| 2009/0083665 A1 | 3/2009 | Anttila et al. |
| 2009/0164936 A1 | 6/2009 | Kawaguchi |
| 2009/0217206 A1 | 8/2009 | Liu et al. |
| 2009/0265656 A1 | 10/2009 | Jetha et al. |
| 2009/0319935 A1 | 12/2009 | Figura |
| 2010/0058226 A1 | 3/2010 | Flake et al. |
| 2010/0262907 A1 | 10/2010 | Shoemaker et al. |
| 2010/0325529 A1 | 12/2010 | Sun |
| 2011/0074697 A1 | 3/2011 | Rapp et al. |
| 2011/0078597 A1 | 3/2011 | Rapp et al. |
| 2012/0206497 A1 * | 8/2012 | Sarjanoja ............ 345/672 |

OTHER PUBLICATIONS

Office Action dated Nov. 18, 2011, received in U.S. Appl. No. 12/567,697, 23 pages. (Rapp).

Office Action dated Jul. 11, 2012, received in U.S. Appl. No. 12/567,697, 33 pages. (Rapp).

Notice of Allowance dated Aug. 22, 2012, received in U.S. Appl. No. 12/567,699, 10 pages (Rapp).

Notice of Allowance dated Sep. 12, 2012, received in U.S. Appl. No. 12/567,700, 10 pages (Rapp).

* cited by examiner

Figure 5B

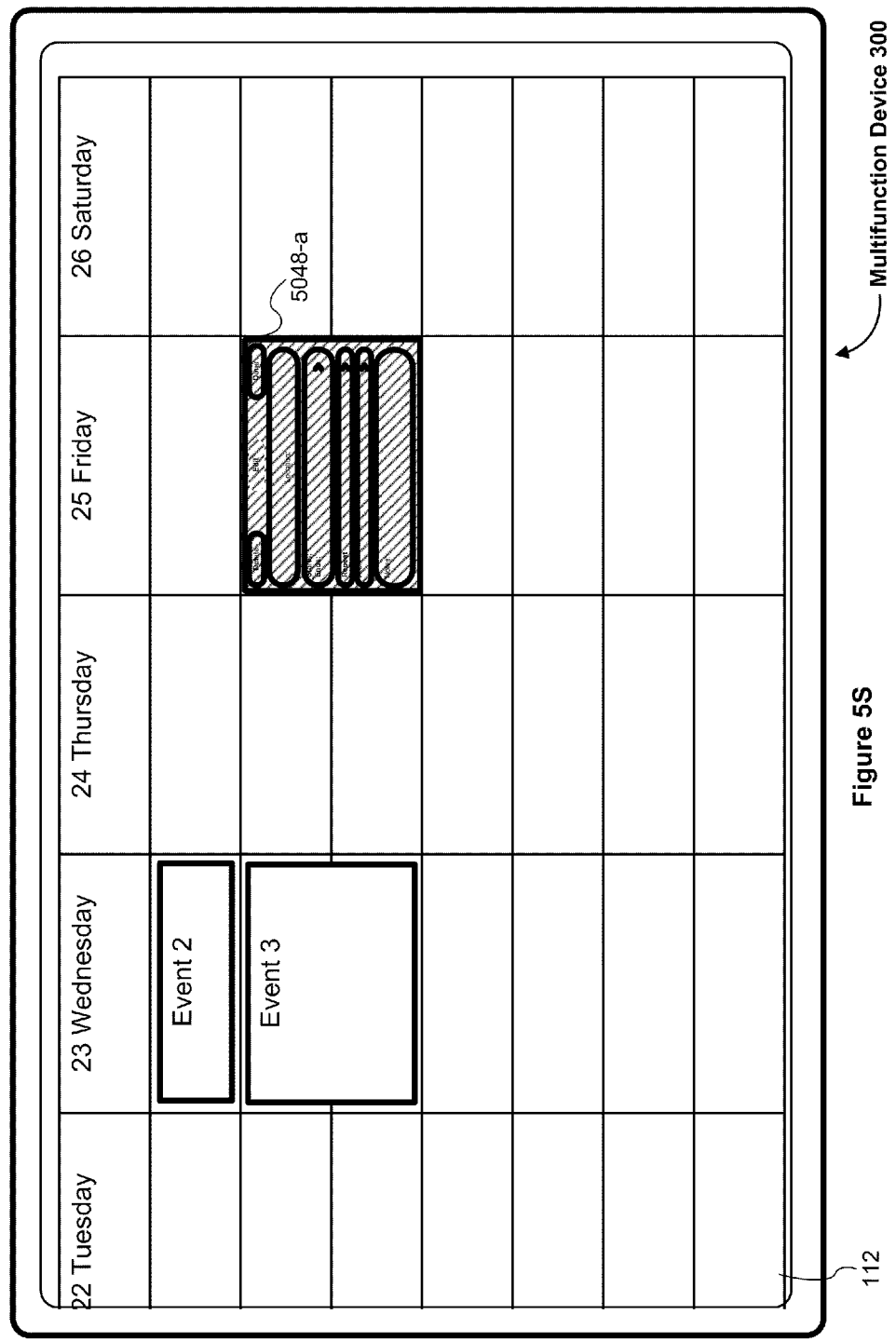

DEVICE, METHOD, AND GRAPHICAL USER INTERFACE FOR MANIPULATING SELECTABLE USER INTERFACE OBJECTS

RELATED APPLICATIONS

This application claims priority to U.S. Provisional Application No. 61/292,687, filed Jan. 6, 2010, entitled "Device, Method, and Graphical User Interface for Manipulating Selectable User Interface Objects," which is incorporated by reference herein in its entirety.

This is related to Ser. No. 11/969,786 "System and Method for Viewing and Managing Calendar Entries" filed Jan. 4, 2008; Ser. No. 12/242,856 "Portable Multifunction Device, Method, and Graphical User Interface for Viewing and Managing Electronic Calendars" filed Sep. 30, 2008; and Ser. No. 12/567,697 "Device, Method, and Graphical User Interface for Manipulation of User Interface Objects with Activation Regions" filed Sep. 25, 2009, which are hereby incorporated by reference in their entireties.

TECHNICAL FIELD

This relates generally to electronic devices with touch-sensitive surfaces, including but not limited to electronic devices with touch-sensitive surfaces that are used to interact with selectable user interface objects.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include adjusting the position and/or size of one or more user interface objects, as well as associating metadata with one or more user interface objects. Exemplary user interface objects include digital images, representations of calendar events, video, text, icons, and other graphics. A user may need to perform such manipulations on user interface objects in a calendar application (e.g., iCal from Apple Inc. of Cupertino, Calif.), a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), a disk authoring application (e.g., iDVD from Apple Inc. of Cupertino, Calif.), or a spreadsheet application (e.g., Numbers from Apple Inc. of Cupertino, Calif.).

But existing methods for performing these manipulations are cumbersome and inefficient. For example, using a sequence of mouse-based inputs to select one or more user interface objects and perform one or more actions on the selected user interface objects is tedious and creates a significant cognitive burden on a user. In addition, existing methods take longer than necessary, thereby wasting energy. This latter consideration is particularly important in battery-operated devices.

SUMMARY

Accordingly, there is a need for computing devices with faster, more efficient methods and interfaces for manipulating selectable user interface objects. Such methods and interfaces may complement or replace conventional methods for manipulating selectable user interface objects. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at a multifunction device with a display and a touch-sensitive surface. The method includes: displaying a plurality of selectable user interface objects. Each respective selectable user interface object has a respective activation region. The method further includes detecting a first input with the touch-sensitive surface at a location that corresponds to a default activation region for a first selectable user interface object. The method also includes, in response to detecting the first input: selecting the first selectable user interface object; performing an operation selected from the group consisting of: deactivating the activation region of the first selectable user interface object, and reducing the activation region of the first selectable user interface object to a smaller area than the default activation region; and enlarging an activation region of a selectable user interface object that is adjacent to the first selectable user interface object such that the enlarged activation region of the adjacent selectable user interface object occupies at least a portion of an area that was previously occupied by the default activation region of the first selectable user interface object.

In accordance with some embodiments, a method is performed at a multifunction device with a display and a touch-sensitive surface. The method includes: displaying a user interface object having a position on the display and a plurality of user-modifiable properties; detecting a first input; and in response to detecting the first input, displaying an editing area. The editing area includes a plurality of editable fields for modifying the user-modifiable properties of the user interface object. The method further includes detecting a second input that includes: detecting a contact at a location on the touch-sensitive surface that corresponds to a location on the display of an activation region for an object manipulation handle of the user interface object, and detecting movement of the contact along the touch-sensitive surface; and in response to detecting the second input: ceasing to display the editing area; and modifying the user interface object in accordance with the movement of the contact. The method also includes detecting an end of the second input; and in response to detecting the end of the second input, redisplaying the editing area.

In accordance with some embodiments, a multifunction device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on a multifunction device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by a multifunction device with a display and a touch-sensitive surface, cause the device to perform the operations of any of the methods described above. In accordance with some embodiments, a multifunction device includes: a display; a touch-sensitive surface; and means for performing the operations of any of the methods described above. In accordance with some embodiments, an information processing apparatus, for use in a multifunction device with a display and a touch-sensitive surface, includes means for performing the operations of any of the methods described above.

Thus, multifunction devices with displays and touch-sensitive surfaces are provided with faster, more efficient methods and interfaces for manipulating selectable user interface objects, thereby increasing the effectiveness, efficiency, and user satisfaction with such devices. Such methods and interfaces may complement or replace conventional methods for manipulating selectable user interface objects.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
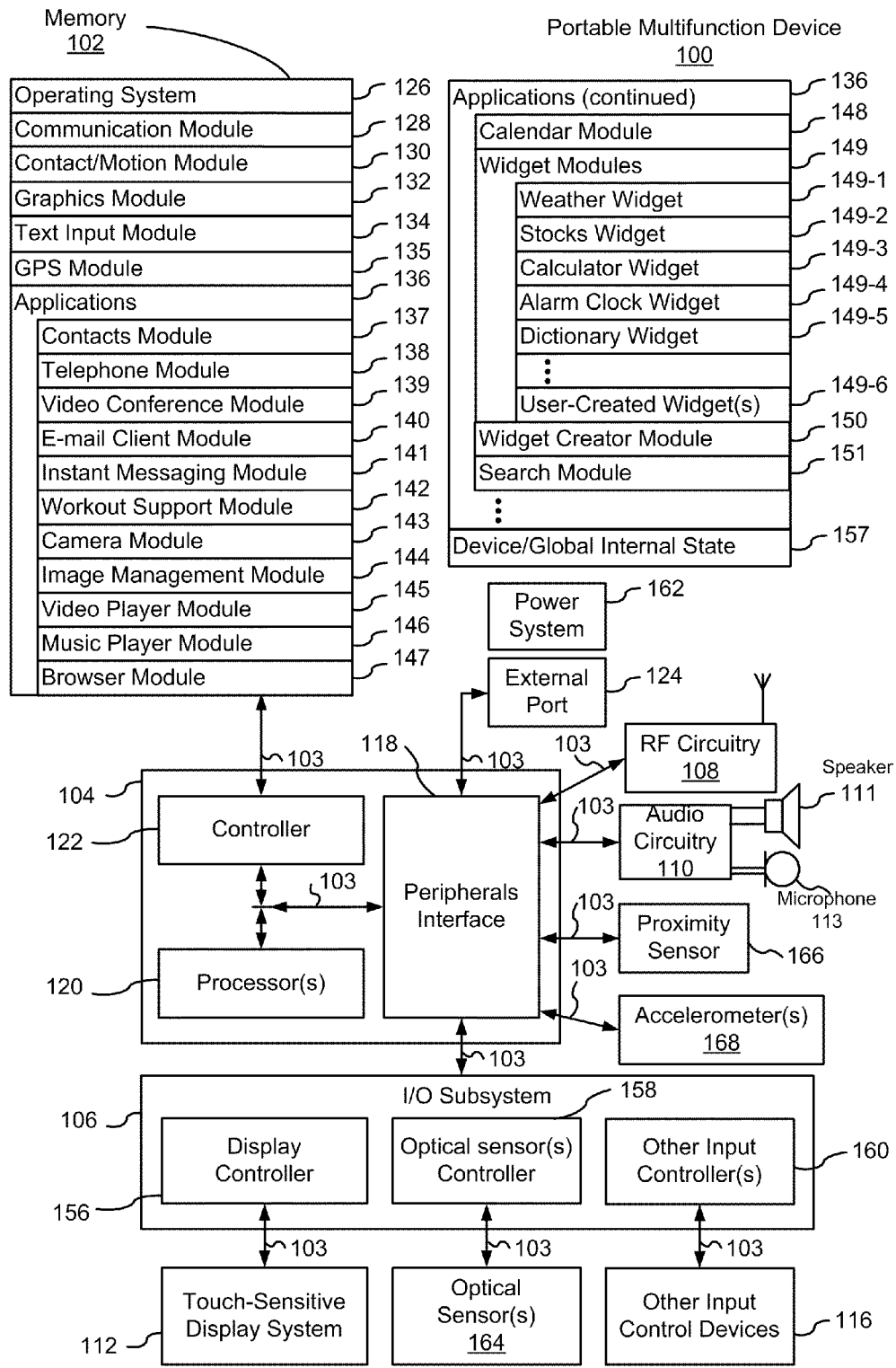
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a calendar application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
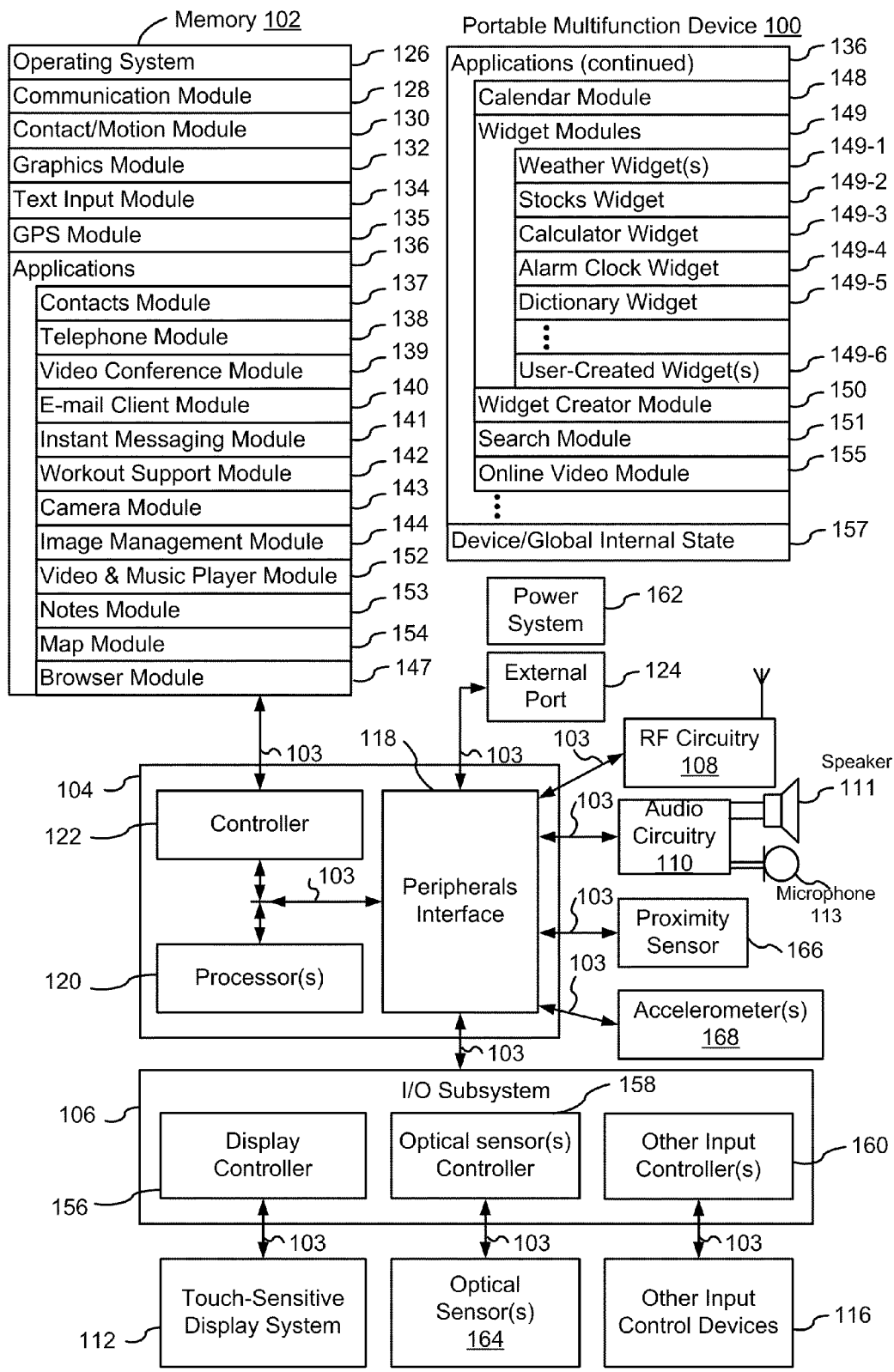

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
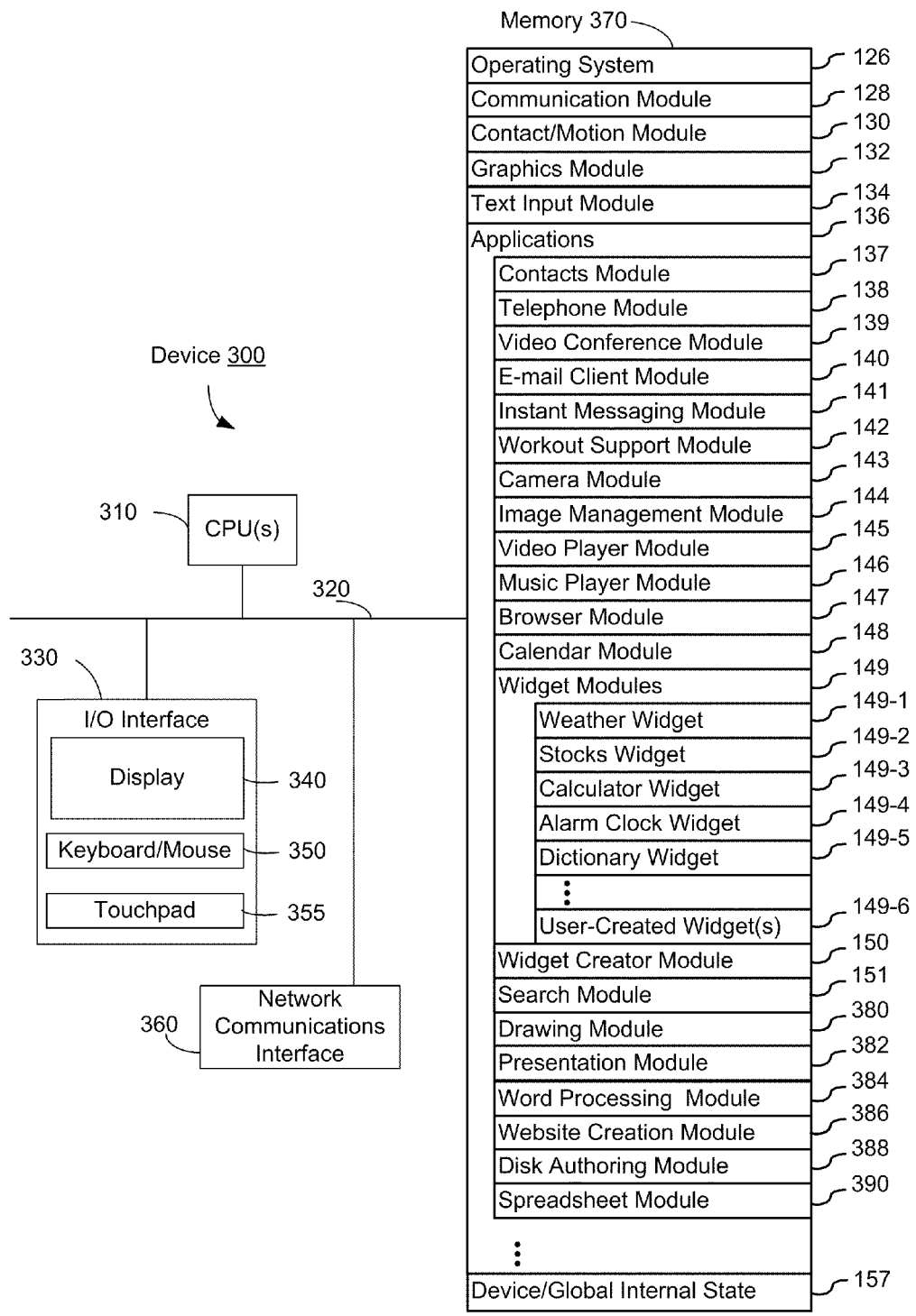
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:

- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module 145;
- music player module 146;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module 145 and music player module 146;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
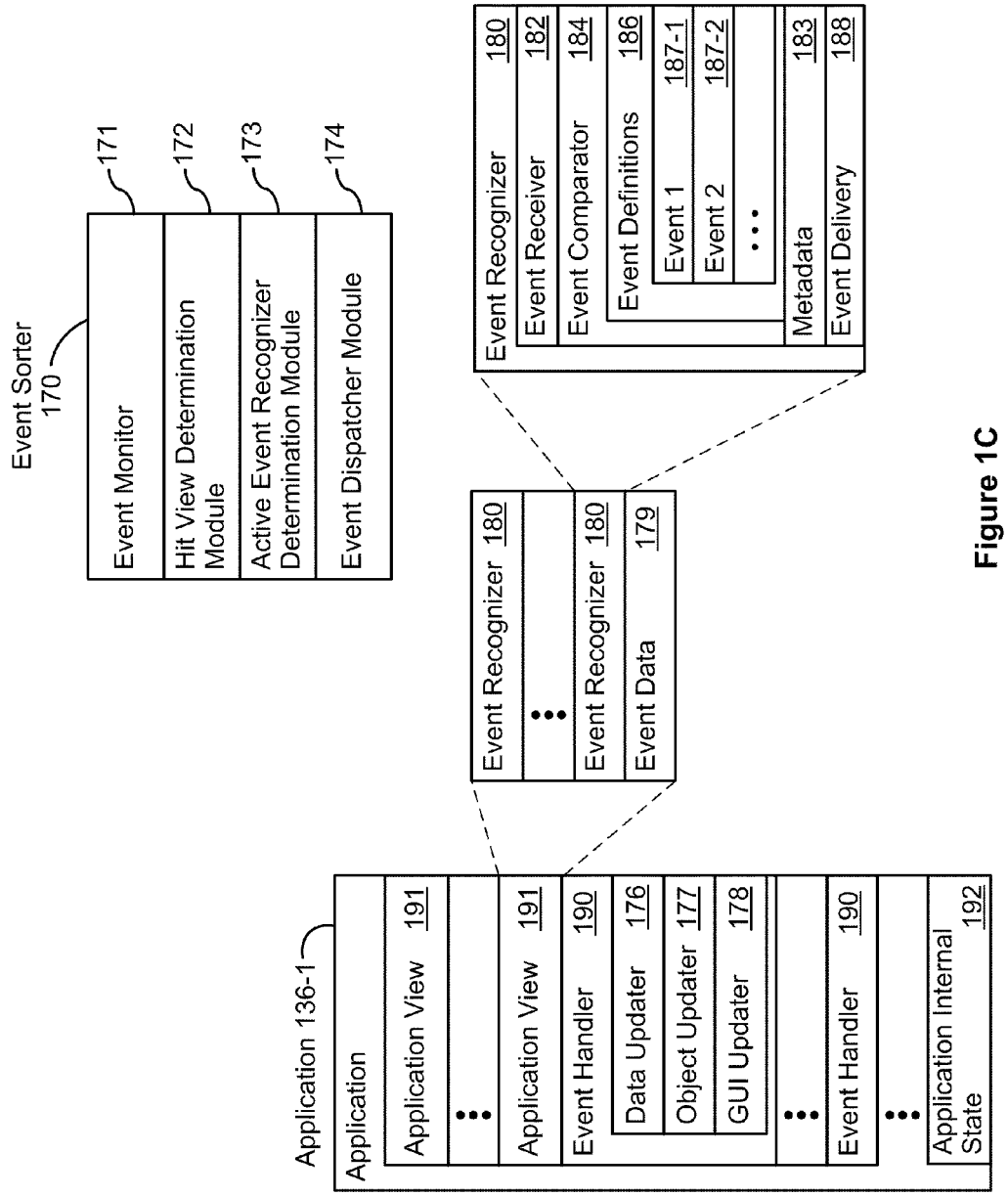
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
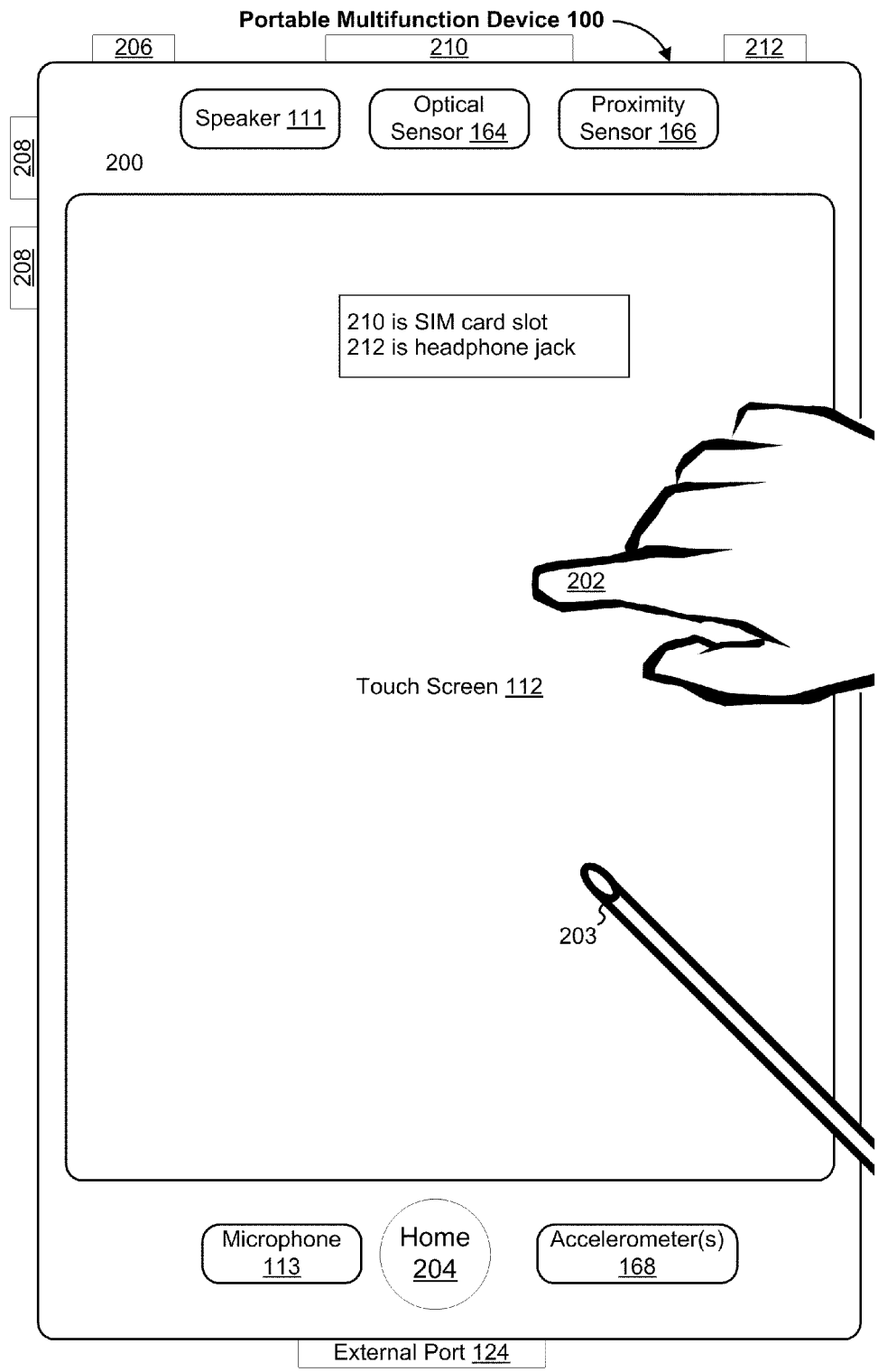
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
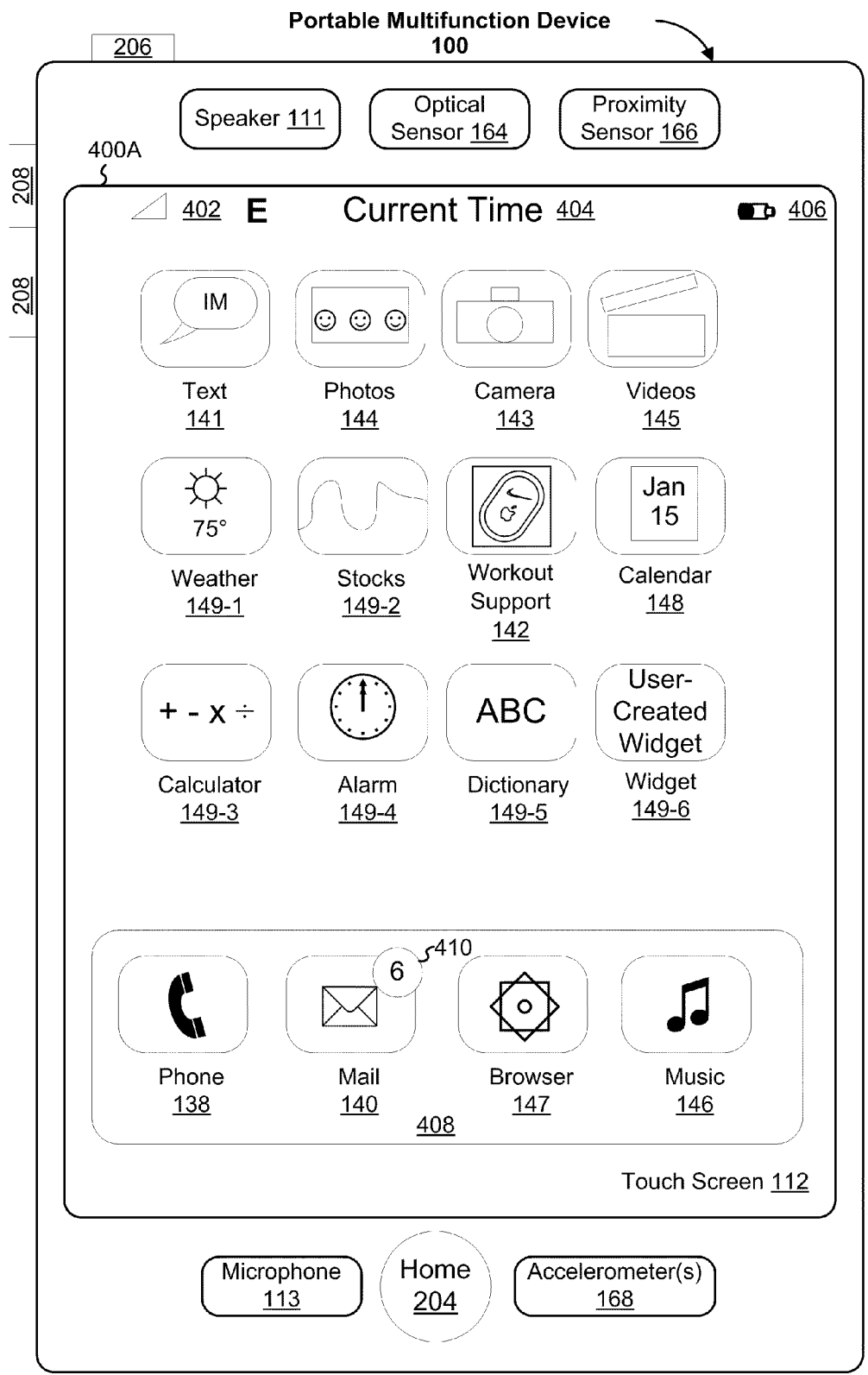
FIGS. 4A and 4B illustrate exemplary user interfaces for a menu of applications on a portable multifunction device in accordance with some embodiments.
Figure 4B:
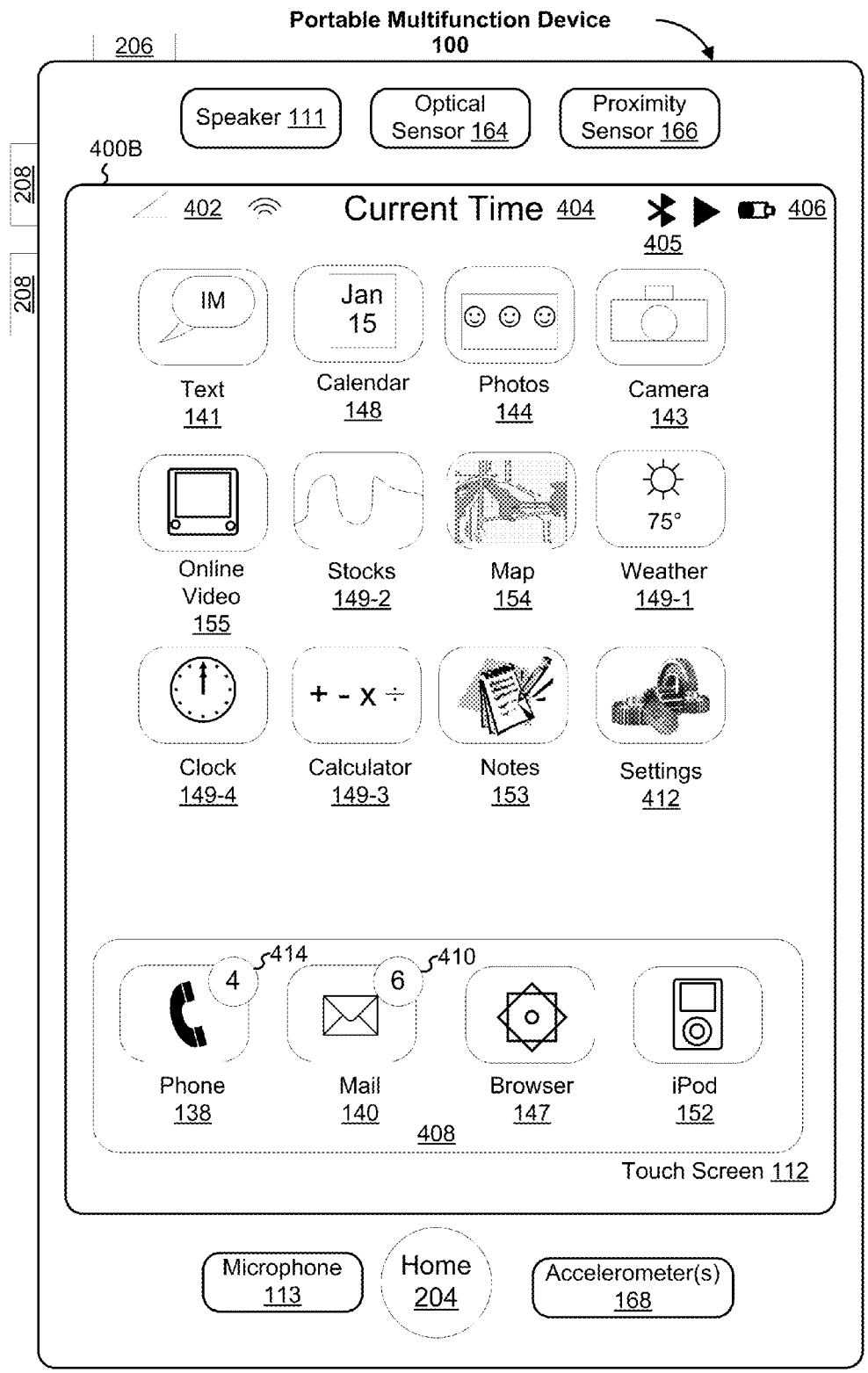

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Music player 146; and
Icons for other applications, such as:
  IM 141;
  Image management 144;
  Camera 143;
  Video player 145;
  Weather 149-1;
  Stocks 149-2;
  Workout support 142;
  Calendar 148;
  Calculator 149-3;
  Alarm clock 149-4;
  Dictionary 149-5; and
  User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;
Map 154;
Notes 153;
Settings 412, which provides access to settings for device 100 and its various applications 136, as described further below;
Video and music player module 152, also referred to as iPod (trademark of Apple Inc.) module 152; and
Online video module 155, also referred to as YouTube (trademark of Google Inc.) module 155.

Figure 4C:
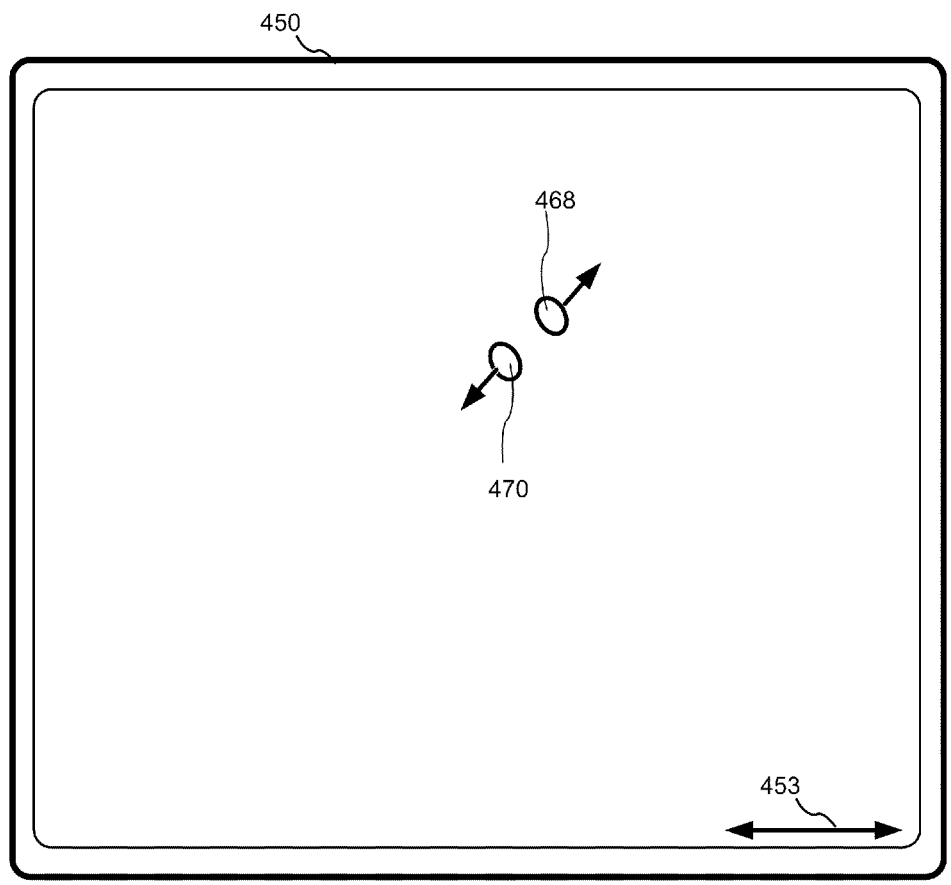
FIG. 4C illustrates an exemplary user interface for a multifunction device with a touch-sensitive surface that is separate from the display in accordance with some embodiments.
Figure 4C:
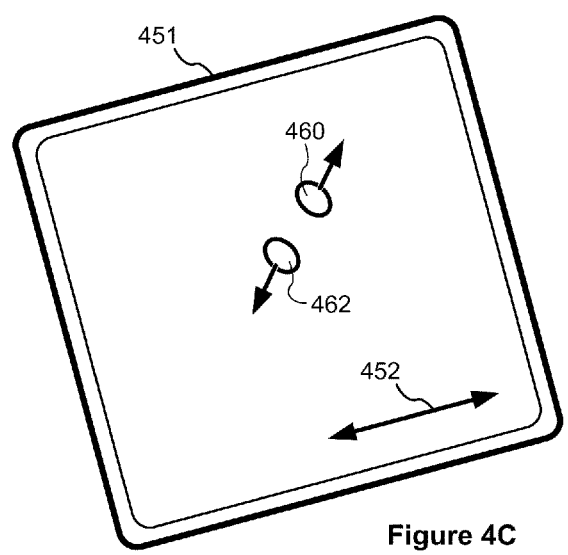

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

FIGS. 5A-5DD illustrate exemplary user interfaces for manipulating selectable user interface objects (e.g., calendar events) in accordance with some embodiments. The user interfaces in these figures are used to illustrate the processes described below, including the processes in FIGS. 6A-6C and 7A-7C. While calendar events are used as exemplary objects, it should be understood that the processes disclosed herein are applicable to virtually any user interface objects that can be manipulated (e.g., selected and/or edited) by a user.

Figure 5A:
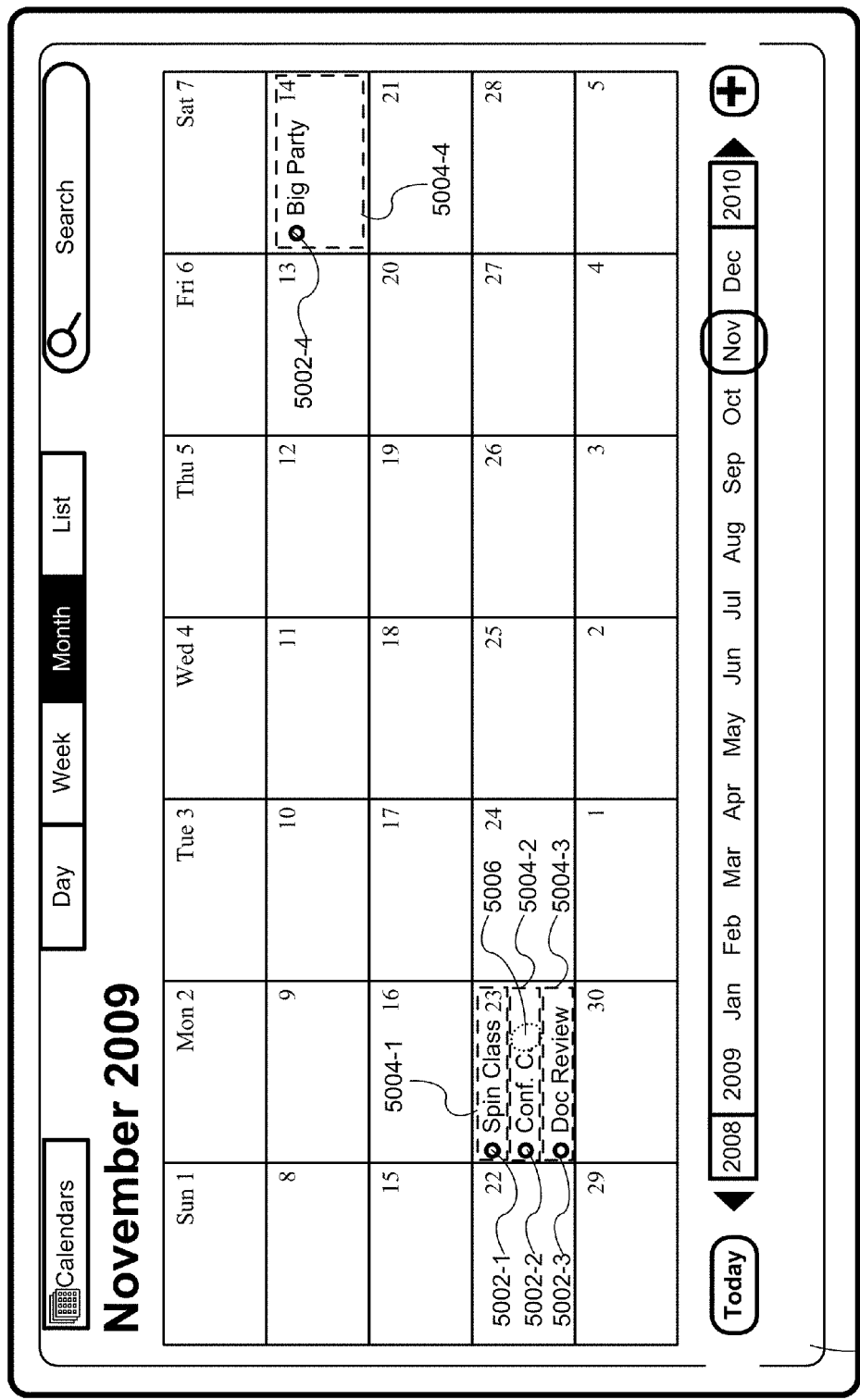
FIGS. 5A-5DD illustrate exemplary user interfaces for modifying activation regions for adjacent selectable user interface objects and/or modifying user-modifiable properties of a user interface object in accordance with some embodiments.
Figure 5C:
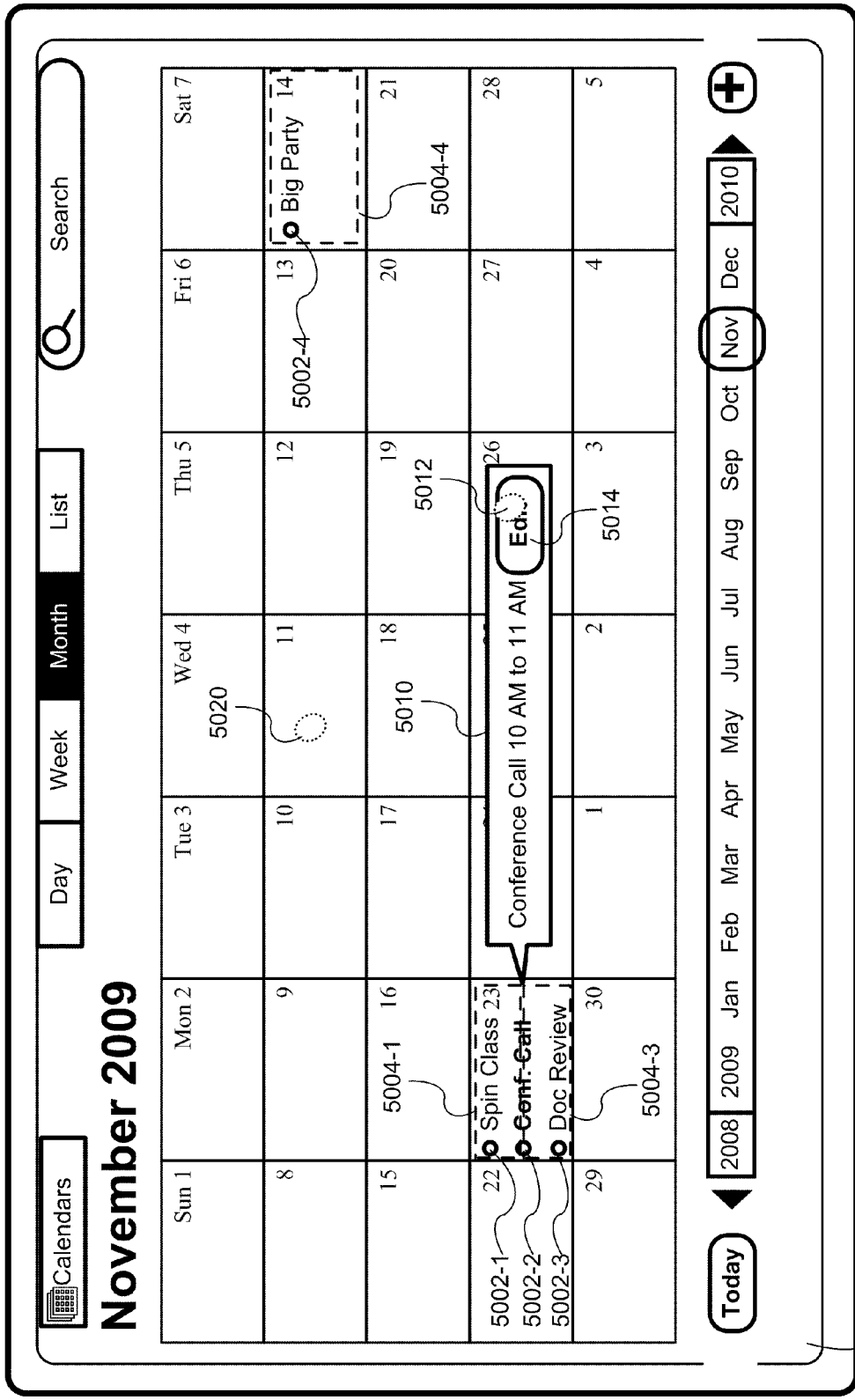
Figure 5D:
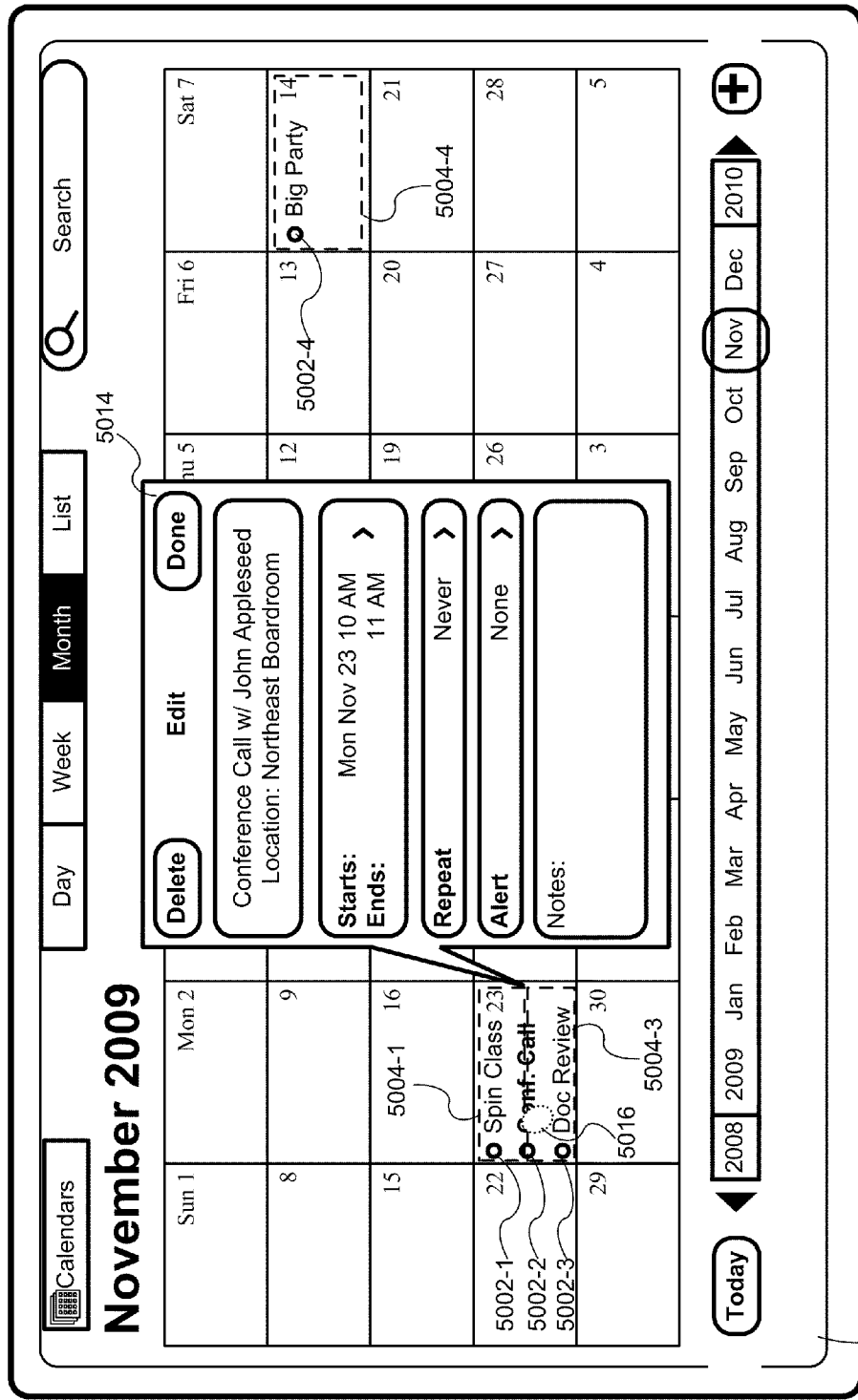
Figure 5E:
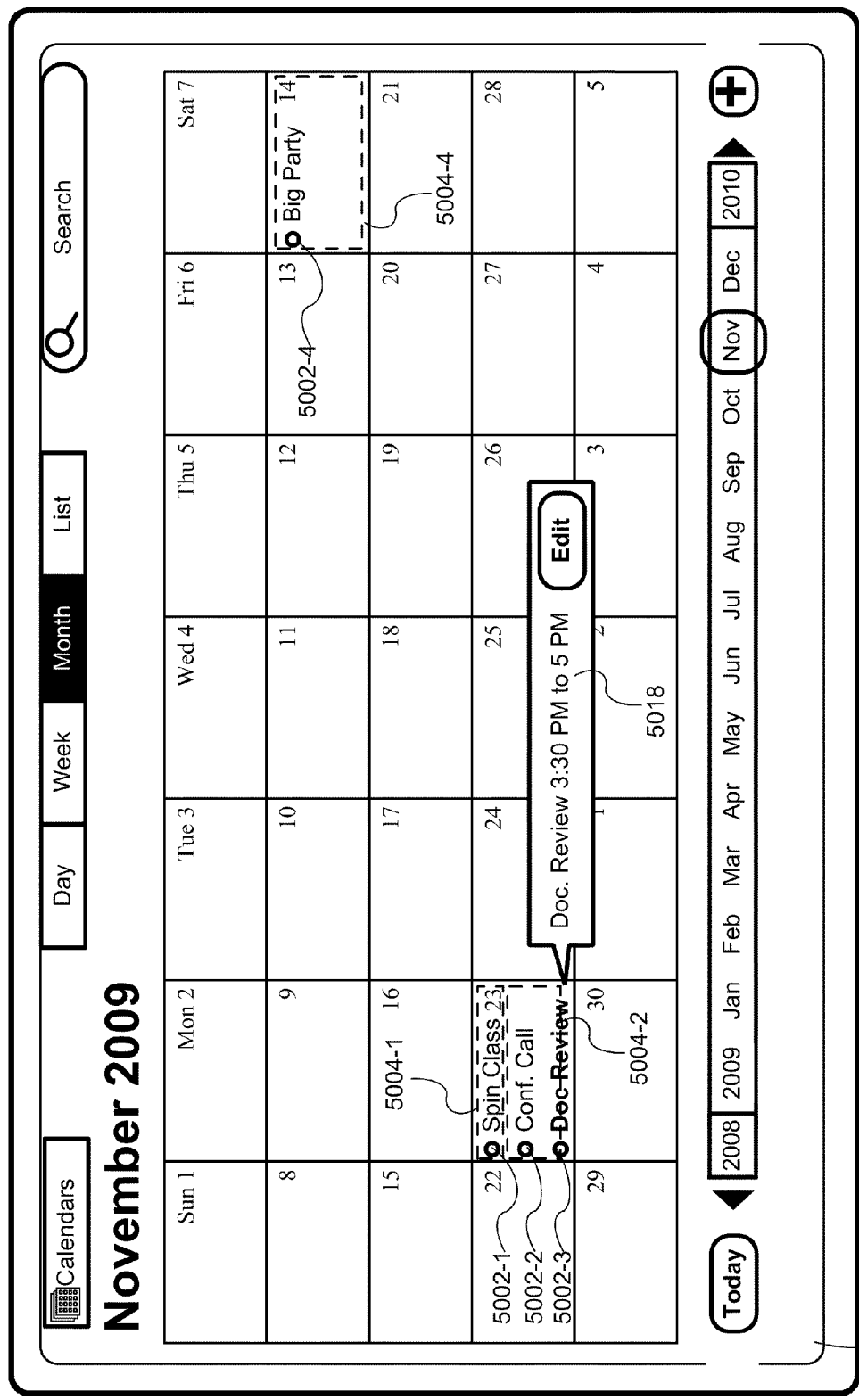
Figure 5F:
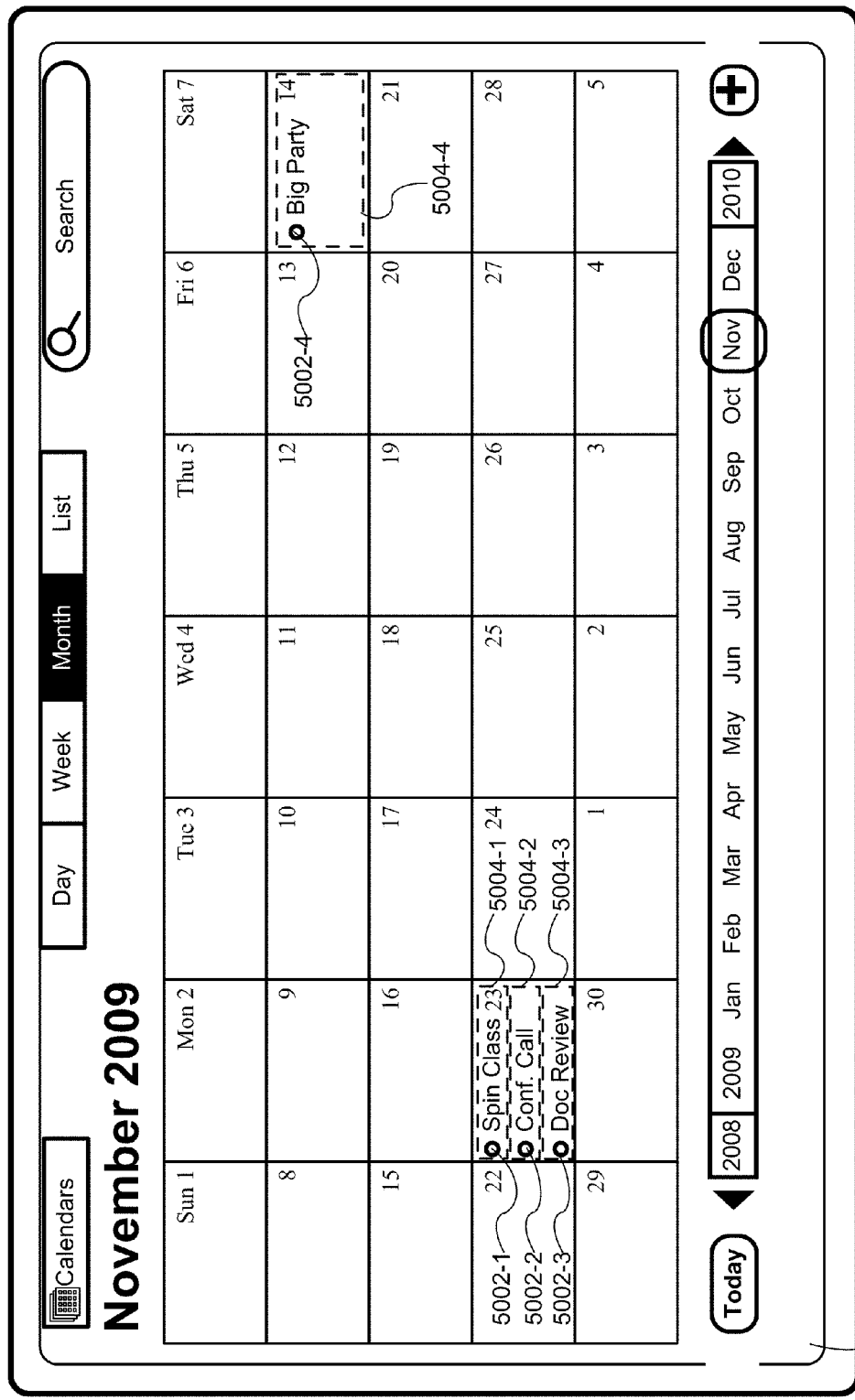
Figure 5G:
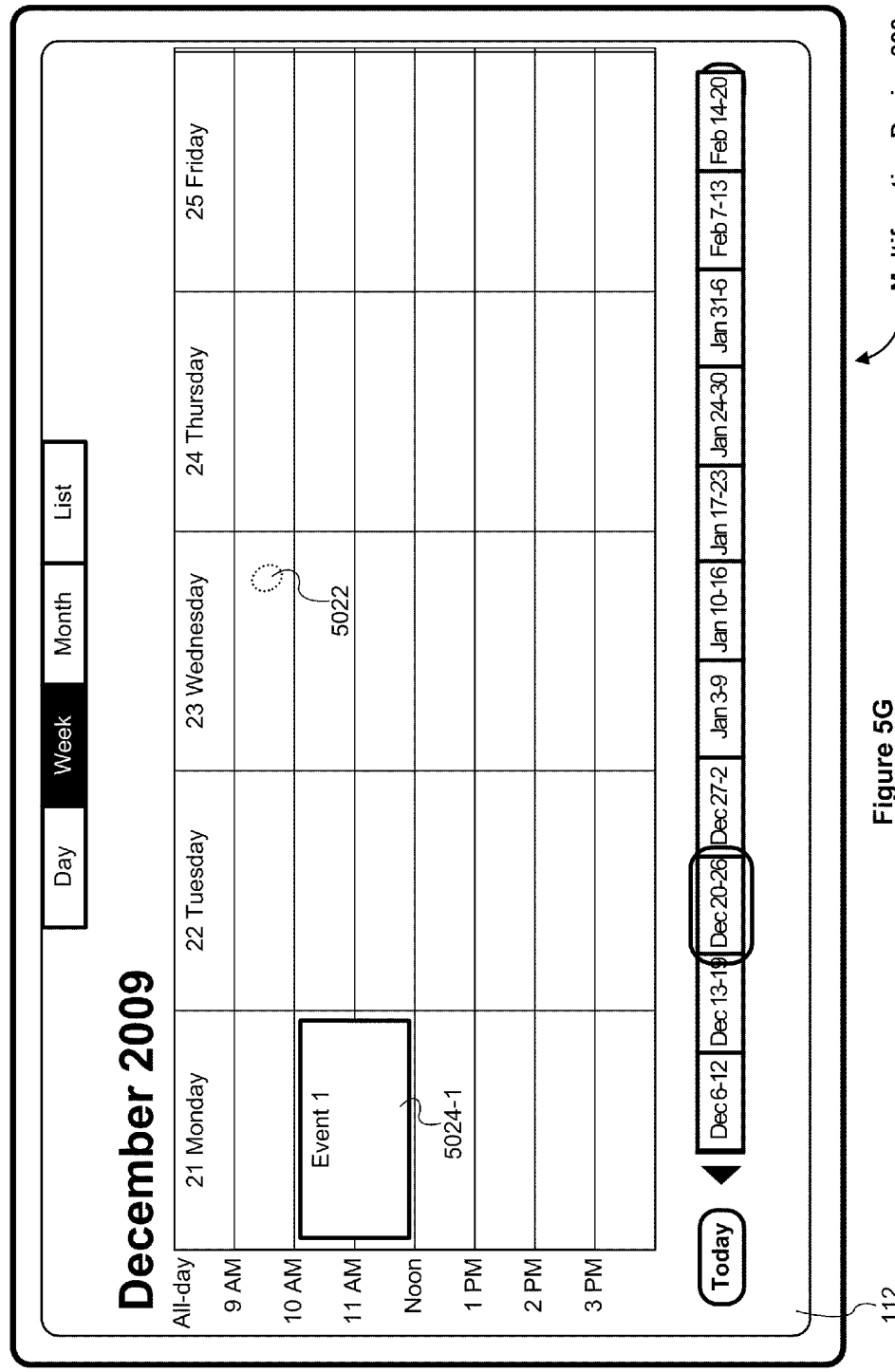
Figure 5H:
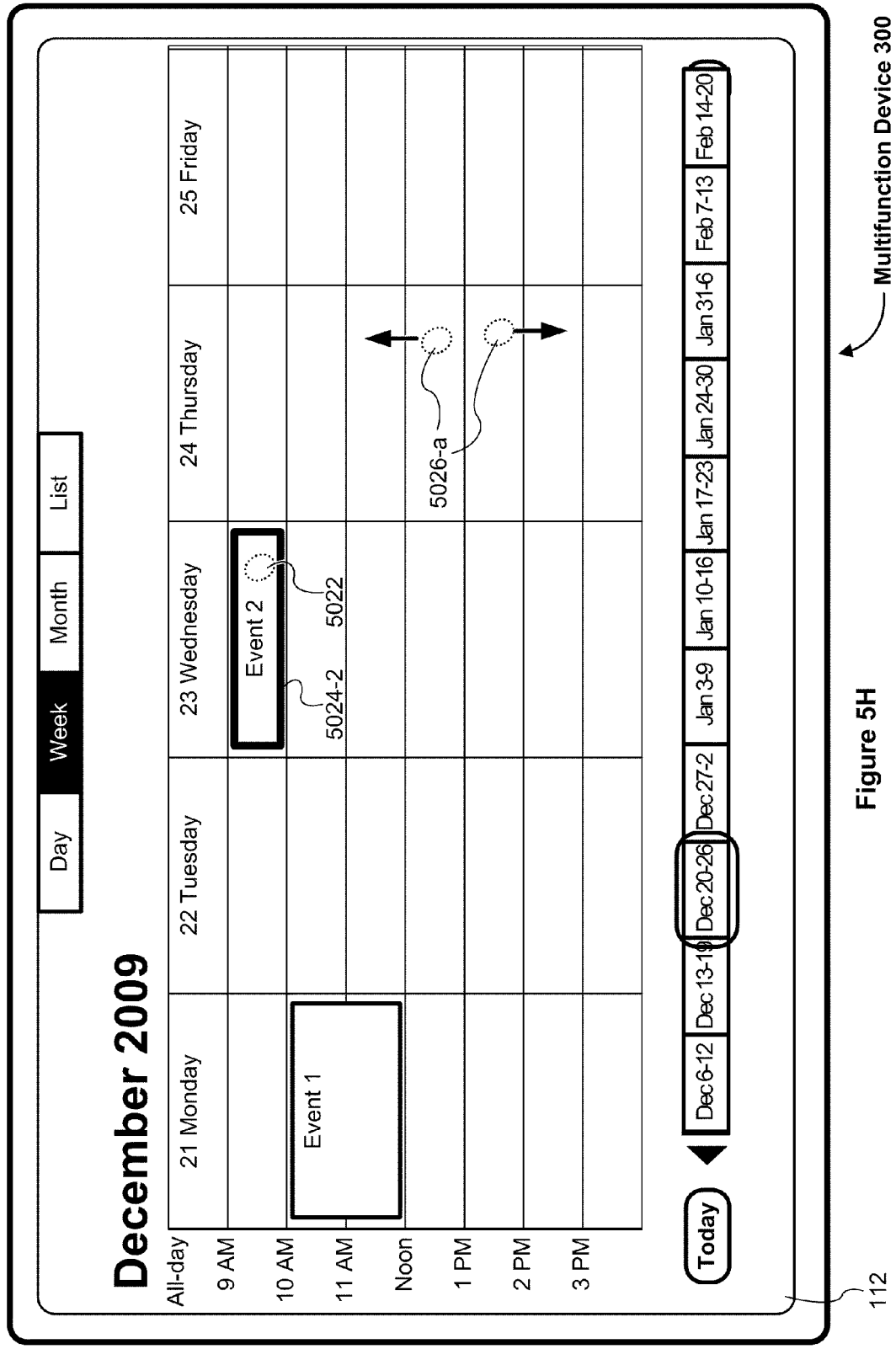
Figure 5I:
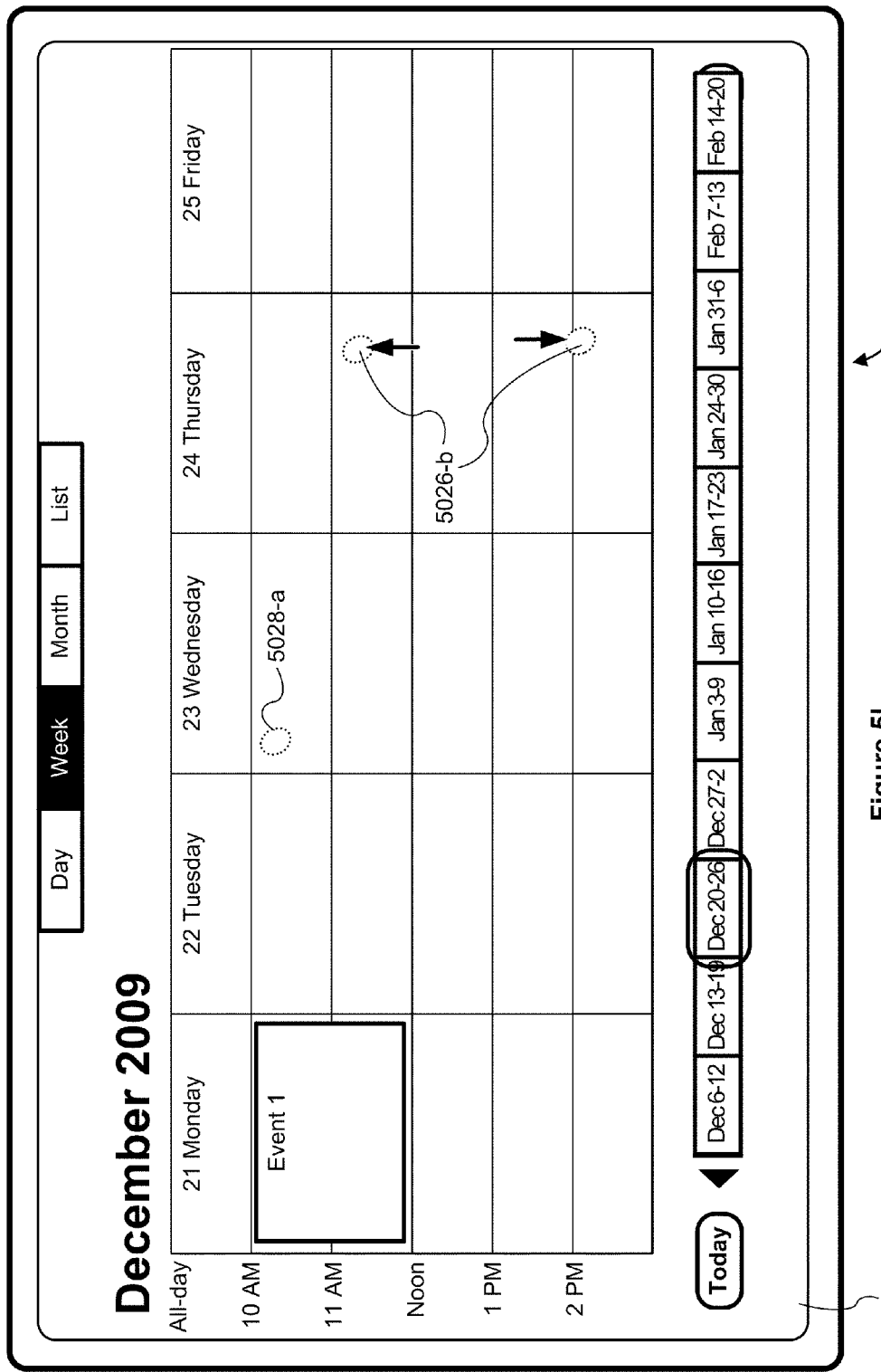
Figure 5J:
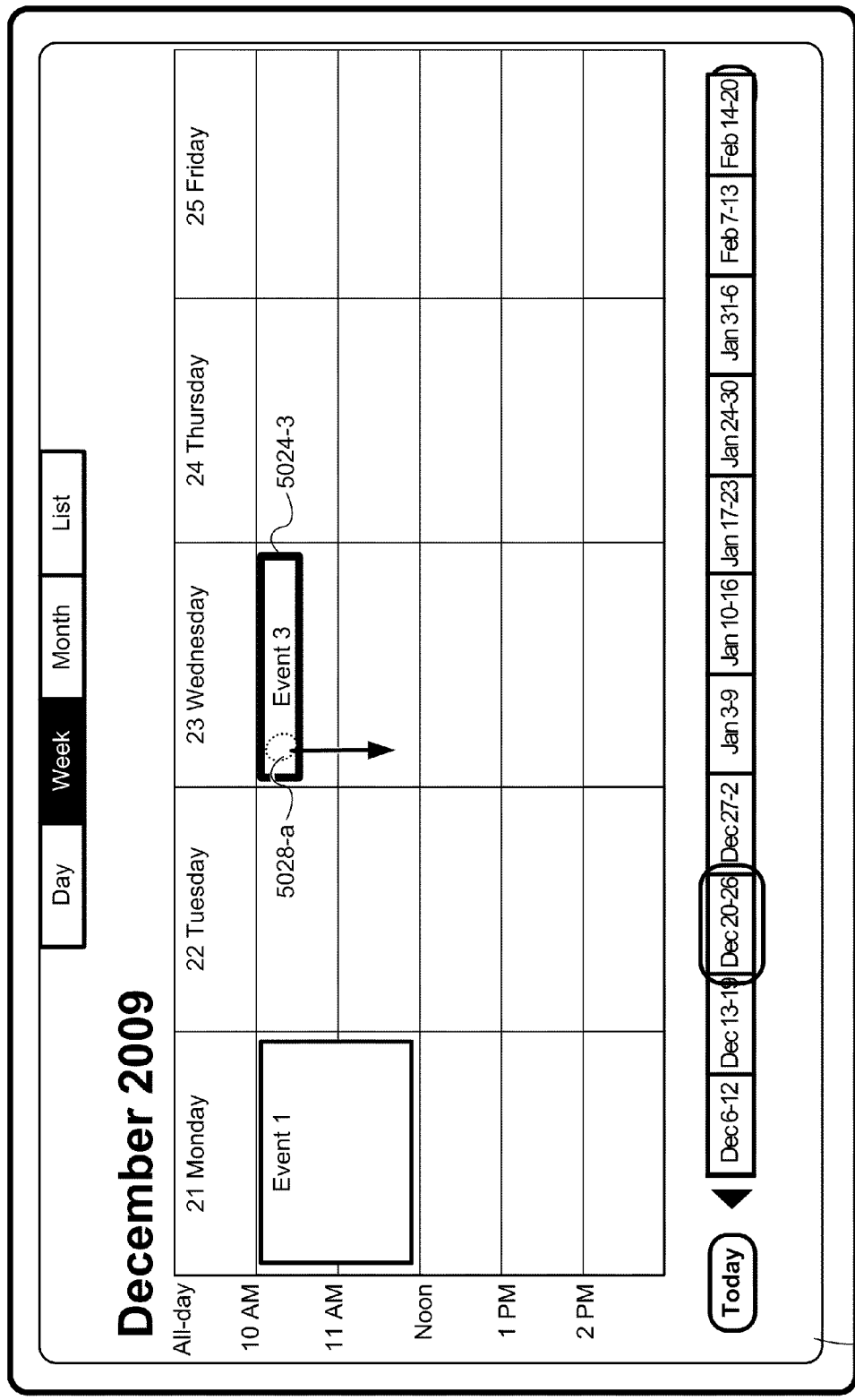
Figure 5K:
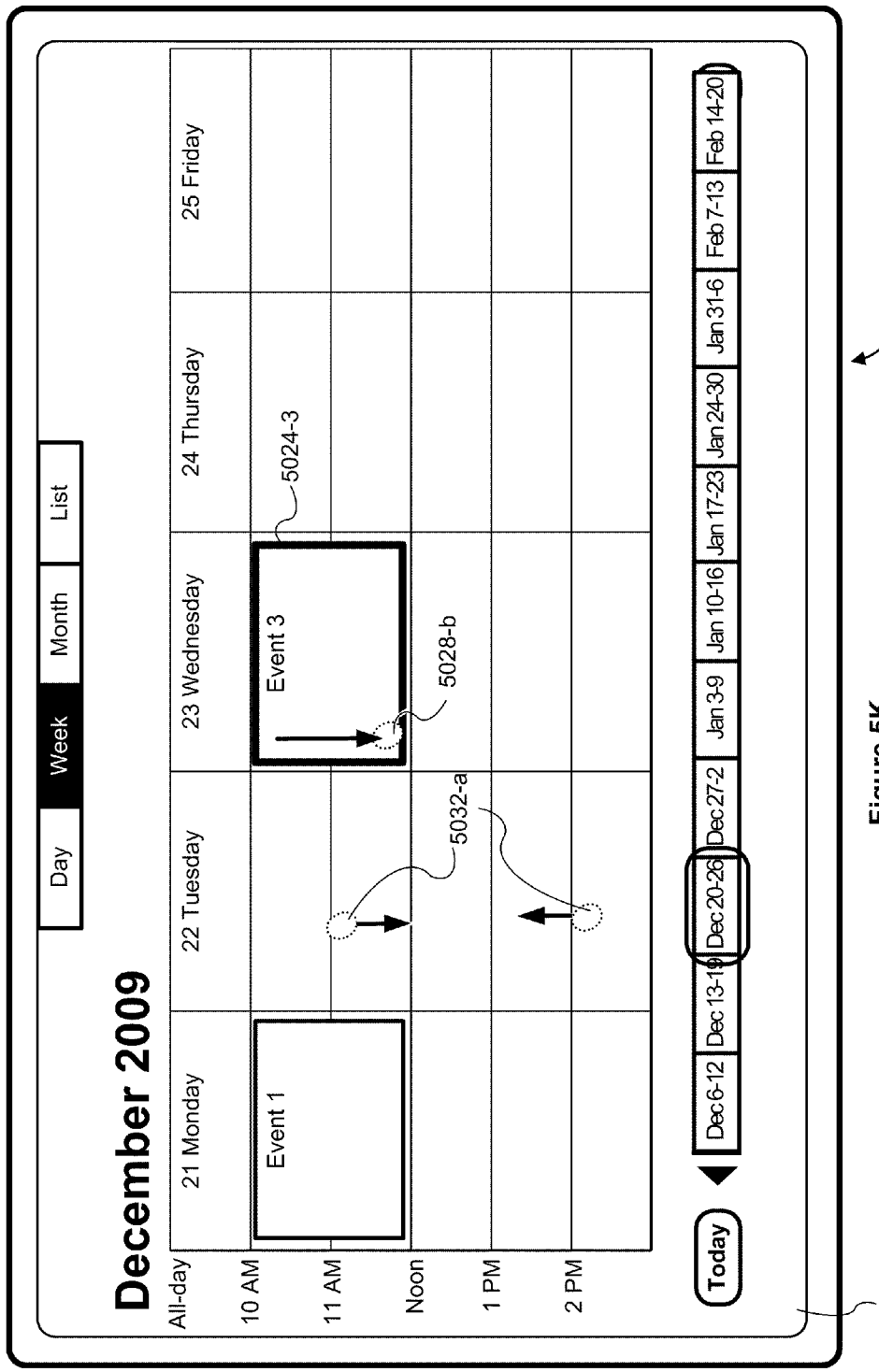
Figure 5L:
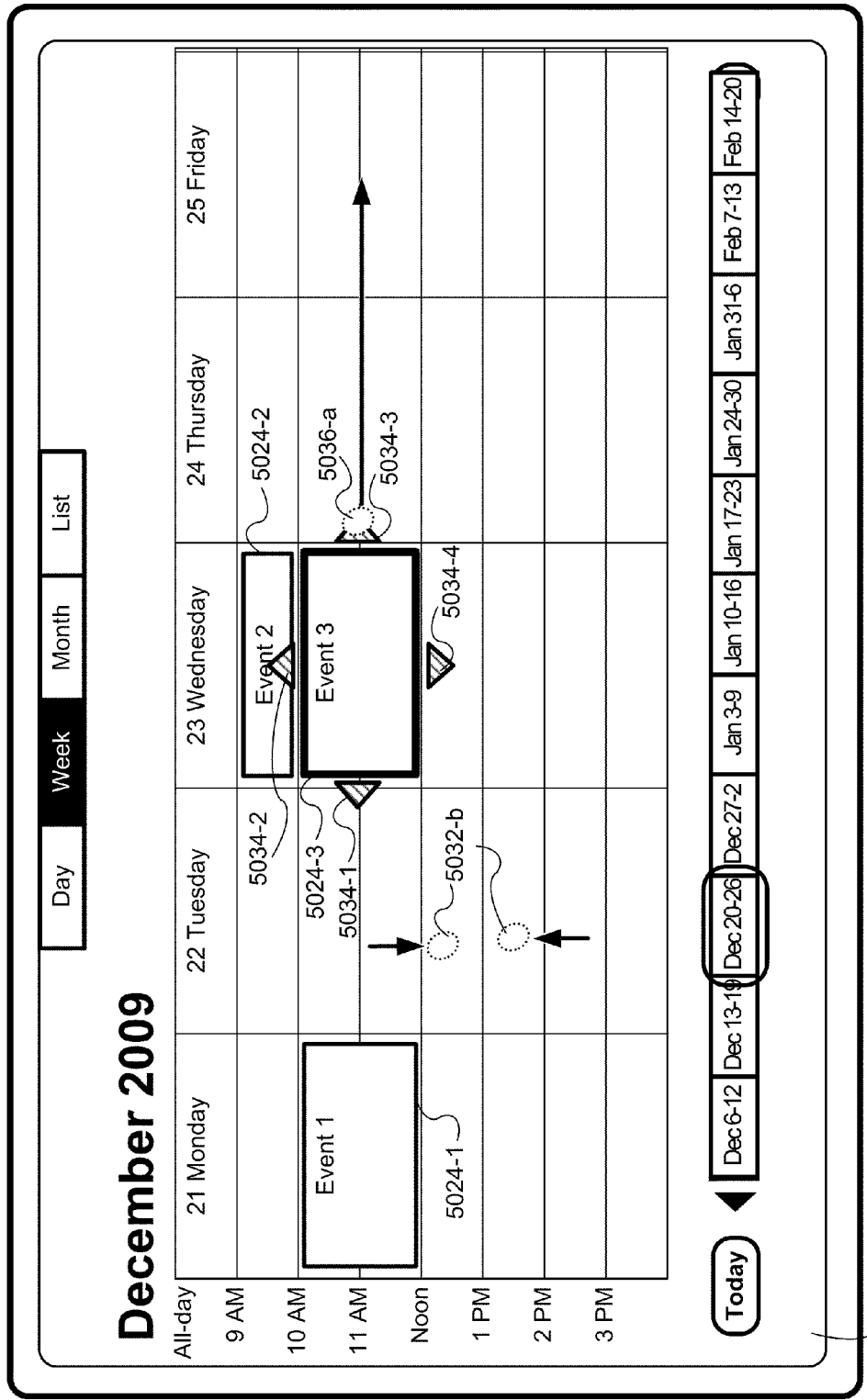
Figure 5M:
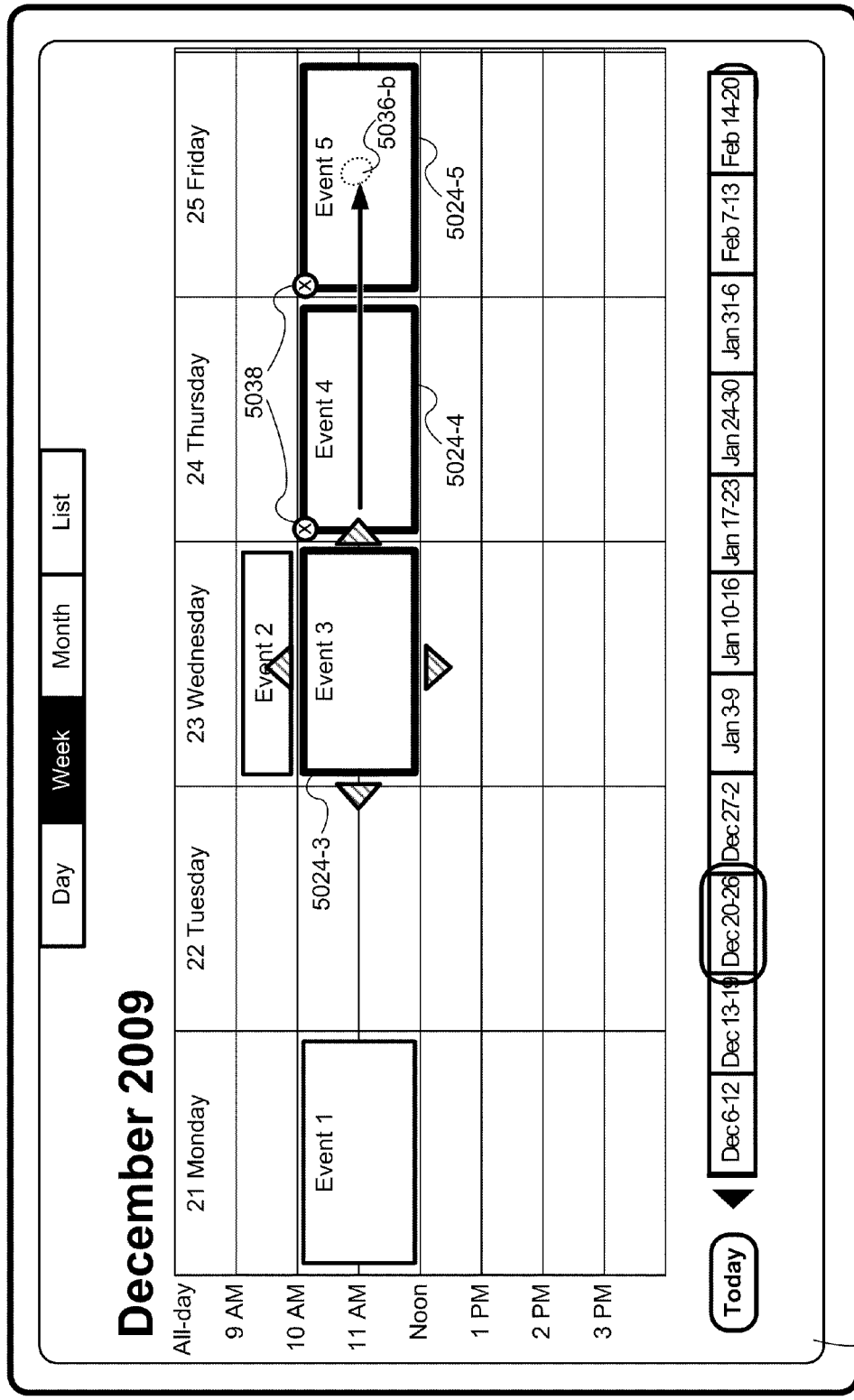
Figure 5N:
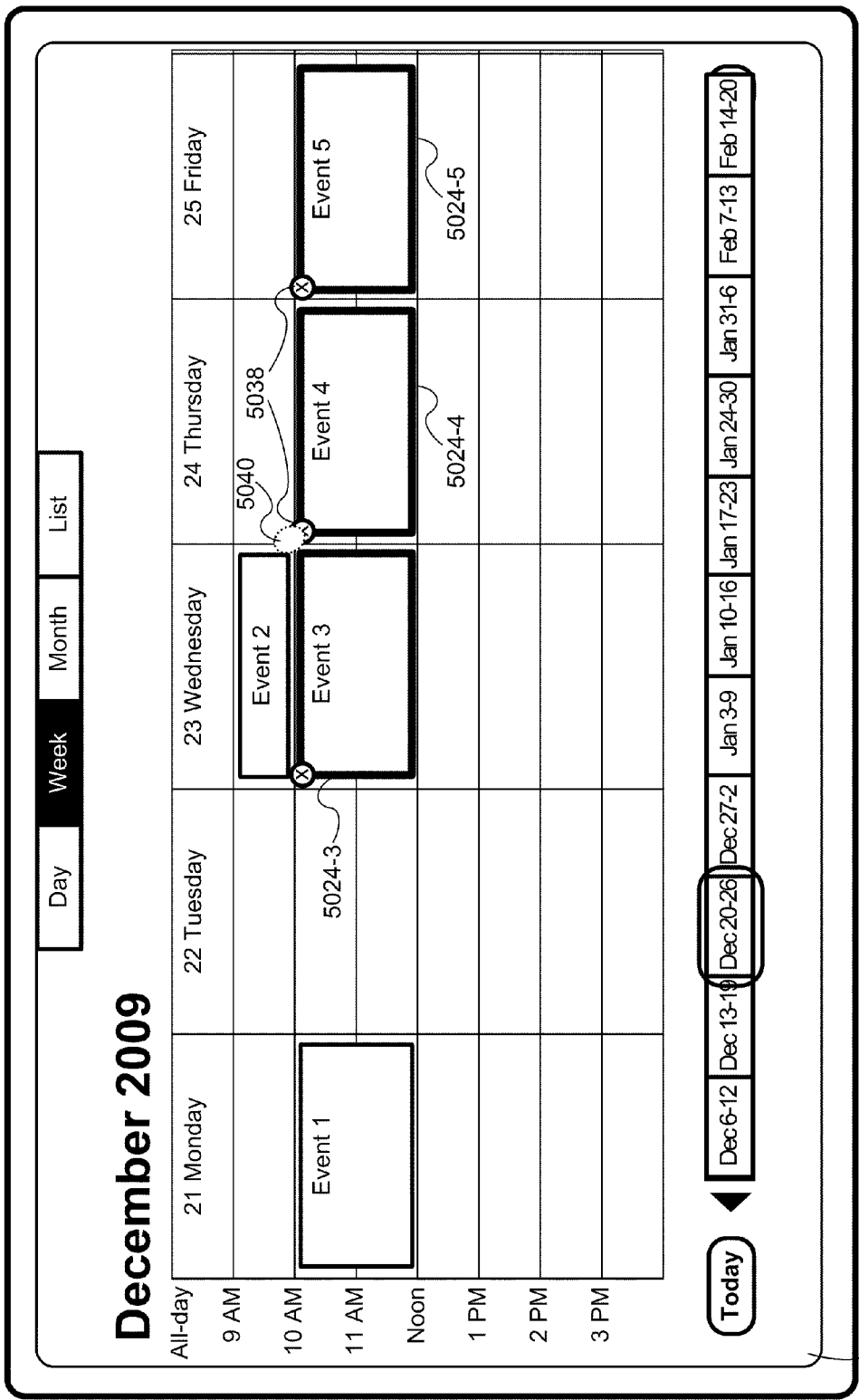
Figure 5O:
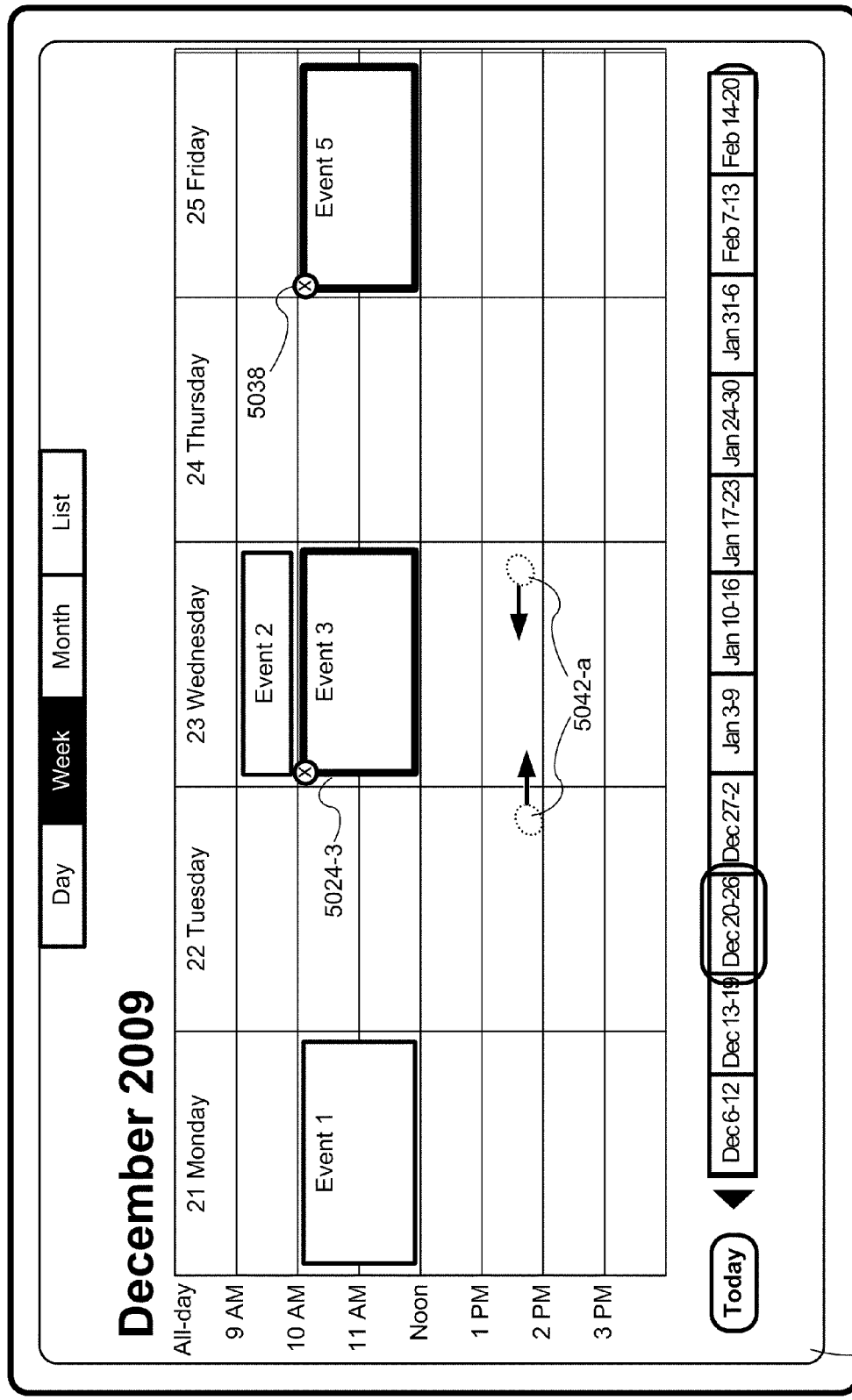
Figure 5P:
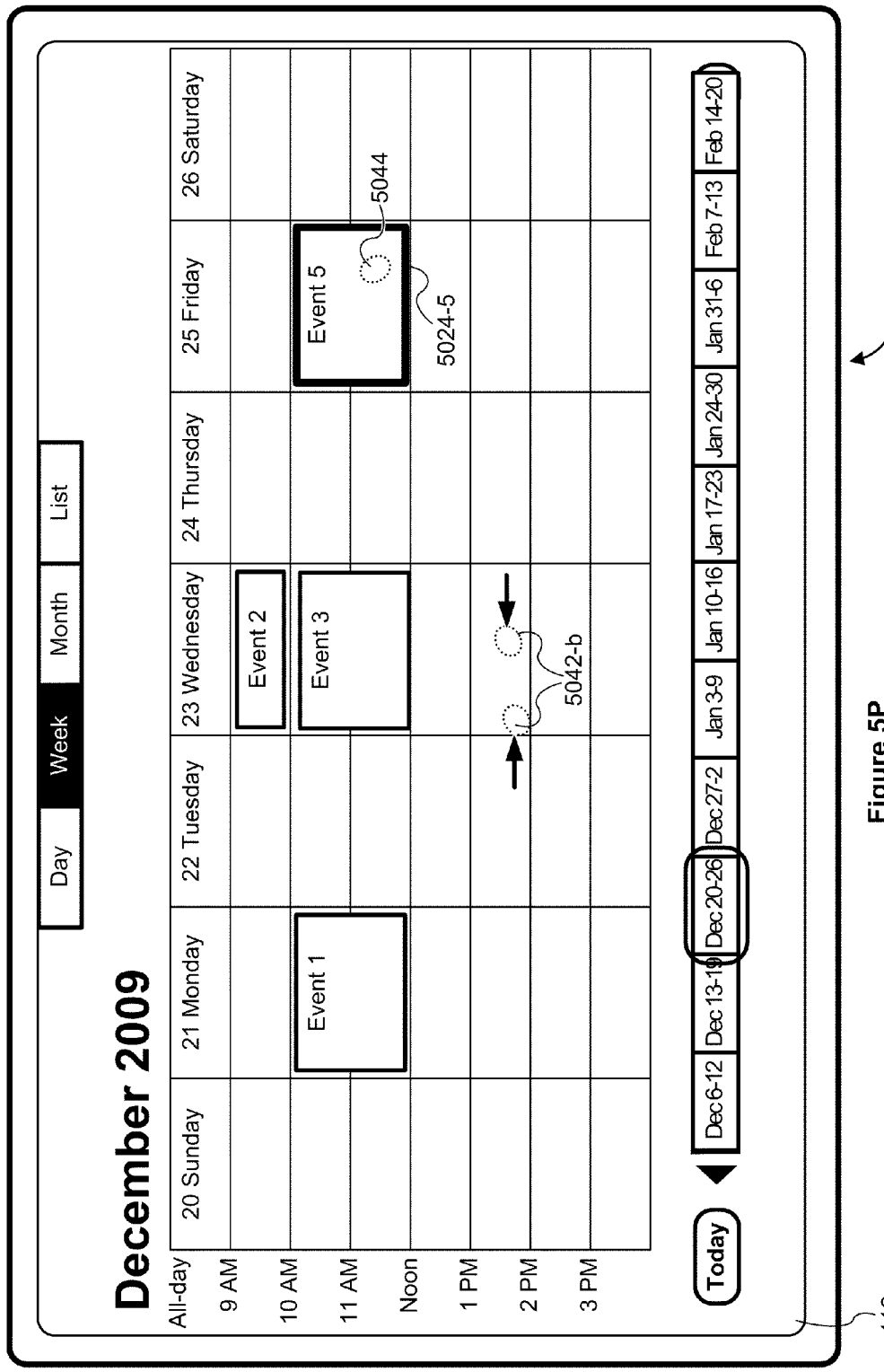
Figure 5Q:
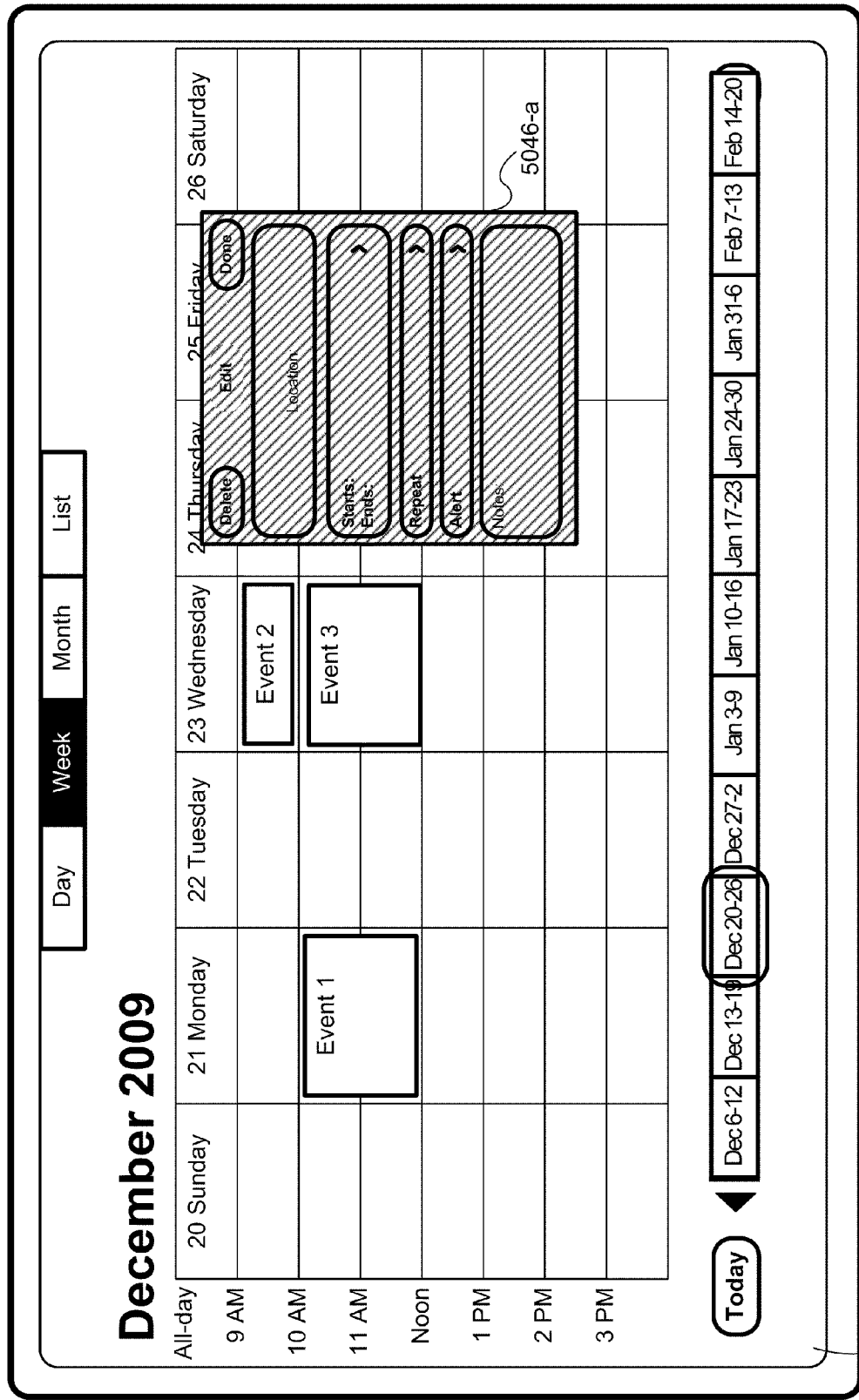
Figure 5R:
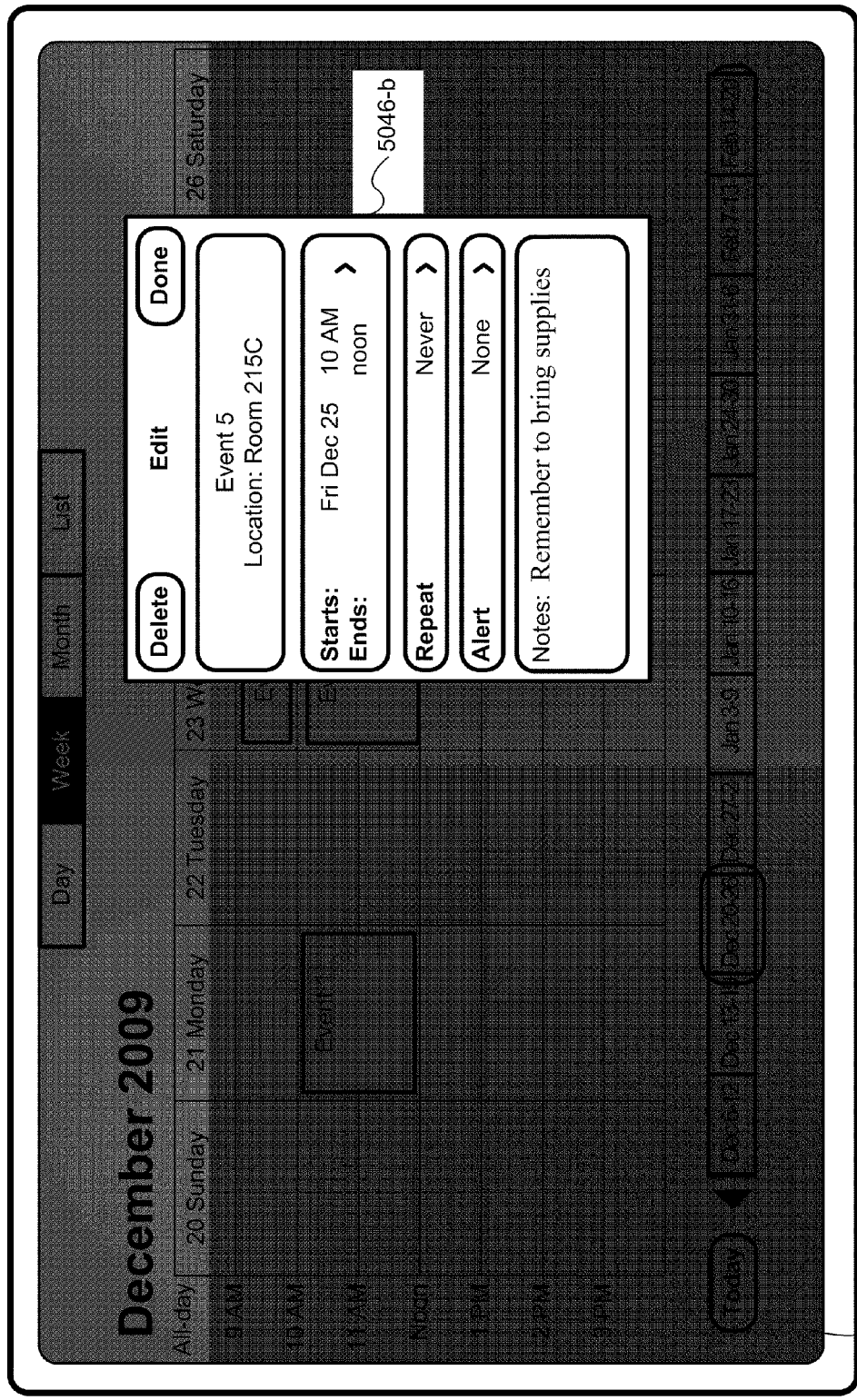
Figure 5T:
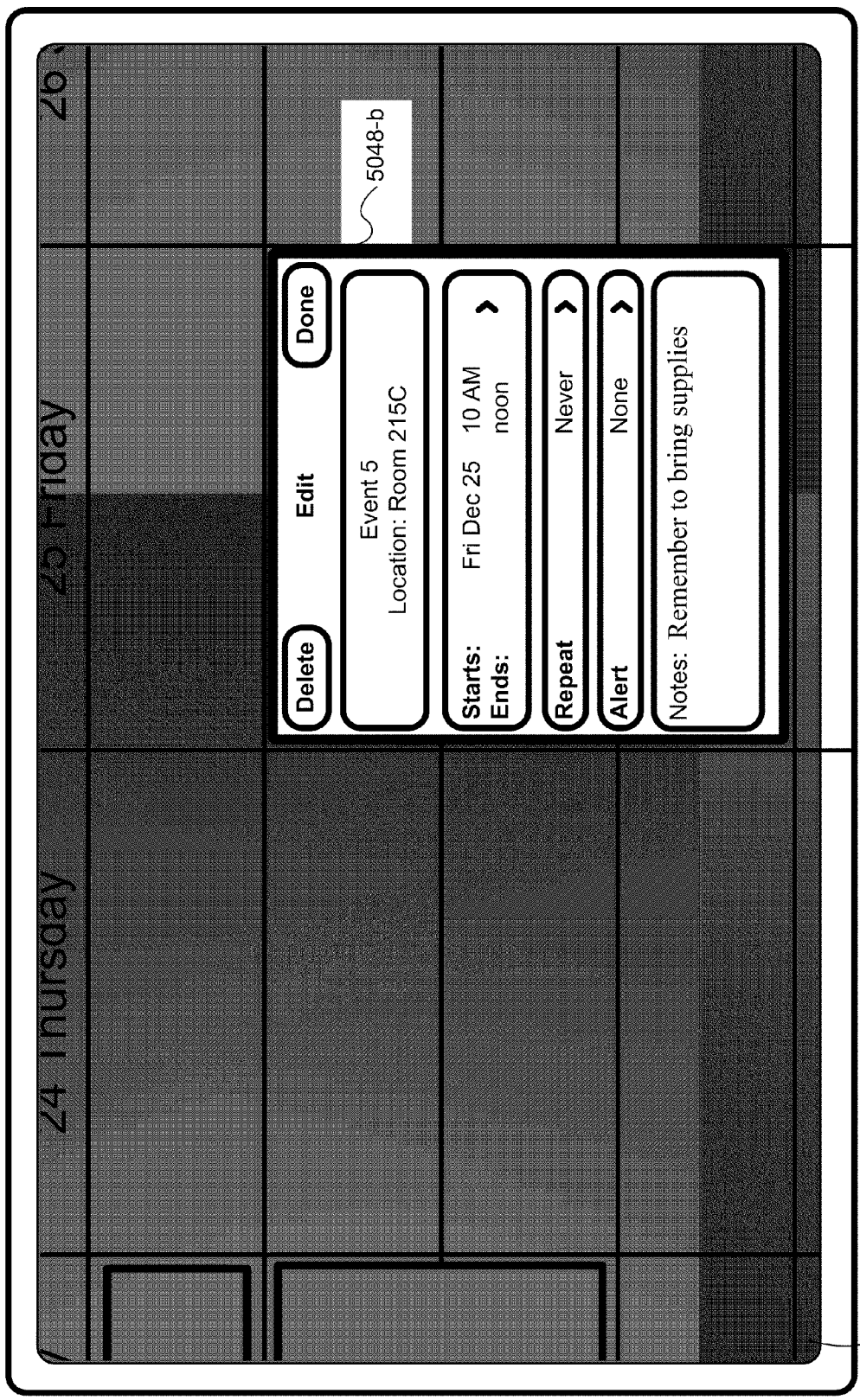
Figure 5U:
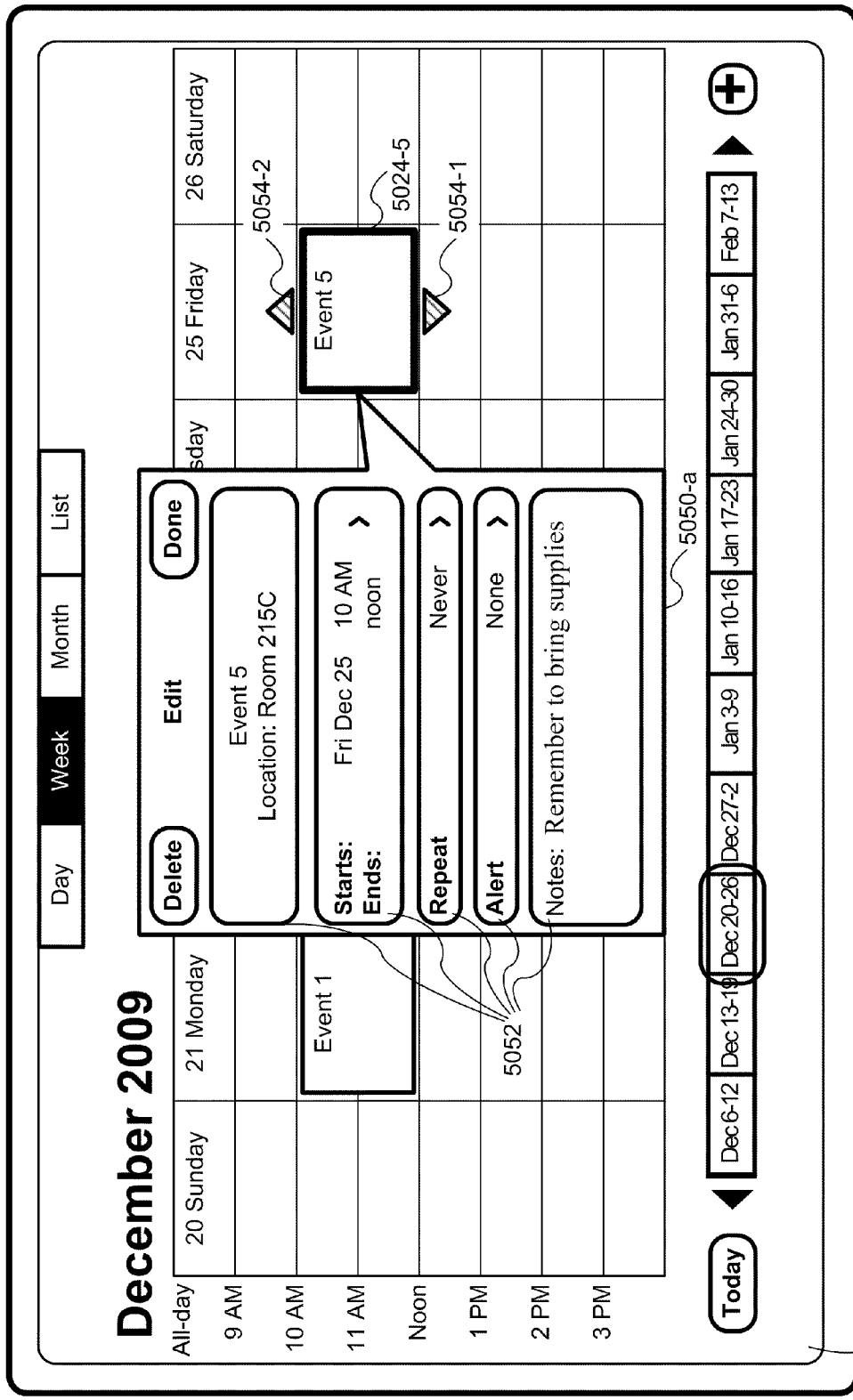
Figure 5V:
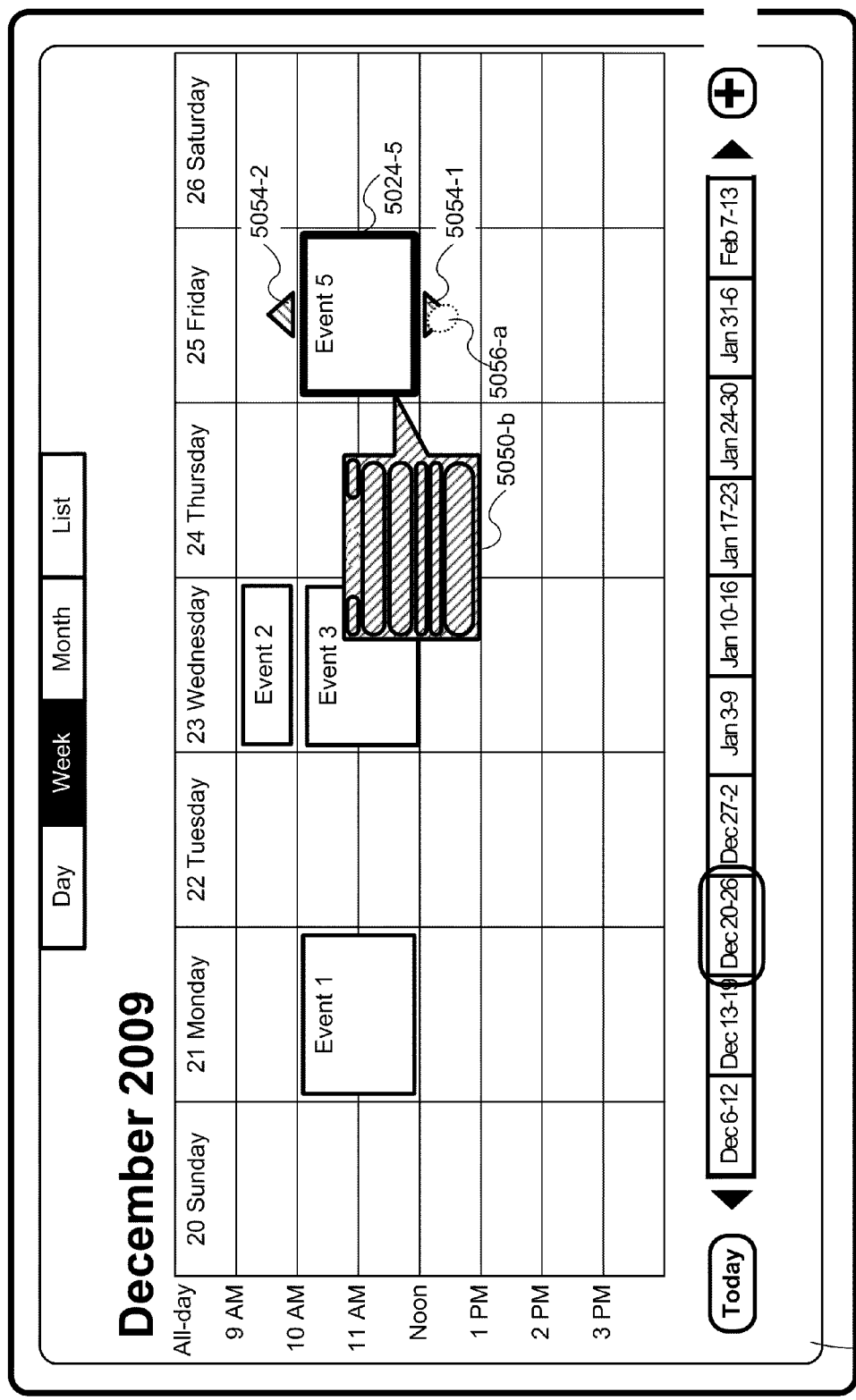
Figure 5W:
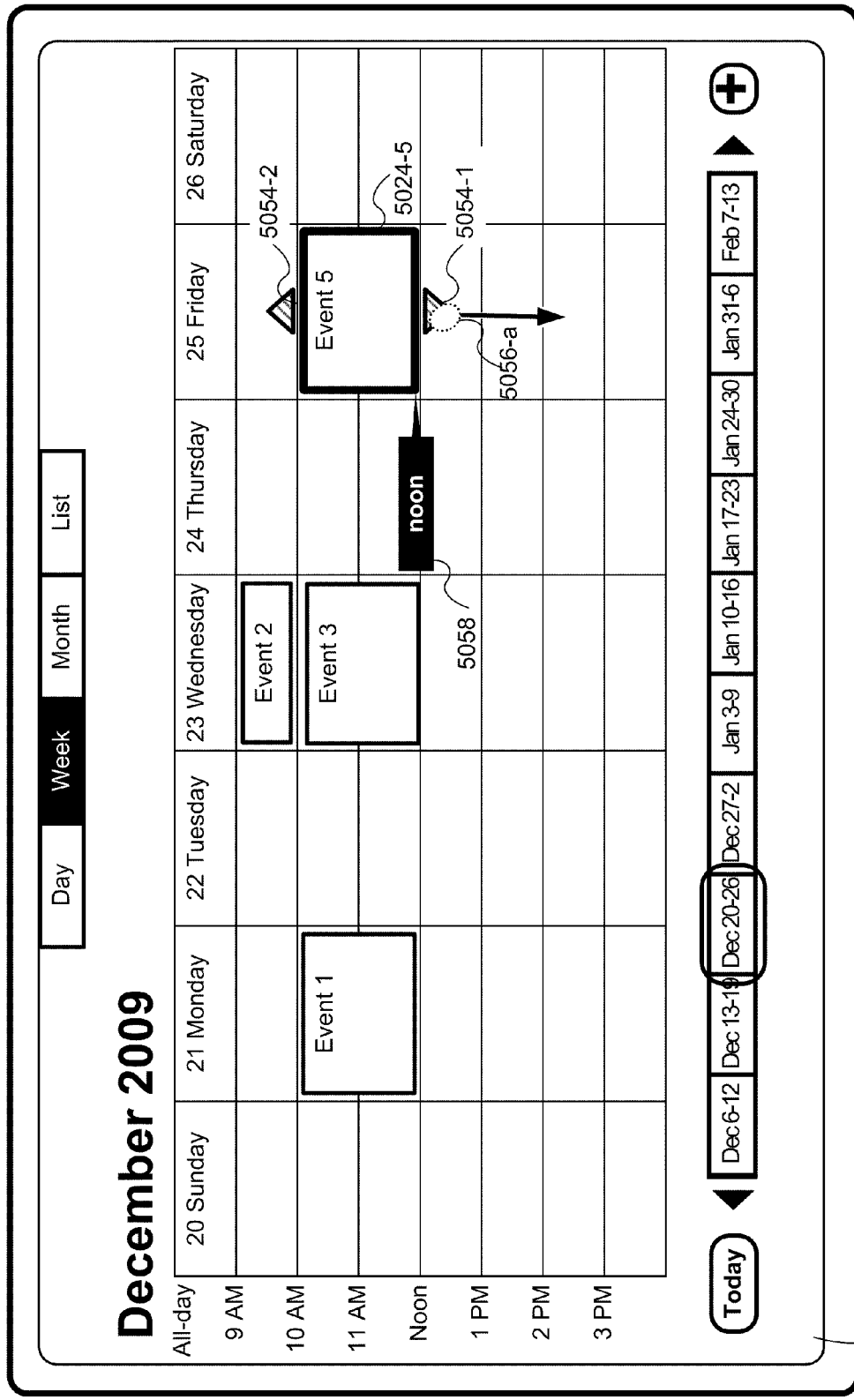
Figure 5X:
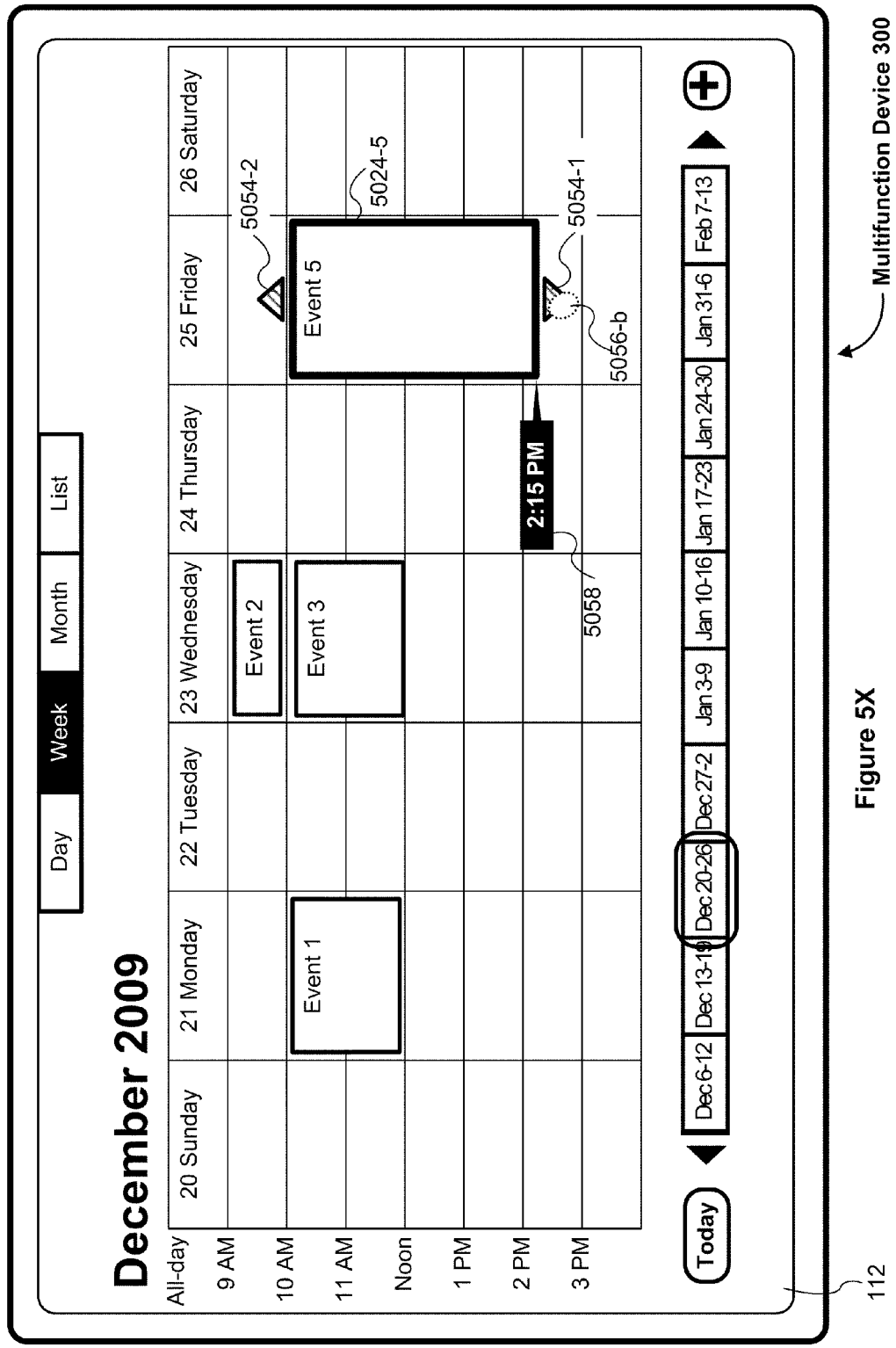
Figure 5Y:
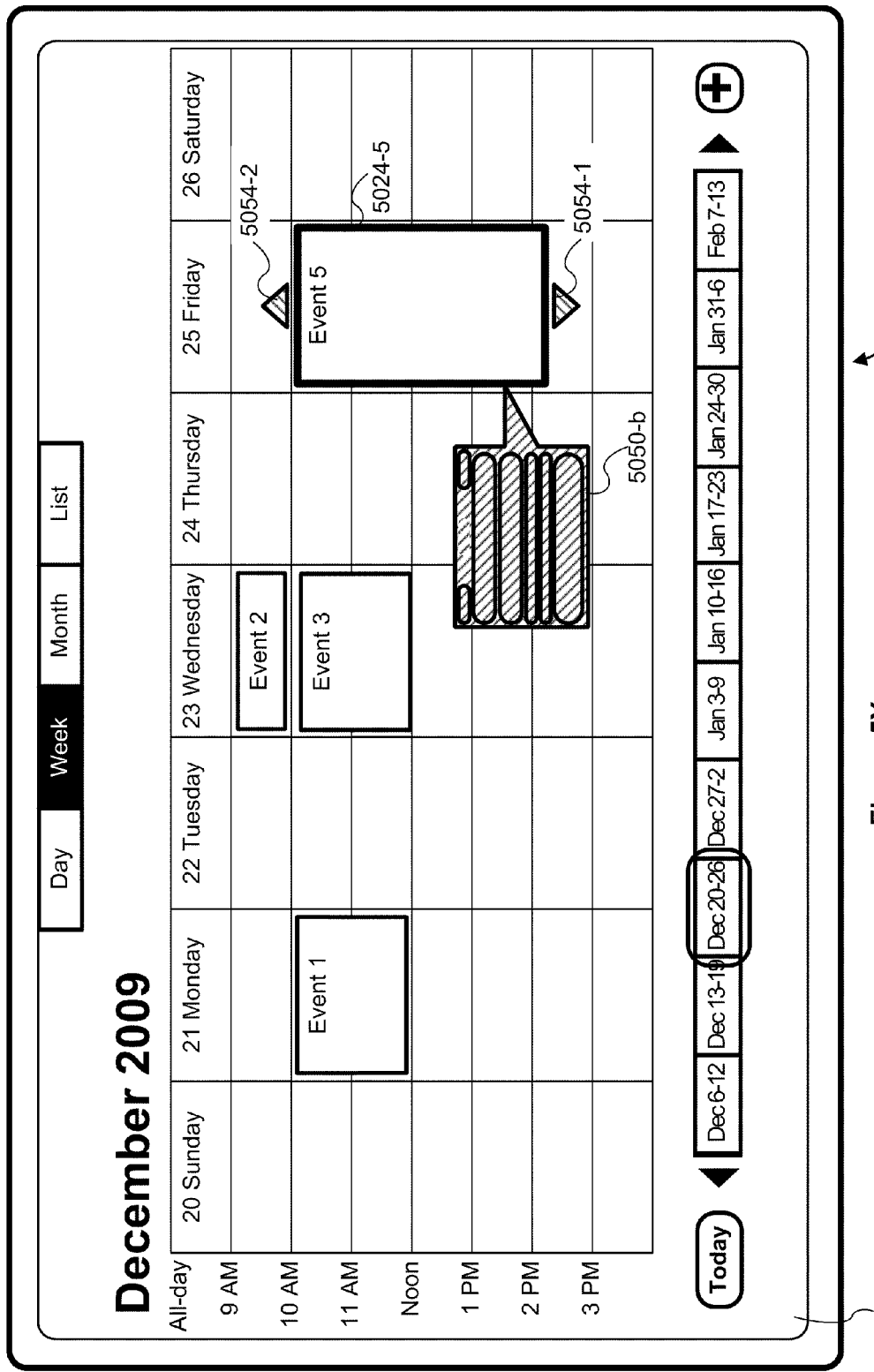
Figure 5Z:
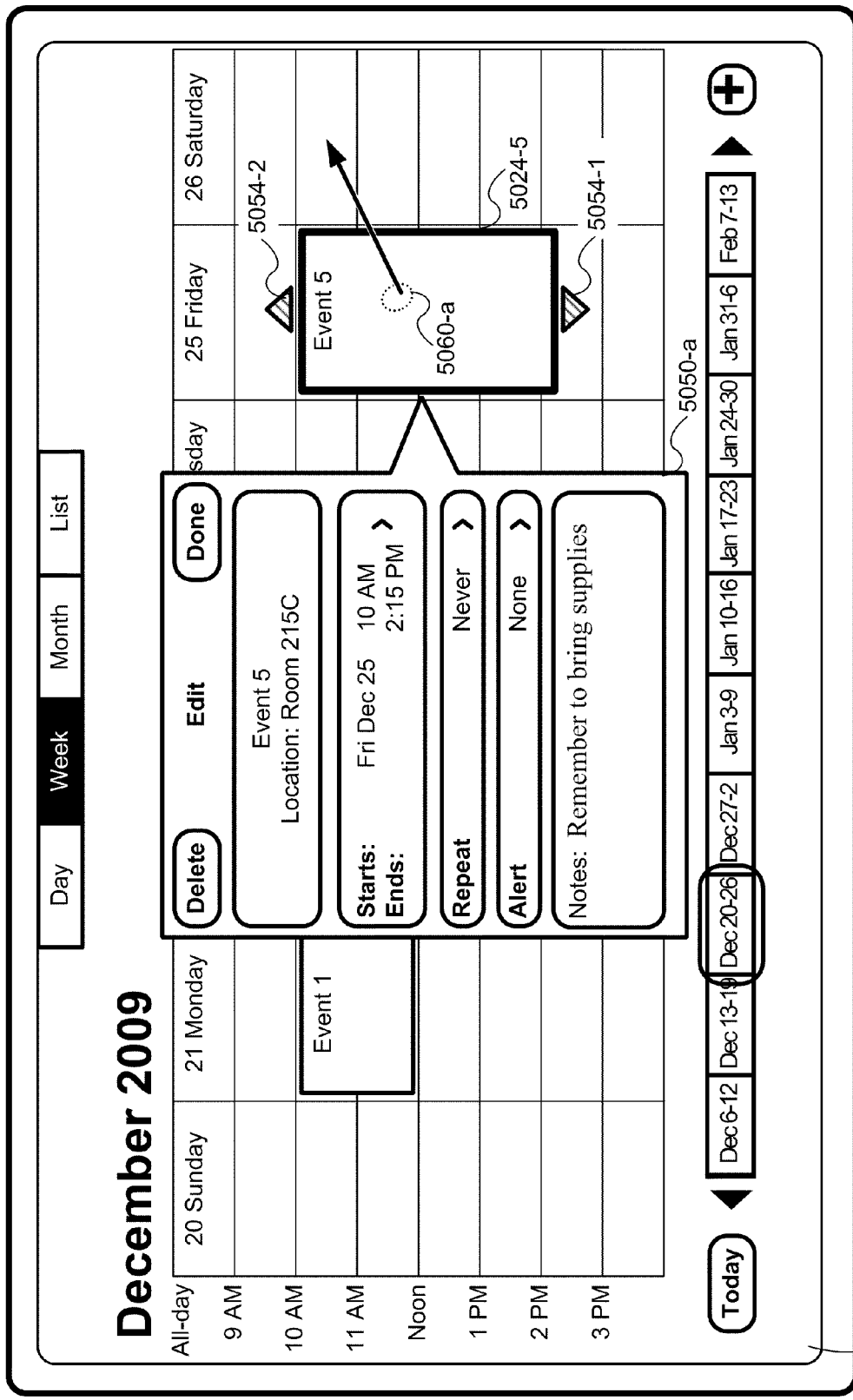
Figure 5A:
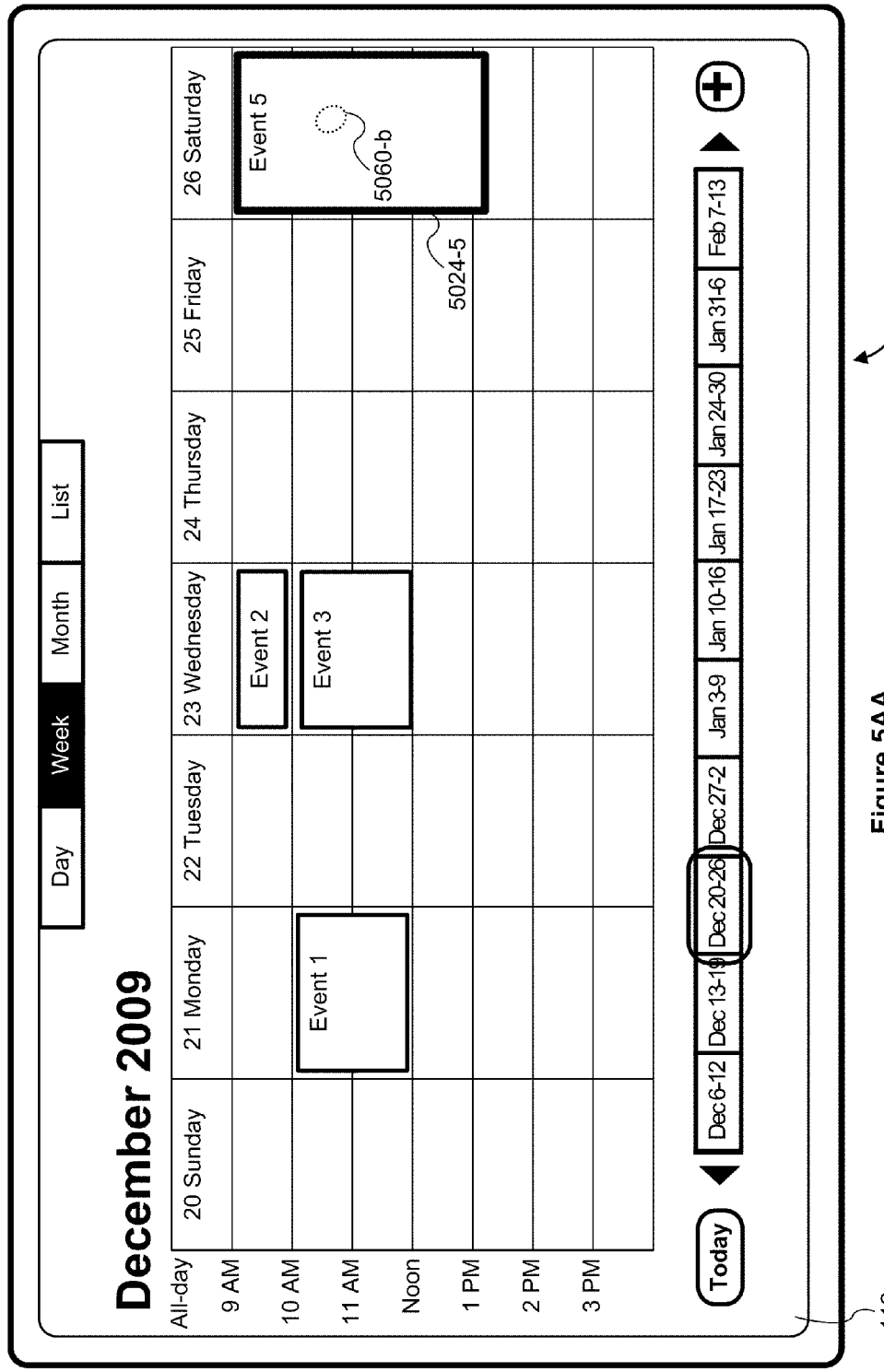
Figure 5B:
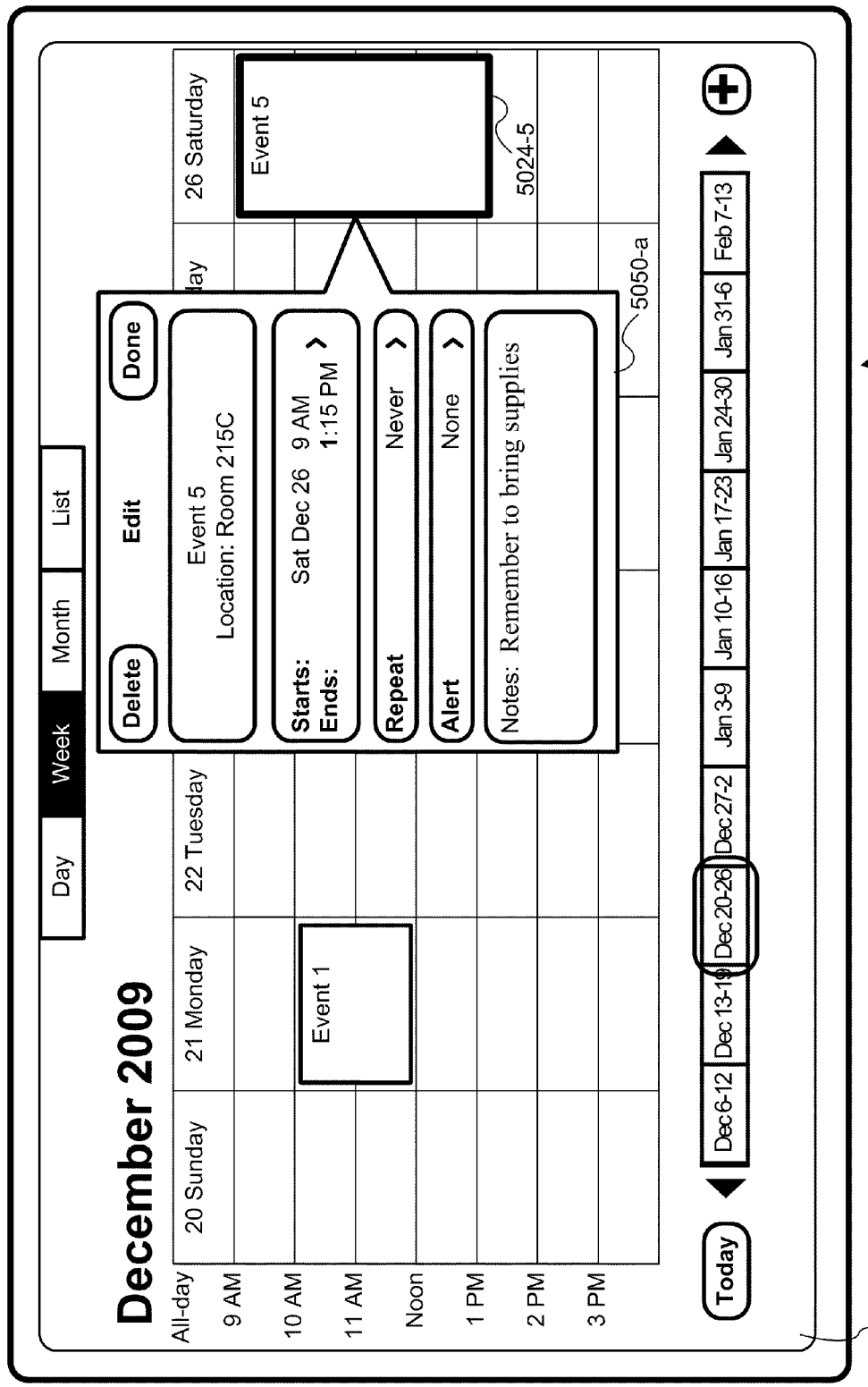
Figure 5C:
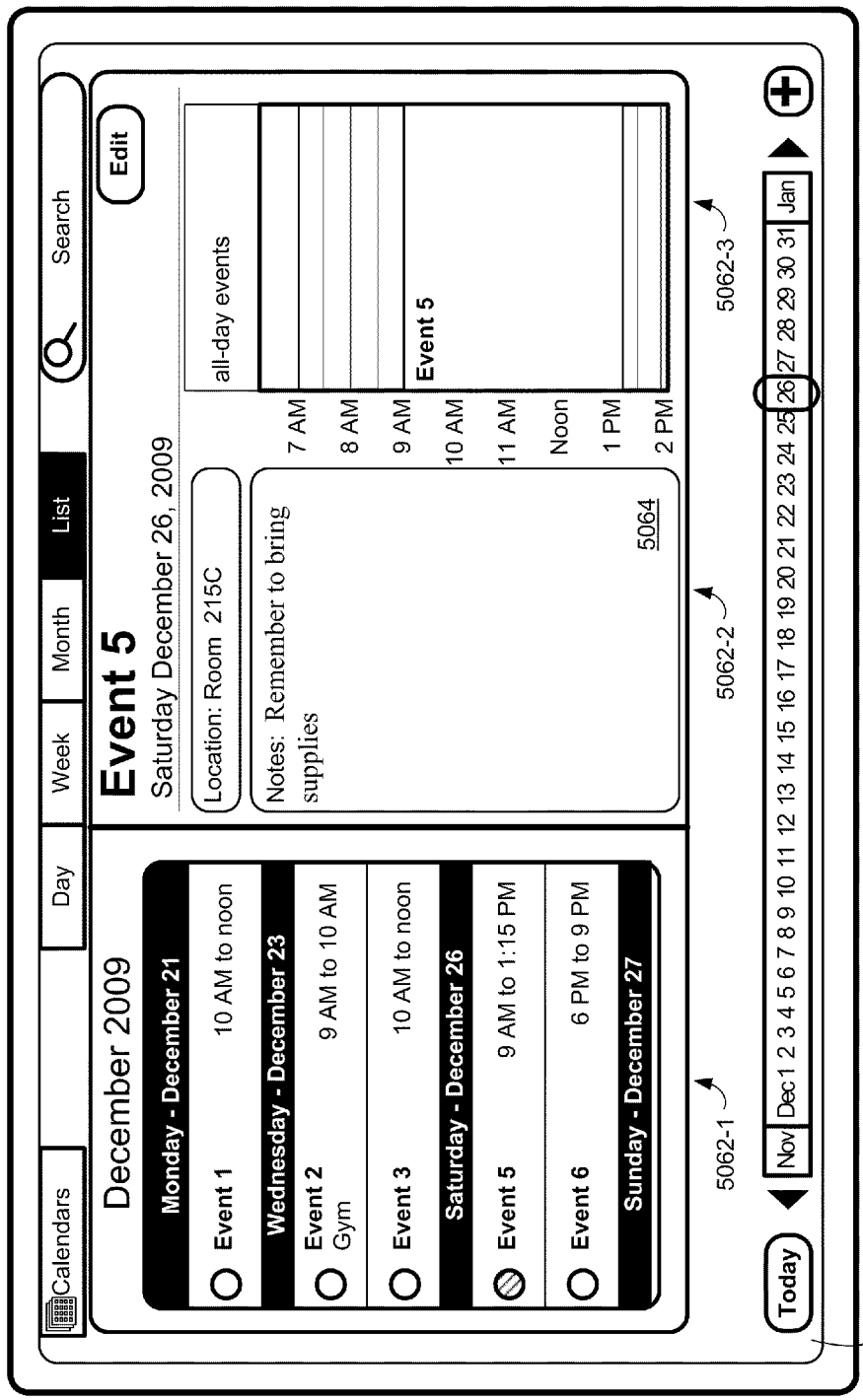
Figure 5D:
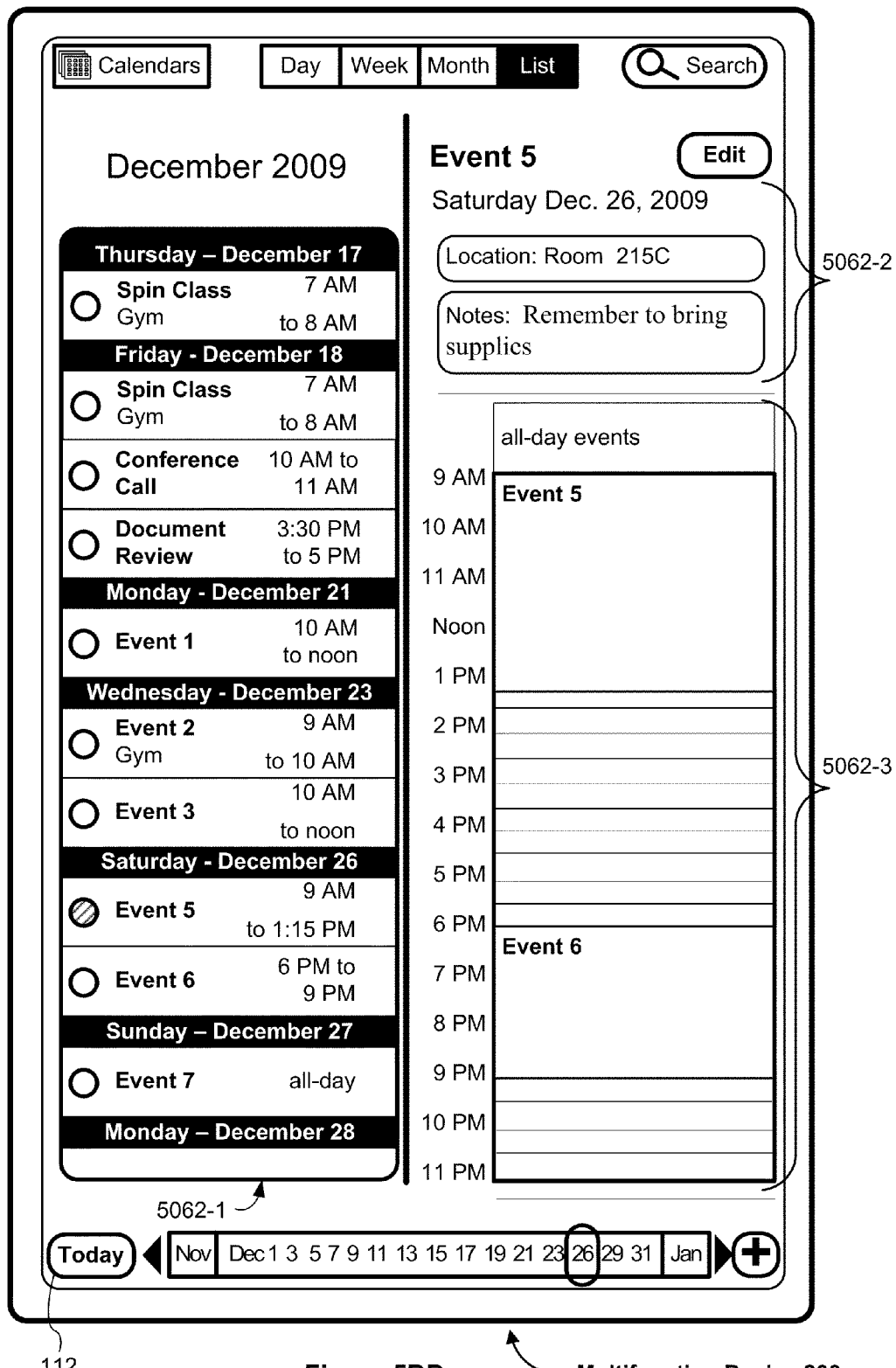

FIGS. 5A-5B illustrate selecting a first selectable user interface object (e.g., 5002-2 in FIGS. 5A-5B) in response to detecting an input (e.g., tap gesture 5006 in FIG. 5A) at a location on a touch screen 112 that corresponds to an activation region (e.g., 5004-2 in FIG. 5A) for the first selectable user interface object (e.g., 5002-2 in FIG. 5A), and in response to the input, decreasing the area of the activation region from a default area (e.g., the area of a respective activation region 5002-2 in FIG. 5A) to a smaller area (e.g., the area of the respective activation region 5002-2 in FIG. 5B), and displaying a popup view 5008 including information about the first selectable user interface object.

FIGS. 5A and 5C illustrate selecting a first selectable user interface object (e.g., 5002-2 in FIGS. 5A and 5C) in response to detecting an input (e.g., tap gesture 5006 in FIG. 5A) at a location on a touch screen 112 that corresponds to an activation region (e.g., 5004-2 in FIG. 5A) for the first selectable user interface object, and in response to the input, deactivating the activation region, and displaying a popup view 5010 including information about the first selectable user interface object.

FIGS. 5C-5D illustrate, in response to detecting an input (e.g., tap gesture 5012 in FIG. 5C) at a location on the touch screen 112 that corresponds a button in the popup view 5008 that includes information about the currently selected user interface object (e.g., 5004-2 in FIGS. 5C-5D) for the first selectable user interface object, displaying a popup view (e.g., 5014 in FIG. 5D) with expanded information (e.g., a location, participants, alerts, notes, etc.) about the currently selected user interface object, (e.g., 5002-2 in FIGS. 5C-5D).

FIGS. 5D-5E illustrate, in response to detecting an input (e.g., tap gesture 5016 in FIG. 5D) at a location on the touch screen 112 that corresponds to a location of the expanded activation region (e.g., 5004-3 in FIG. 5D) for a second selectable user interface object and also corresponds to the default activation region (e.g., 5004-2 in FIG. 5A) for the first selectable user interface object, selecting the second selectable user interface object (e.g., 5002-3 in FIGS. 5D-5E) and deactivating the activation region for the second selectable user interface object (e.g., 5002-3 in FIGS. 5D-5E).

FIGS. 5C and 5F illustrate, in response to detecting a second input (e.g., tap gesture 5020 in FIG. 5C) on the touch-sensitive surface at a location that corresponds to a representation of a day (e.g., Nov. 11, 2009) in the calendar that does not include the first selectable user interface object (e.g., 5002-2 in FIG. 5C), deselecting the first selectable user interface object (e.g., as illustrated in FIG. 5F, where none of the calendar events 5002-1, 5002-2, 5002-3 and 5002-4 are selected).

FIGS. 5G-5H illustrate exemplary user interfaces for, displaying a calendar user interface that includes one or more events (e.g., 5024-1 in FIG. 5G), and in response to detecting an input (e.g., detecting tap and hold gesture 5022 on the touch-sensitive surface such as touch screen 112 for more than a predetermined period of time) creating a calendar event (e.g., "Event 2" 5024-2 in FIG. 5H). In some embodiments, when the tap and hold gesture does not include lateral movement that is above a predefined threshold (e.g., 10 pixels), the calendar event is inserted into the calendar at a default size that is determined based on a zoom level of the calendar (e.g., when a full day is displayed, the default event size is one hour, when a half day is displayed the default event size is one half hour, etc.). In some embodiments, when the tap and hold gesture includes lateral movement that is above the predefined threshold, the event is resized in accordance with the movement, as described in greater detail below with reference to FIGS. 5J-5K.

FIGS. 5H-5I illustrate exemplary user interfaces for decreasing a time scale of a calendar in response to detecting a de-pinch gesture at a location on the touch-sensitive surface that corresponds to the calendar on the display. For example in FIG. 5H, the device displays a week view of December 21-25, which includes a time scale from 9:00 am to 3:00 pm. The device detects a de-pinch gesture (e.g., including movement of contacts 5026 away from each other on the touch screen 112 from a first position 5026-a in FIG. 5H to a second position 5026-b in FIG. 5I). In response to the de-pinch gesture, the device decreases the time scale of the week view to a new time scale (e.g., 10:00 am to 2:00 pm, as illustrated in FIG. 5I).

FIGS. 5I-5K illustrate exemplary user interfaces for, in response to detecting an input (e.g., detecting tap and hold gesture 5028-a on the touch-sensitive surface such as touch screen 112 for more than a predetermined period of time) at a location that corresponds to a time in a calendar application, creating a calendar event (e.g., "Event 3" 5024-3 in FIG. 5J). In some embodiments, when the tap and hold gesture does not include lateral movement that is above a predefined threshold (e.g., 10 pixels) for more than a predetermined period of time (e.g., 0.5 seconds), a new calendar event is inserted into the calendar at a default size that is determined based on a zoom level of the calendar (e.g., when a full day is displayed, the default event size is one hour, when a half day is displayed the default event size is one half hour, etc.). In some embodiments, when the device detects a continuation of the tap and hold gesture that includes lateral movement (e.g., movement on the touch screen 112 that corresponds to movement from a first contact location 5028-a in FIG. 5J to a second location 5028-b in FIG. 5K), the device adjusts the size of the newly created event in accordance with the movement. For example, in FIG. 5J, before the lateral movement of the contact, "Event 3" (5024-3 in FIG. 5J) is half an hour long and has an end time of 10:00 pm; however, in FIGS. 5J-5K the lateral movement of the contact is downwards movement approximately to noon on Dec. 23, 2009. In this example, after the lateral movement of the contact, Event 3 (5024-3 in FIG. 5J) is two hours long and has an end time of noon. It should be understood that, while the example given above is given with respect to downward movement of the contact, upwards movement of the contact could be treated in an analogous manner by, for example, adjust the start time of the event in response to the upwards movement, rather than adjusting the end time of the event.

FIGS. 5K-5L illustrate exemplary user interfaces for increasing a time scale of a calendar in response to detecting a pinch gesture at a location on the touch-sensitive surface that corresponds to the calendar on the display. For example in FIG. 5K, the device displays a week view of December 21-25, which includes a time scale from 10:00 am to 2:00 pm. The device detects a pinch gesture (e.g., including movement of contacts 5032 towards each other on the touch screen 112 from a first position 5032-a in FIG. 5K to a second position 5032-b in FIG. 5L). In response to the pinch gesture, the device increases the time scale of the week view to a new time scale (e.g., 9:00 am to 3:00 pm, as illustrated in FIG. 5L).

FIGS. 5L-5M illustrate exemplary user interfaces for creating a recurring event in a calendar in response to a lateral gesture on the touch-sensitive surface. For example, in FIG. 5L, the device displays a calendar including a currently selected event (e.g., "Event 3" 5024-3 in FIG. 5L) having a plurality of handles (e.g., 5034-1, 5034-2, 5034-3 and 5034-4). In some embodiments, the currently selected event is distinguished from other events in the calendar (e.g., 5024-1 and 5024-2 in FIG. 5L) by displaying user interface object modification handles on the event, displaying user interface object modification handles off of the event, displaying a drop shadow for the event, and/or displaying an animation for the event (e.g., adjusting the hue, saturation, brightness, contrast, color, etc. of the event).

In some embodiments where handles are displayed, the handles adjust the length of the event and/or the creation of recurrences of the event. In some embodiments, the movement of the handles is based directly on the movement of an input in a direction that corresponds to a direction parallel to a primary axis of the handle (e.g., the handle has a vertical primary axis, and movement of a contact downwards on the touch screen display results in movement of the handle downwards by an amount that is directly proportional to the component of movement parallel to the primary axis). In some embodiments, the movement of the handles is based on the movement of an input in a direction that corresponds to a direction parallel to a primary axis of the handle and a perpendicular distance of the contact from the primary axis (e.g., the handle has a vertical primary axis, and movement of a contact downwards on the touch screen display results in movement of the handle downwards by an amount that is proportional to the component of movement parallel to the primary axis and the proportionality is determined at least in part based on the distance of the contact from the primary axis).

In some embodiments, in response to detecting a gesture including detecting the contact at a first location (e.g., 5036-a in FIG. 5L) on the touch screen 112 that is associated with a first event (e.g., "Event 3" 5024-3 in FIG. 5L) and subsequent lateral movement of the contact to a second location (e.g., 5036-*b* in FIG. 5M), the device creates recurring events (e.g., "Event 4" 5024-4 and "Event 5" 5025-4 in FIG. 5M) that are copies of the first event for the in each day through which the contact passes. In some embodiments, recurrences of an event copy all of the attributes of the event (e.g., time, location, participants, etc.) but include a different date. In some embodiments, when a respective event is edited, all recurrences of the respective event (e.g., all recurrences of the event that occur after the respective event) are simultaneously modified to make analogous edits (e.g., by changing the time, location participants, etc.). In some embodiments, while a respective event is being edited, all recurrences of the respective event include a visual indicator to indicate that they are recurrences of the respective event. For example, in FIG. 5M, "Event 3" 5024-3 is currently being edited, and the device displays delete icons (e.g., 5038 in FIG. 5M) to indicate other events (e.g., "Event 4" 5024-4 and "Event 5" 5024-5 in FIG. 5M) that are recurrences of "Event 3" 5024-3.

In some embodiments, a recurring event is created in response to detecting one continuous multipart gesture that includes detecting an input (e.g., detecting tap and hold gesture 5028-*a* on the touch-sensitive surface such as touch screen 112 for more than a predetermined period of time) creating a calendar event (e.g., "Event 3" 5024-3 in FIG. 5J) and subsequent lateral movement of the contact. In some embodiments, when the tap and hold gesture does not include lateral movement that is above a predefined threshold (e.g., 10 pixels) for at least a predefined period of time (e.g., 0.5 seconds), the calendar event is inserted into the calendar at a default size that is determined based on a zoom level of the calendar. In some embodiments, subsequent movement of the contact that is part of the continuous multipart gesture (e.g., that does not include a liftoff of the contact) that is in a first direction (e.g., vertical) changes the start and/or end times of the event, while movement of the contact that is in a second direction that is substantially perpendicular to the first direction (e.g., horizontal) creates recurrences of the event. In some embodiments, subsequent movement of the contact that is part of the continuous multipart gesture (e.g., that does not include a liftoff of the contact) that is in a first direction (e.g., vertical) changes the start and end times of the event, while movement of the contact that is in a second direction that is substantially perpendicular to the first direction (e.g., horizontal) extends the length of the event in 24 hour increments.

FIGS. 5N-5O illustrate exemplary user interfaces for deleting a recurrence of a respective event in response to detecting an input on a deletion icon for the respective event. For example, in FIG. 5N, "Event 3" 5024-3 is the respective event, and the device displays delete icons (e.g., 5038 in FIG. 5N) to indicate other events (e.g., "Event 4" 5024-4 and "Event 5" 5024-5 in FIG. 5N) that are recurrences of the respective event (e.g., "Event 3" 5024-3 in FIG. 5N). The device detects an input (e.g., tap gesture 5040 in FIG. 5N) with a delete icon for one of the recurrences of the event (e.g., delete icon 5038 that is associated with "Event 4" 5024-4 in FIG. 5N). In response to detecting the input, the device deletes the recurrence of the event (e.g., as illustrated in FIG. 5O, the device ceases to display "Event 4" in the calendar user interface).

FIGS. 5O-5P illustrate exemplary user interfaces for increasing a time scale of a calendar in response to detecting a pinch gesture at a location on the touch-sensitive surface that corresponds to the calendar on the display. For example in FIG. 5O, the device displays a week view of December 21-25, which includes a time scale of five days. The device detects a pinch gesture (e.g., including movement of contacts 5042 towards each other on the touch screen 112 from a first position 5042-*a* in FIG. 5O to a second position 5042-*b* in FIG. 5P). In response to the pinch gesture, the device increases the time scale of the week view to a new time scale (e.g., showing seven days of the week including December 20-26, as illustrated in FIG. 5P). It should be understood that, in response to detecting a de-pinch gesture that is substantially opposite of the pinch gesture described above, the device decreases the time scale (e.g., by going from displaying 5 days to going to displaying fewer days). It should be understood that, in accordance with some embodiments, when a pinch/de-pinch gesture includes movement of contacts in a direction that corresponds to a first direction (e.g., substantially vertical) on the display, the device adjusts the time scale in a first manner (e.g., by increasing the number of hours of time shown for each of a plurality of days, as illustrated in FIGS. 5K-5L); while when a pinch/de-pinch gesture includes movement of contacts in a direction that corresponds to a second direction (e.g., substantially horizontal) on the display that is substantially perpendicular to the first direction, the device adjusts the time scale in a second manner (e.g., by increasing the number of days shown in a week view, as illustrated in FIGS. 5O-5P).

FIGS. 5P-5T illustrate exemplary user interfaces for displaying additional information about a respective event in response to detecting selection of the respective event. For example, in FIG. 5P, the device detects an input (e.g., tap gesture 5044 in FIG. 5P) with a respective event (e.g., "Event 5" 5024-5 in FIG. 5P). In some embodiments, in response to detecting the input (e.g., tap gesture 5044 in FIG. 5P), the device displays an animation of the respective calendar entry "stretching outward" towards the user. For example, in FIGS. 5Q-5R, the device ceases to display the respective event 5024-5, and displays an expanded representation 5046 of the event. In some embodiments, the device displays an animation of the expanded representation of the event expanding from the original location of the respective event in the calendar (e.g., the device displays the expanded representation of the event growing from 5046-*a* in FIG. 5Q to 5046-*b* in FIG. 5R, while the rest of the calendar remains at a constant size). In some embodiments, in response to detecting the input (e.g., tap gesture 5044 in FIG. 5P), the device displays an animation of the respective calendar entry "zooming in" to the calendar entry. For example, in FIGS. 5S-5T, the device ceases to display the respective event 5024-5, and displays an expanded representation 5048 of the event. In some embodiments, the device displays an animation of the calendar zooming so as to display the expanded representation of the event at the original location of the respective event in the calendar (e.g., the device displays an animation of the calendar zooming so as to display the expanded representation of the event 5048-*a* in FIG. 5S to 5048-*b* in FIG. 5T, while the rest of the calendar expands around the expanded representation of the calendar entry).

In some embodiments, calendar events are color coded based on an attribute of the calendar entry (e.g., the calendar grouping to which the calendar entry belongs), and the expanded representation of a respective calendar entry shares the color of the respective calendar entry. In some embodiments, the device deemphasizes one or more regions of the calendar user interface other than the expanded representation of the calendar entry (e.g., by adjusting the relative brightness, contrast, hue, saturation, color, etc. of the one or more regions of the calendar user interface as compared to the expanded representation of the calendar entry, as illustrated in FIGS. 5R and 5T).

FIGS. 5U-5W illustrate exemplary user interfaces for displaying an editing area (e.g., 5050-*a* in FIG. 5U) that is associated with a user-modifiable user interface object (e.g., "Event 5" 5024-5 in FIG. 5U), where the editing area (e.g., 5050-*a* in FIG. 5U) has a plurality of fields 5052 for editing properties of the user-modifiable user interface object. In response to detecting a second input that includes a contact (e.g., 5056-*a* in FIG. 5V) that corresponds to an activation region for a resizing handle (e.g., 5054-1 in FIG. 5W) and subsequent movement of the contact (e.g., from a first location 5056-*a* in FIGS. 5V-5W to a second location 5056-*b* in FIG. 5X), the user interface object is resized in accordance with the movement (e.g., in FIGS. 5V-5W, before the second input is detected, the user interface object 5024-5 has a first size, while in FIG. 5X, after detecting the second input, the user interface object 5024-5 has a second size that is distinct from the first size). Additionally, while the user interface object is being resized, the editing area ceases to be displayed, and, in some embodiments, the editing area (e.g., 5050-*a* in FIG. 5U) is replaced with a read-only area (e.g., 5058 in FIGS. 5W-5X). In some embodiments, an animation of the editing area being replaced with the read-only area is displayed (e.g., in FIGS. 5U-5W, the device transforms the editing area 5050-*a* shrinking down through one or more intermediate stages such as 5050-*b* in FIG. 5V to a size of the read-only area).

In some embodiments, the device ceases to display the editing area in response to detecting a contact. In some embodiments, the device ceases to display the editing area (e.g., 5050-*a* in FIG. 5U) in response to detecting a contact (e.g., 5054-1 in FIG. 5V) and subsequent movement of the contact (e.g., to a new location 5050-*b* as illustrated in FIG. 5W).

FIGS. 5W-5X illustrate exemplary user interfaces for moving a read-only area (e.g., 5058 in FIGS. 5W-5X) in response to an input resizing a user interface object with which the read-only area is associated. For example, in response to detecting the second input, the device changes the end time of the event from noon in FIG. 5W to 2:15 pm in FIG. 5X, and changes the time that is displayed in the read-only area from noon in FIG. 5W to 2:15 pm in FIG. 5X as the read-only area is moved in conjunction with the movement of an end of the user interface object (e.g., the bottom of "Event 5" 5024-5 in FIGS. 5W-5X).

FIGS. 5Y-5Z illustrate exemplary user interfaces for redisplaying the editing area (e.g., 5050-*a* in FIG. 5Z) in response to ceasing to detect the second input. For example, in FIG. 5Y, when the device detects a liftoff of the contact that was a part of the second input (e.g., contact 5056-*b* in FIG. 5X), the read-only area (e.g., 5058 in FIG. 5X) ceases to be displayed, and, in some embodiments, the editing area (e.g., 5050-*a* in FIG. 5U) is displayed (e.g., 5050-*a* in FIG. 5Z). In some embodiments, an animation of the read-only area being replaced with the editing area is displayed (e.g., in FIGS. 5Y-5Z, the device replaces the read-only area 5058 in FIG. 5X with one or more intermediate stages such as 5050-*b* in FIG. 5Y which start from a size of the read-only area to the final size of the editing area 5050-*a* in FIG. 5Z).

FIGS. 5Z-5BB illustrate exemplary user interfaces for displaying an editing area (5050-*a* in FIG. 5Z), and in response to detecting a respective input, ceasing to display the editing area and redisplaying the editing area (e.g., 5050-*a* in FIG. 5BB) in response to detecting an end of the respective input. For example, in FIG. 5Z, the device displays an editing area 5050-*a* associated with a user interface object 5024-5. In response to detecting a respective input including detecting a contact (e.g., 5060-*a* in FIG. 5Z) at a first location that corresponds to a user interface object movement region (e.g., a center of the "Event 5" user interface object 5024-5 in FIG. 5Z) and subsequent movement of the contact to a second location (e.g., 5060-*b* in FIG. 5Z), the device ceases to display the editing area (as illustrated in FIG. 5AA, where the editing area is no longer displayed). In FIG. 5BB, after the device ceases to detect the contact 5060-*b*, the device redisplays the editing area (e.g., 5050-*a* in FIG. 5BB).

FIGS. 5CC-5DD illustrate exemplary user interfaces for displaying a list view of a calendar user interface in landscape mode and in portrait mode. In FIG. 5CC, the user interface for the list view is shown in a landscape mode. In landscape mode, the list view includes three horizontally adjacent portions (e.g., horizontally adjacent columns) 5062 including, a list portion (e.g., 5062-1 in FIG. 5CC), an event detail portion (e.g., 5062-2 in FIG. 5CC) and a timeline portion (e.g., 5062-3 in FIG. 5CC).

In some embodiments, the list portion (e.g., 5062-1 in FIG. 5CC) includes a list of representations of events including a currently selected event (e.g., Event 5) and one or more other events (e.g., other events that occur in the same day as the currently selected event or occur in days that are adjacent to the day of the currently selected event). In some embodiments, the list portion is scrollable in response to a scrolling input (e.g., the list portion scrolls vertically in response to an upward swipe gesture or a downward swipe gesture). In some embodiments the details portion and/or the timeline portion are adjusted when another event is selected in the list view (e.g., the detail view shifts to display details associated with the newly selected event, and the timeline portion shifts to display a timeline for a time period associated with newly selected event).

In some embodiments the event detail portion (e.g., 5062-2 in FIG. 5CC) includes details (e.g., location, participants, notes, alarms, etc.) about the currently selected event (e.g., Event 5). In some embodiments each type of detail has a separate field, and each field is only displayed if some information of that type is associated with the currently selected event. In some embodiments the notes field 5064 of the event detail portion is the only editable portion of the calendar user interface (e.g., in order to add details to the event other than notes, the device must enter a special event editing mode.) In some embodiments, the timeline portion includes a timeline view of a time period (e.g., a day) that is associated with the currently selected event. For example, in FIG. 5CC, the currently selected event (e.g., "Event 5") is associated with Saturday, Dec. 26, 2009, and thus the timeline portion displays a timeline for Saturday, Dec. 26, 2009. In some embodiments, the timeline portion is scrollable in response to a scrolling input (e.g., the timeline portion scrolls vertically in response to an upward swipe gesture or a downward swipe gesture).

In some embodiments the device detects a rotation input to rotate the calendar user interface. In some embodiments the device includes an accelerometer and the rotation input includes rotation of the device from a first orientation to a second orientation (e.g., shifting rotating the device approximately 90 degrees with respect to the earth's gravitational pull). In some embodiments the rotation input is a multi-contact rotation gesture on the touch sensitive surface (e.g., the multi-contact rotation gesture includes the rotation of a primary axis between two contacts in the multi-contact rotation gesture by more than a predefined amount.) In response to the rotation input, the device shifts the calendar user interface into portrait mode, as illustrated in FIG. 5DD.

In FIG. 5DD the calendar user interface includes a plurality of portions (e.g., the list portion, the event detail portion and the timeline portion) that are rearranged to be displayed in the portrait mode. For example, in FIG. 5DD, the portrait mode includes a two column display, where the first column includes the list portion (e.g., 5062-1 in FIG. 5DD) and the second column includes both the event detail portion (e.g., 5062-2 in FIG. 5DD) and the timeline portion (e.g., 5062-3 in FIG. 5DD). In some embodiments, the list portion, the detail portion and the timeline portion in the portrait view also have one or more of the properties of analogous portions in the landscape view, as described above with reference to FIG. 5CC.

Figure 6A:
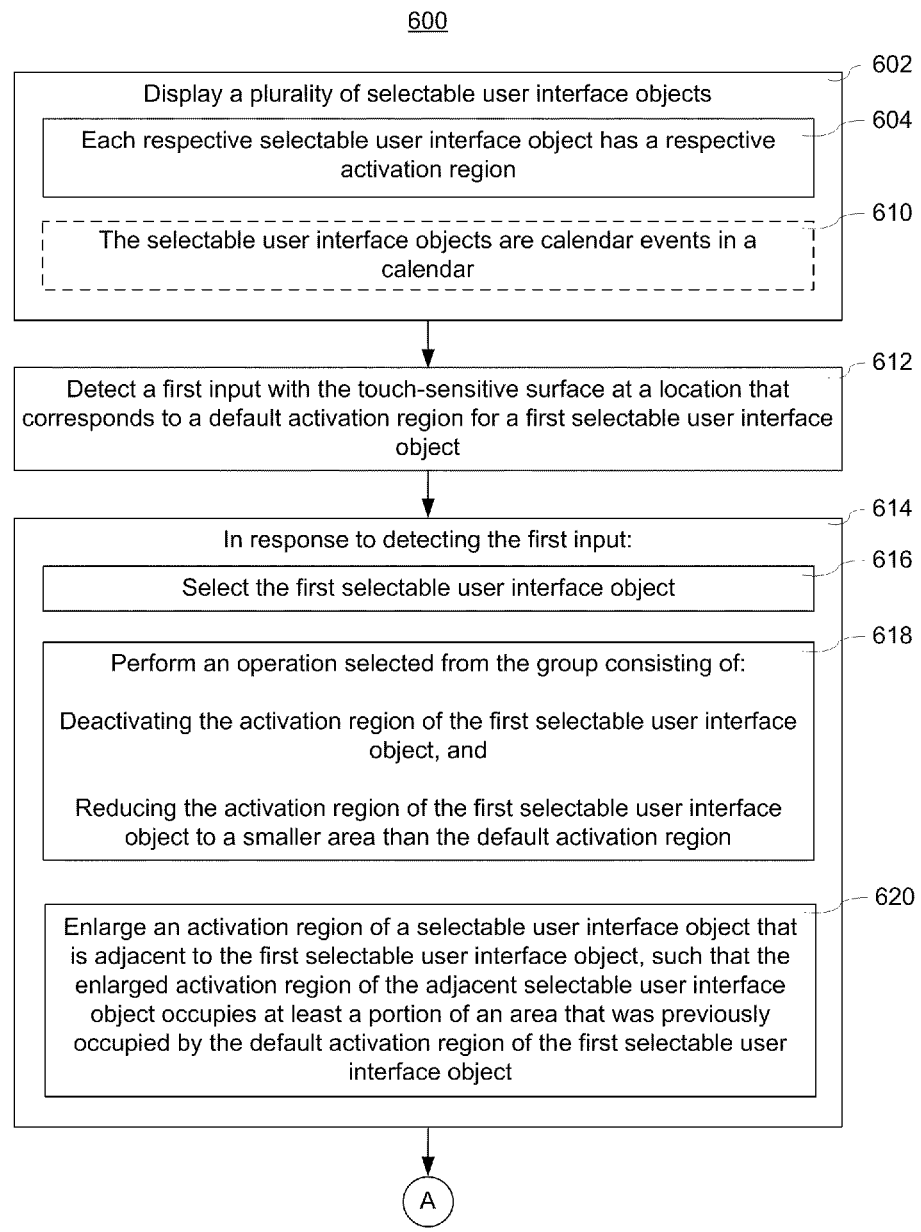
FIGS. 6A-6C are flow diagrams illustrating a method of modifying activation regions for adjacent selectable user interface objects in accordance with some embodiments.
Figure 6B:
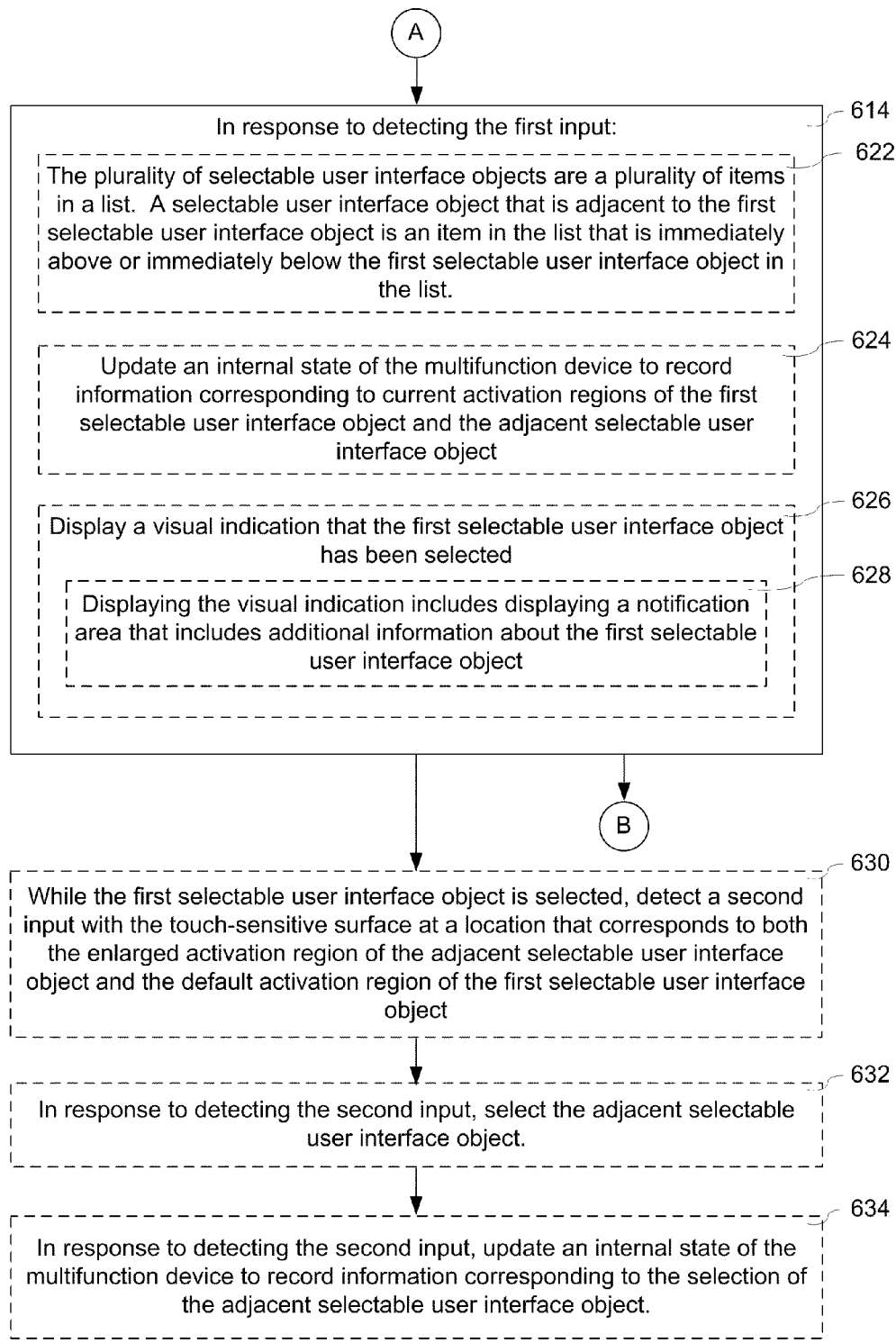
Figure 6C:
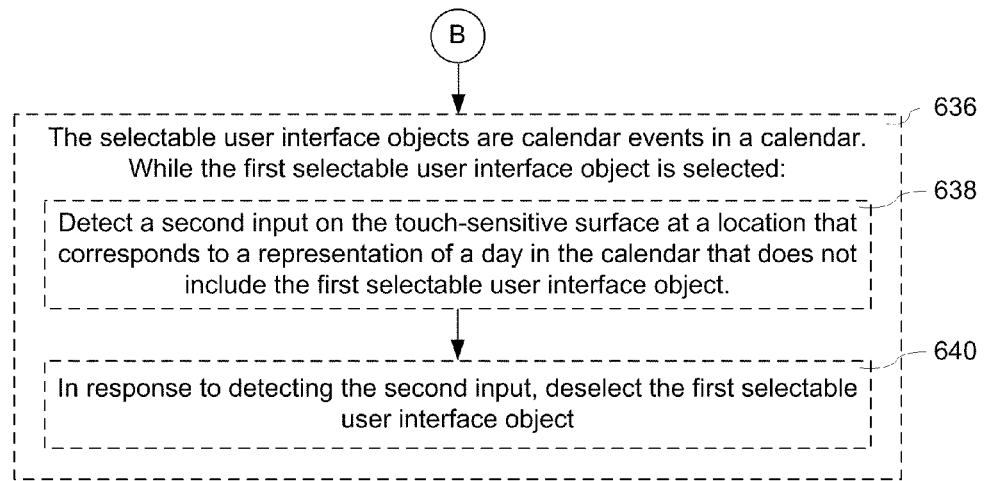

FIGS. 6A-6C are flow diagrams illustrating a method 600 of modifying activation regions for adjacent selectable user interface objects in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides a transparent way to modify activation regions for adjacent selectable user interface objects. The method reduces the cognitive burden on a user when selecting user interface objects, thereby creating a more efficient human-machine interface. For battery-operated computing devices, enabling a user to select user interface objects faster and more efficiently conserves power and increases the time between battery charges.

The device displays (602) a plurality of selectable user interface objects (e.g., 5002-1, 5002-2, 5002-3 and 5002-4 in FIGS. 5A-5F). Each respective selectable user interface object has (604) a respective activation region (e.g., 5004-1, 5004-2, 5004-3 and 5004-4 in FIG. 5A). In some embodiments, the selectable user interface objects are (610) calendar events in a calendar (e.g., in FIG. 5A the device displays a list including "Spin Class" 5002-1, "Conf. Call" 5002-2 and "Doc Review" 5002-3 are events in a calendar.)

The device detects (612) a first input (e.g., tap gesture 5006 in FIG. 5A) with the touch-sensitive surface at a location that corresponds to a default activation region (e.g., 5004-2 in FIG. 5A) for a first selectable user interface object (e.g., 5002-2 in FIG. 5A). In some embodiments, the default activation region for a first selectable user interface object is a starting activation region for the first selectable user interface object. Typically a default activation region for a respective selectable user interface object includes the entire selectable user interface object. In some embodiments, the default activation region includes only a portion of the selectable user interface object or is displayed at a location on the display that is remote from the selectable user interface object. Typically, activation regions are not displayed on the display. However, in some embodiments, a visual indicator of the boundaries of the activation region is displayed.

Operations 616-628 are performed (614) in response to detecting the first input. The device selects (616) the first selectable user interface object. The device performs (618) an operation selected from the group consisting of: reducing the activation region of the first selectable user interface object to a smaller area than the default activation region, and deactivating the activation region of the first selectable user interface object. As an example of reducing the activation region to a smaller area, in FIG. 5A a respective selectable user interface object 5002-2 has a respective activation region 5004-2 with a default size, and in FIG. 5B, after the respective selectable user interface object 5002-2 has been selected, the respective activation region 5004-2 for the respective selectable user interface object is reduced in size. As an example of deactivating the activation region in FIG. 5A a respective selectable user interface object 5002-2 has a respective activation region 5004-2, and in FIG. 5B, after the respective selectable user interface object 5002-2 has been selected, the respective activation region has been deactivated and thus a representation of the respective activation region is no longer shown.

The device enlarges (620) an activation region of a selectable user interface object that is adjacent to the first selectable user interface object such that the enlarged activation region of the adjacent selectable user interface object occupies at least a portion of an area that was previously occupied by the default activation region of the first selectable user interface object. In some embodiments, activation regions of two or more adjacent selectable user interface objects are enlarged to occupy at least a portion of the area that was previously occupied by the default activation region of the first selectable user interface object. For example, in FIG. 5B, the device expands the activation regions 5004-1 and 5004-3 for two of the calendar entries 5002-1 and 5002-3 into an area that was previously occupied by the default activation region 5004-2 for the first calendar entry 5002-2 in FIG. 5A but not into the area that is currently occupied by the reduced area activation region 5004-2 in FIG. 5B. As another example, in FIG. 5C, the device expands the activation regions 5004-1 and 5004-3 for two of the calendar entries 5002-1 and 5002-3 into an area that was previously occupied by the default activation region 5004-2 for the first calendar entry 5002-2 in FIG. 5A.

It should be understood that disabling and/or reducing the area of an activation region for a currently selected user interface object so as to expand the activation region for one or more adjacent user interface objects is advantageous, because it improves the ability of the device to detect attempts by the user to activate the user interface objects that are adjacent to the currently selected user interface object. In other words, typically a user will not attempt to reselect a user interface object that is already the currently selected user interface object. Thus, when the device detects an input that corresponds to the location of an activation region for the currently selected user interface object, it is likely that the user is actually attempting to select a different user interface object. Therefore, adjusting the activation regions of the currently selected user interface object and one or more adjacent user interface objects so as to select an adjacent user interface object rather than merely reselecting the currently selected user interface object (e.g., doing nothing), improves the efficiency of the machine-user interface by more accurately interpreting inputs received from the user, thereby conserving energy and increasing battery life.

In some embodiments, the plurality of selectable user interface objects are (622) a plurality of items in a list (e.g., in FIG. 5A the device displays a list including "Spin Class" 5002-1, "Conf. Call" 5002-2 and "Doc Review" 5002-3). In these embodiments, the selectable user interface object that is adjacent to the first selectable user interface object is an item in the list that is immediately above or immediately below the first selectable user interface object in the list (e.g., "Spin Class" 5002-1 and "Doc Review" 5002-3 are adjacent to "Conf. Call" 5002-2, while "Big Party" 5002-4 is not adjacent to "Conf. Call" 5002-2).

In some embodiments, in response to detecting the first input (e.g., tap gesture 5006 in FIG. 5A), the device updates (624) an internal state of the multifunction device 300 to record information corresponding to current activation regions of the first selectable user interface object and the adjacent selectable user interface object.

In some embodiments, in response to detecting the first input (e.g., tap gesture 5006 in FIG. 5A), the device displays (626) a visual indication that the first selectable user interface object has been selected. In some of these embodiments, displaying the visual indication includes displaying (628) a notification area (e.g., a popup view, window, pane, or other predefined area) that includes additional information about the first selectable user interface object. For example, in FIG. 5B, the device displays a popup view 5008 with information about the first selectable user interface object 5002-2. In this example, the device also displays information about other selectable user interface objects (e.g., events that occur in the same day as the currently selected event) in the popup view 5008. As another example, in FIG. 5C, the device displays a popup view 5010 with information about the first selectable user interface object 5002-2. In some embodiments, detecting another input at a location on the display that corresponds to the popup view (e.g., tap gesture 5012 in FIG. 5C) the device displays a popup (e.g., 5014 in FIG. 5D) including expanded information (e.g., participants, location, notes, etc.) about the currently selected user interface object 5002-2. In some embodiments, the popup (e.g., 5014 in FIG. 5D) is an expansion of the previously displayed popup view (e.g., 5010 in FIG. 5C). In some embodiments, the popup is displayed along with the previously displayed popup view.

In some embodiments, while the first selectable user interface object (e.g., 5002-2 in FIG. 5D) is selected, the device detects (630) a second input (e.g., tap gesture 5016 in FIG. 5D) with the touch-sensitive surface at a location that corresponds to both the enlarged activation region (e.g., 5004-3 in FIG. 5D) of the adjacent selectable user interface object (e.g., 5002-3 in FIG. 5D) and the default activation region (e.g., 5004-2 in FIG. 5A) of the first selectable user interface object (e.g., 5002-2 in FIGS. 5A-5F). In other words, as shown in FIG. 5D, the device detects a finger tap at a location in the area that was previously part of the default activation region (e.g., 5004-2 in FIG. 5A) of first selectable user interface object (e.g., 5002-2 in FIGS. 5A-5F) and is now part of the enlarged activation region (e.g., 5004-3 in FIG. 5D) of the adjacent selectable user interface object (e.g., 5002-3 in FIGS. 5A-5F). In these embodiments, in response to detecting the second input (e.g., tap gesture 5016 in FIG. 5D), the device selects (632) the adjacent selectable user interface object (e.g., 5002-3 in FIG. 5D).

In some embodiments, in response to detecting the second input (e.g., tap gesture 5016 in FIG. 5D), the device displays a visual indication that the second selectable user interface object (e.g., 5002-3 in FIG. 5E) has been selected. In some of these embodiments, displaying the visual indication includes displaying a notification area (e.g., a popup view, window, pane, or other predefined area) that includes additional information about the second selectable user interface object. For example, in FIG. 5E, the device displays a popup view 5018 with information about the second selectable user interface object 5002-3.

In some embodiments, in response to detecting the second input (e.g., tap gesture 5016 in FIG. 5D), the device updates (634) an internal state of the multifunction device 300 to record information corresponding to the selection of the adjacent selectable user interface object (e.g., 5002-3 in FIG. 5D).

In some embodiments, the selectable user interface objects are (636) calendar events in a calendar and, while the first selectable user interface object (e.g., 5002-2 in FIG. 5C) is selected: the device detects (638) a second input (e.g., tap gesture 5020 in FIG. 5C) on the touch-sensitive surface at a location that corresponds to a representation of a day (e.g., Nov. 11, 2009) in the calendar that does not include the first selectable user interface object; and, in response to detecting the second input (e.g., tap gesture 5020 in FIG. 5C), the device deselects (640) the first selectable user interface object (e.g., as illustrated in FIG. 5F). For example, in FIG. 5F, none of the selectable user interface objects (e.g., 5002-1, 5002-2, 5002-3 and 5002-4 in FIG. 5F) are currently selected, and the activation regions (e.g., 5004-1, 5004-2, 5004-3 and 5004-4 in FIG. 5F) are shown at their default sizes.

Figure 7A:
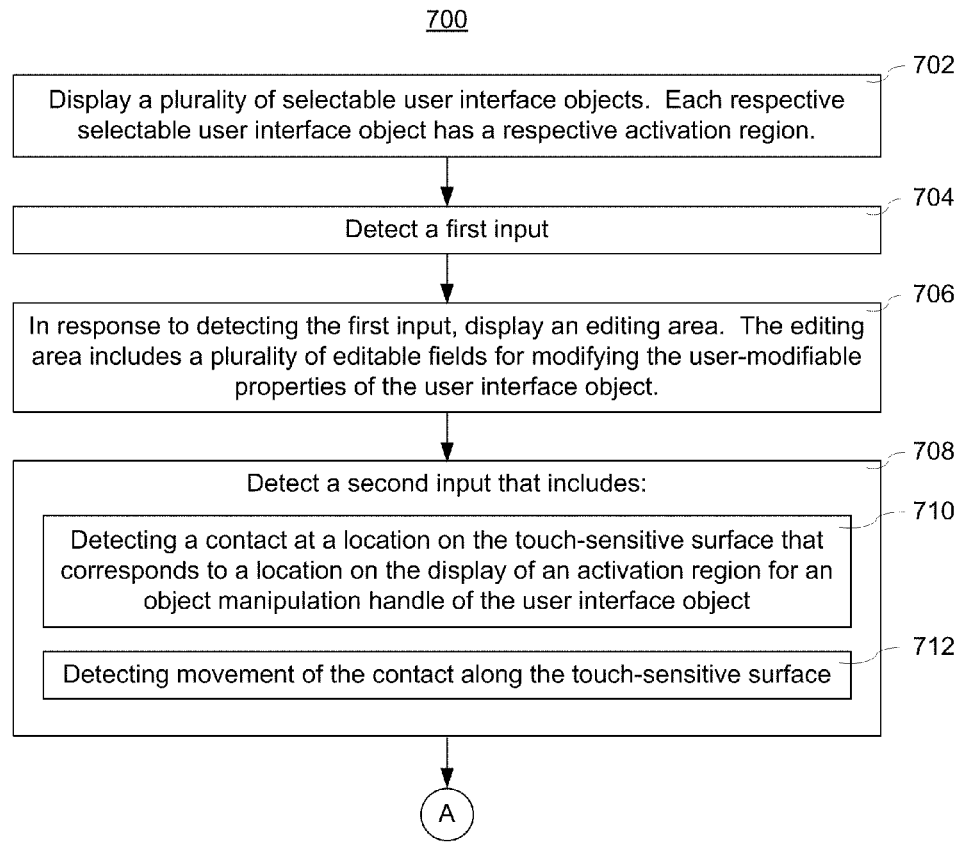
FIGS. 7A-7C are flow diagrams illustrating a method of modifying user-modifiable properties of a user interface object in accordance with some embodiments in accordance with some embodiments.
Figure 7B:
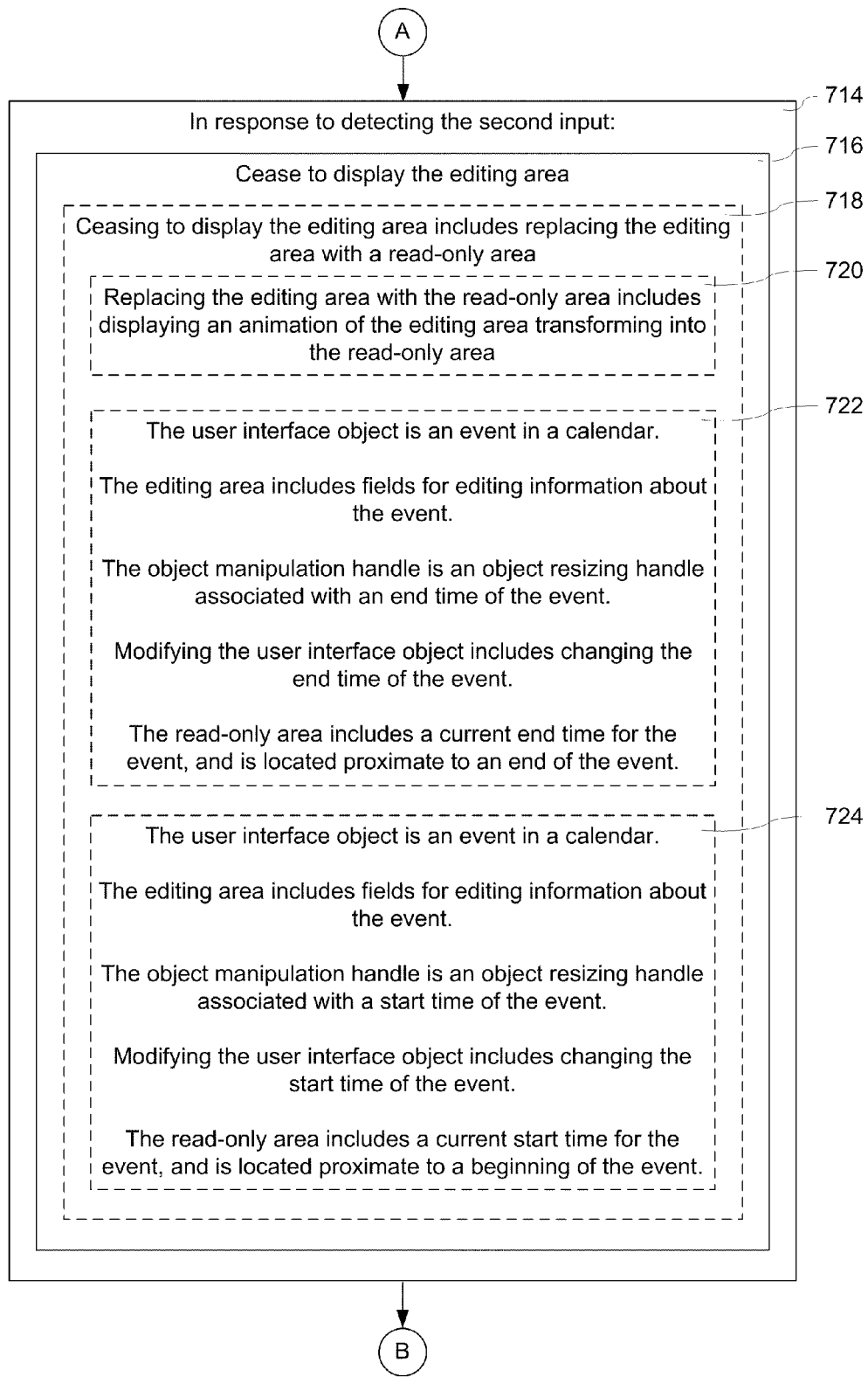
Figure 7C:
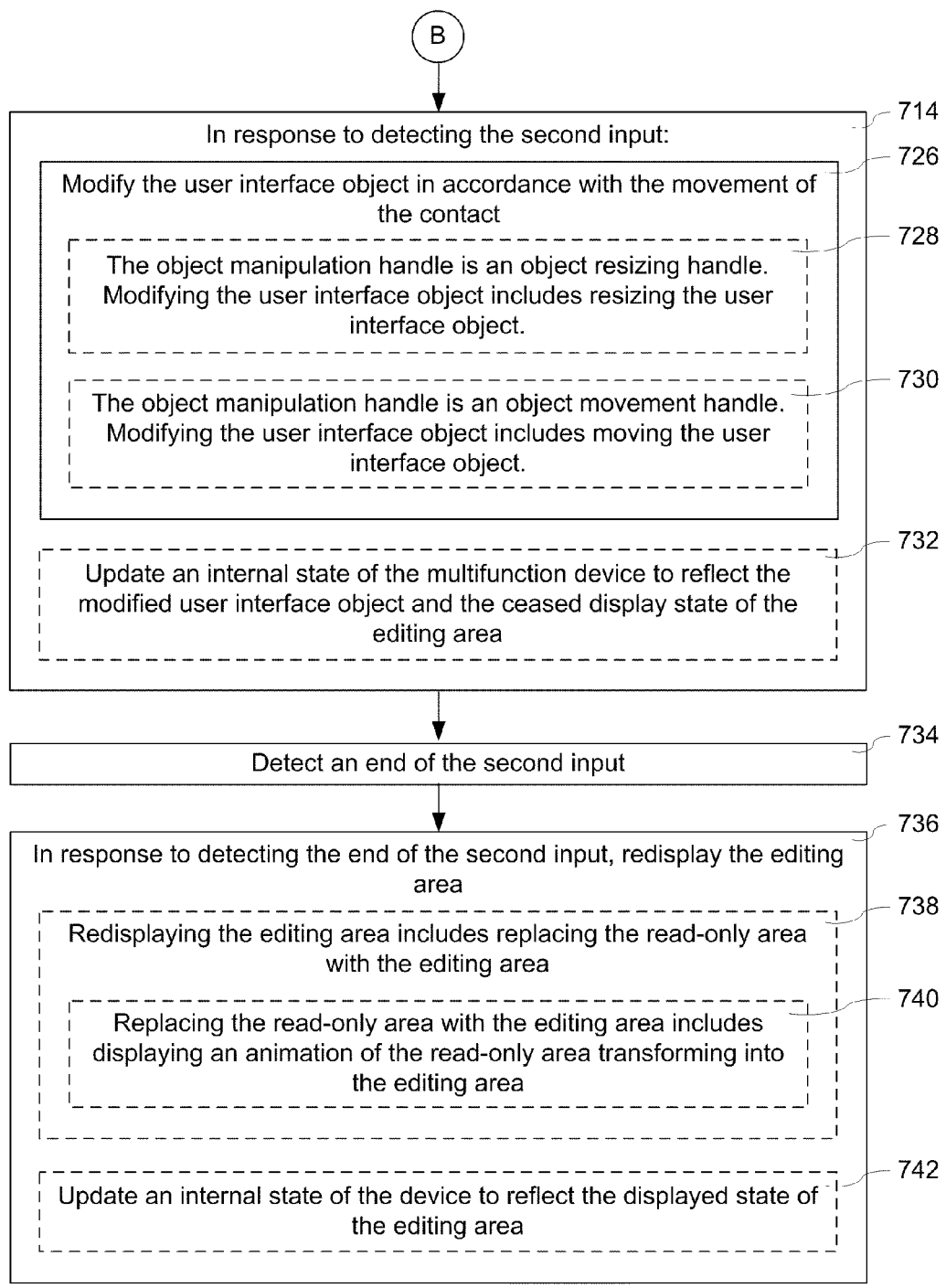

FIGS. 7A-7C are flow diagrams illustrating a method 700 of modifying user-modifiable properties of a user interface object in accordance with some embodiments. The method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 700 may be combined and/or the order of some operations may be changed.

As described below, the method 700 provides an intuitive way to modify user-modifiable properties of a user interface object. The method reduces the cognitive burden on a user when modifying user-modifiable properties of a user interface object, thereby creating a more efficient human-machine interface. For battery-operated computing devices, enabling a user to modify user-modifiable properties of a user interface object faster and more efficiently conserves power and increases the time between battery charges.

The device displays (702) a user interface object having a position on the display and a plurality of user-modifiable properties. The device detects (704) a first input (e.g., tap gesture 5044 on an event 5024-5 in FIG. 5P, a circling gesture around an event, or selecting another representation of the event from a list of events such as a list of search results including a result associated with the event). In response to detecting the first input, the device display (706) an editing area (e.g., a popup view 5050-a in FIG. 5U, window, pane, or other predefined area). The editing area (e.g., 5050-a in FIG. 5U) includes a plurality of editable fields (e.g., 5052 in FIG. 5U) for modifying the user-modifiable properties (e.g., date, time, location, notes, repetitions, alerts, etc.) of the user interface object (e.g., "Event 5" 5024-5 in FIG. 5U). In some embodiments, the editing area is displayed adjacent to the user interface object (e.g., editing area 5052 is displayed adjacent to 5024-5 as illustrate in FIG. 5U). In some embodiments, the user interface object is displayed along with one or more object manipulation handles (e.g., 5054-1 and 5054-2 in FIGS. 5U-5Z)

The device detects (708) a second input. The second input includes detecting (710) a contact (e.g., 5056-a in FIG. 5V) at a location on the touch-sensitive surface (e.g., touch screen 112) that corresponds to a location on the display of an activation region for an object manipulation handle (e.g., 5054-1 in FIG. 5V) of the user interface object (e.g., 5024-5 in FIG. 5V). The second input includes (712) detecting movement of the contact along the touch-sensitive surface (e.g., movement of the contact 5056 from a first location 5056-a on the touch screen 112 that corresponds to the activation region of the object manipulation handle 5041-1 to in FIGS. 5V-5W to a second location 5056-b on the touch screen 112 in FIG. 5X).

Operations 716-732 are performed in response to detecting (714) the second input. The device ceases (716) to display the editing area. In some embodiments, ceasing (718) to display the editing area includes replacing the editing area with a read-only area (e.g., a non-editable popup view, window, pane, or other predefined area, which is typically much smaller than the editing area). For example in FIG. 5U, before the second input is detected, the device displays the editing area 5050-*a*, while in FIG. 5X, after detecting the second input, the device displays a non-editable popup view 5058. In some embodiments, the read-only area displays just a subset (e.g., one or two) properties of the user interface object. For example, when the user interface object is an event in a calendar (e.g., "Event 5" 5024-5 in FIG. 5X), the read-only area may include just the end time or the start time of the event (e.g., in FIG. 5X, the read-only area 5058 includes an end time of the calendar event). In some embodiments, the read-only area is displayed adjacent to the user interface object (e.g., as illustrated in FIGS. 5W-5X, the read-only area 5058 is displayed adjacent to user interface object "Event 5"5024-5).

It should be understood that automatically ceasing to display the editing area when the device detects an input for performing a user interface object manipulation operation is advantageous because it removes unnecessary elements from the user interface, thereby displaying more of the relevant features of the user interface. For example, when a user is adjusting an end time of an event by selecting an end of a graphical representation of the event and dragging the end of the graphical representation of the event, there is no need to display the editing area, because the user is not using the editing area to modify user-modifiable properties of the event. Moreover displaying the editing area obscures other events and time markings in the calendar user interface. Thus, by ceasing to display the editing area, the user is able to more quickly and efficiently adjust the user interface object (e.g., the graphical representation of an event). Moreover, by redisplaying the editing area after the device detects an end to the input (e.g., only temporarily hiding the editing area), the device enables the user to continue editing the user interface object via the editing area without interruption, while still maintaining the benefits of revealing useful context by automatically ceasing to display the editing area as described above.

In some embodiments, replacing (720) the editing area with the read-only area includes displaying an animation of the editing area transforming into the read-only area. For example, in FIGS. 5U-5V, the device displays the editing area 5050-*a* shrinking from its original size in FIG. 5U to a reduced size 5050-*b* in FIG. 5V, and ultimately being replaced with the read-only area 5058 in FIG. 5W.

In some embodiments, the user interface object is an event in a calendar (e.g., "Event 5" 5024-5 in FIGS. 5U-5BB), the editing area (e.g., 5050-*a* in FIG. 5U) includes fields (e.g., 5052 in FIG. 5U) for editing information about the event, the object manipulation handle (e.g., 5054-1 in FIG. 5V) is an object resizing handle associated with an end time (e.g., noon) of the event, modifying the user interface object includes changing the end time of the event, and the read-only area (e.g., 5058 in FIGS. 5W-5X) includes (722) a current end time for the event, and is located proximate to an end of the event. For example, in FIGS. 5W-5X, in response to detecting the second input, the device changes the end time of the event from noon in FIG. 5W to 2:15 pm in FIG. 5X, and changes the time that is displayed in the read-only area from noon in FIG. 5W to 2:15 pm in FIG. 5X.

In some embodiments, the user interface object is an event in a calendar, the editing area includes fields for editing information about the event, the object manipulation handle is an object resizing handle associated with a start time of the event, modifying the user interface object includes changing the start time of the event, and the read-only area includes (724) a current start time for the event, and is located proximate to a beginning of the event. In other words, in some embodiments, instead of indicating a current end time of the event, the read-only area indicates a current start time of the event (e.g., when the second input includes manipulating a handle that is associated with a current start time of the event, the read-only area includes the current start time of the event).

The device modifies (726) the user interface object in accordance with the movement of the contact. In some embodiments, the object manipulation handle is an object resizing handle and modifying the user interface object includes resizing (728) the user interface object. For example, in FIG. 5W, before the second input is detected, "Event 5" 5024-5 is displayed at a first size, and in FIG. 5X, after detecting the second input "Event 5" 5024-5 is displayed at a second size that is larger than the first size. In some embodiments, the object manipulation handle is an object movement handle and modifying the user interface object includes moving (730) the user interface object, as described in greater detail below with reference to FIGS. 5Z-5BB.

In some embodiments, in response to detecting the second input (e.g., movement of the contact 5056 from a first location 5056-*a* on the touch screen 112 that corresponds to the activation region of the object manipulation handle 5041-1 to in FIGS. 5V-5W to a second location 5056-*b* on the touch screen 112 in FIG. 5X), the device updates (732) an internal state of the multifunction device 300 to reflect the modified user interface object and the ceased display state of the editing area.

The device detects (734) an end of the second input (e.g., detecting lift-off of the contact 5056-*b* in FIG. 5X). In response to detecting the end of the second input, the device redisplays (736) the editing area (e.g., 5050 in FIGS. 5Y-5Z). In some embodiments, redisplaying the editing area includes replacing (738) the read-only area (e.g., 5058 in FIG. 5X) with the editing area (e.g., 5050 in FIGS. 5Y-5Z). In some embodiments, replacing the read-only area with the editing area includes displaying (740) an animation of the read-only area transforming into the editing area. For example, in FIG. 5X, before an end of the second input is detected, a read-only area 5058 including an indication of an end time for the event is displayed, and in FIG. 5Y, after detecting an end of the second input, the device displays an animation of the read-only area 5058 in FIG. 5X transforming into the editing area (e.g., 5050-*b* in FIG. 5Y and 5050-*a* in FIG. 5Z).

It should be understood that displaying a read-only area while the device is detecting the input for modifying the user interface object is advantageous in some embodiments, because the read-only area can include details that would otherwise be obscured (e.g., by the finger(s) and/or hand(s) of the user, or by other user interface objects). For example, the user may want to precisely select an end time for an event, and therefore the read-only area can be used to display the precise end time for the event that is currently selected, even if a finger of the user is obscuring the standard calendar markings on the display. In other words, displaying the read-only area improves the speed and accuracy of the user when manipulating user interface objects, which improves the efficiency of the machine-user interface, thereby improving the energy efficiency and battery life of the device.

In some embodiments, in response to detecting the end of the second input (e.g., detecting lift-off of the contact 5056-*b* in FIG. 5X), the device updates (742) an internal state of the multifunction device 300 to reflect the displayed state of the editing area.

In some embodiments, the device detects a third input. The third input includes detecting a contact (e.g., 5056-*a* in FIG.

5Z) at a location on the touch-sensitive surface (e.g., touch screen 112) that corresponds to a location on the display of an activation region for an object manipulation handle (e.g., the center of "Event 5" 5024-5 in FIG. 5Z) of the user interface object (e.g., 5024-5 in FIG. 5Z). The third input includes detecting movement of the contact along the touch-sensitive surface (e.g., movement of the contact 5060 from a first location 5060-*a* on the touch screen 112 that corresponds to the activation region of the object manipulation handle in FIG. 5Z to a second location 5060-*b* on the touch screen 112 in FIG. 5AA).

In response to detecting the third input, the device ceases to display the editing area (e.g., in FIG. 5Z, before the second input has been detected, the editing area 5050-*a* is displayed, while in FIG. 5AA, after detecting the second input, the editing area is no longer displayed). In some embodiments, ceasing to display the editing area includes replacing the editing area with a read-only area (e.g., a non-editable popup view, window, pane, or other predefined area, which is typically much smaller than the editing area). In some embodiments, no read-only area is displayed when the editing area ceases to be displayed (e.g., as illustrated in FIGS. 5Z-5AA). In these embodiments, the device detects an end of the second input (e.g., detecting lift-off of the contact 5060-*b* in FIG. 5AA). In response to detecting the end of the second input, the device redisplays the editing area (e.g., 5050-*a* in FIG. 5BB).

The operations described above with reference to FIGS. 6A-6, and 7A-7C may be implemented by components depicted in FIGS. 1A-1C. For example, displaying operation 602, detecting operation 612, and selecting operation 616 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates event handler 180 associated with the detection of the event or sub-event. Event handler 180 may utilize or call data updater 176 or object updater 177 to update the internal state of application 136-1 data. In some embodiments, event handler 180 accesses respective GUI updater 178 to update what is displayed by the application. Similarly, it would be clear to a person having ordinary skill in the art how other processes can be implemented based on the components depicted in FIGS. 1A-1C.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

The foregoing description, for purpose of explanation, has been described with reference to specific embodiments. However, the illustrative discussions above are not intended to be exhaustive or to limit the invention to the precise forms disclosed. Indeed, as noted above, while calendar events are used as exemplary objects, the processes disclosed herein are applicable to virtually any user interface objects that can be manipulated (e.g., selected and/or edited) by a user. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A multifunction device, comprising:
a display and a touch-sensitive surface;
one or more processors;
memory; and
one or more programs, wherein the one or more programs are stored in the memory and configured to be executed by the one or more processors, the one or more programs including instructions for:
displaying a user interface object having a position on the display and a plurality of user-modifiable properties;
detecting a first input;
in response to detecting the first input, displaying an editing area, wherein the editing area includes a plurality of editable fields for modifying the user-modifiable properties of the user interface object;
detecting a second input that includes:
detecting a contact at a location on the touch-sensitive surface that corresponds to a location on the display of an activation region for an object manipulation handle of the user interface object, and
detecting movement of the contact along the touch-sensitive surface;
in response to detecting the second input that includes detecting the contact at the location on the touch-sensitive surface that corresponds to the location on the display of the activation region for the object manipulation handle of the user interface object and detecting the movement of the contact along the touch-sensitive surface:
ceasing to display the editing area; and
modifying the user interface object in accordance with the movement of the contact;
detecting an end of the second input; and
in response to detecting the end of the second input, redisplaying the editing area.

2. The device of claim 1, wherein the object manipulation handle is an object resizing handle and modifying the user interface object includes resizing the user interface object.

3. The device of claim 1, wherein the object manipulation handle is an object movement handle and modifying the user interface object includes moving the user interface object.

4. The device of claim 1, wherein:
ceasing to display the editing area includes replacing the editing area with a read-only area; and
redisplaying the editing area includes replacing the read-only area with the editing area.

5. The device of claim 4, wherein:
the user interface object is an event in a calendar;
the editing area includes fields for editing information about the event;
the object manipulation handle is an object resizing handle associated with an end time of the event;
modifying the user interface object includes changing the end time of the event; and,
the read-only area includes a current end time for the event, and is located proximate to an end of the event.

6. The device of claim 4, wherein:
the user interface object is an event in a calendar;

the editing area includes fields for editing information about the event;
the object manipulation handle is an object resizing handle associated with a start time of the event; and,
modifying the user interface object includes changing the start time of the event; and,
the read-only area includes a current start time for the event, and is located proximate to a beginning of the event.

7. The device of claim 4, wherein replacing the editing area with the read-only area includes displaying an animation of the editing area transforming into the read-only area.

8. The device of claim 4, wherein replacing the read-only area with the editing area includes displaying an animation of the read-only area transforming into the editing area.

9. The device of claim 1, including instructions for:
in response to detecting the second input, updating an internal state of the multifunction device to reflect the modified user interface object and the ceased display state of the editing area.

10. The device of claim 1, including instructions for:
in response to detecting the end of the second input, updating an internal state of the device to reflect the displayed state of the editing area.

11. A method, comprising:
at a multifunction device with a display and a touch-sensitive surface:
displaying a user interface object having a position on the display and a plurality of user-modifiable properties;
detecting a first input;
in response to detecting the first input, displaying an editing area, wherein the editing area includes a plurality of editable fields for modifying the user-modifiable properties of the user interface object;
detecting a second input that includes:
detecting a contact at a location on the touch-sensitive surface that corresponds to a location on the display of an activation region for an object manipulation handle of the user interface object, and
detecting movement of the contact along the touch-sensitive surface;
in response to detecting the second input that includes detecting the contact at the location on the touch-sensitive surface that corresponds to the location on the display of the activation region for the object manipulation handle of the user interface object and detecting the movement of the contact along the touch-sensitive surface:
ceasing to display the editing area; and
modifying the user interface object in accordance with the movement of the contact;
detecting an end of the second input; and
in response to detecting the end of the second input, redisplaying the editing area.

12. A computer readable storage medium storing one or more programs, the one or more programs comprising instructions, which when executed by a multifunction device with a display and a touch-sensitive surface, cause the device to:
display a user interface object having a position on the display and a plurality of user-modifiable properties;
detect a first input;
in response to detecting the first input, display an editing area, wherein the editing area includes a plurality of editable fields for modifying the user-modifiable properties of the user interface object;
detect a second input that includes:
detecting a contact at a location on the touch-sensitive surface that corresponds to a location on the display of an activation region for an object manipulation handle of the user interface object, and
detecting movement of the contact along the touch-sensitive surface;
in response to detecting the second input that includes detecting the contact at the location on the touch-sensitive surface that corresponds to the location on the display of the activation region for the object manipulation handle of the user interface object and detecting the movement of the contact along the touch-sensitive surface:
cease to display the editing area; and
modify the user interface object in accordance with the movement of the contact;
detect an end of the second input; and
in response to detecting the end of the second input, redisplay the editing area.

13. The device of claim 1, wherein:
ceasing to display the editing area includes replacing the editing area with a read-only area, wherein replacing the editing area with the read-only area includes displaying an animation of the editing area transforming into the read-only area; and
redisplaying the editing area includes replacing the read-only area with the editing area, wherein replacing the read-only area with the editing area includes displaying an animation of the read-only area transforming into the editing area.

14. The method of claim 11, wherein the object manipulation handle is an object resizing handle and modifying the user interface object includes resizing the user interface object.

15. The method of claim 11, wherein the object manipulation handle is an object movement handle and modifying the user interface object includes moving the user interface object.

16. The method of claim 11, wherein:
ceasing to display the editing area includes replacing the editing area with a read-only area; and
redisplaying the editing area includes replacing the read-only area with the editing area.

17. The method of claim 16, wherein:
the user interface object is an event in a calendar;
the editing area includes fields for editing information about the event;
the object manipulation handle is an object resizing handle associated with an end time of the event;
modifying the user interface object includes changing the end time of the event; and,
the read-only area includes a current end time for the event, and is located proximate to an end of the event.

18. The method of claim 16, wherein:
the user interface object is an event in a calendar;
the editing area includes fields for editing information about the event;
the object manipulation handle is an object resizing handle associated with a start time of the event; and,
modifying the user interface object includes changing the start time of the event; and,
the read-only area includes a current start time for the event, and is located proximate to a beginning of the event.

19. The method of claim 16, wherein replacing the editing area with the read-only area includes displaying an animation of the editing area transforming into the read-only area.

20. The method of claim 16, wherein replacing the read-only area with the editing area includes displaying an animation of the read-only area transforming into the editing area.

21. The method of claim 11, including:
in response to detecting the second input, updating an internal state of the multifunction device to reflect the modified user interface object and the ceased display state of the editing area.

22. The method of claim 11, including:
in response to detecting the end of the second input, updating an internal state of the device to reflect the displayed state of the editing area.

23. The method of claim 11, wherein:
ceasing to display the editing area includes replacing the editing area with a read-only area, wherein replacing the editing area with the read-only area includes displaying an animation of the editing area transforming into the read-only area; and
redisplaying the editing area includes replacing the read-only area with the editing area, wherein replacing the read-only area with the editing area includes displaying an animation of the read-only area transforming into the editing area.

24. The computer readable storage medium of claim 12, wherein the object manipulation handle is an object resizing handle and modifying the user interface object includes resizing the user interface object.

25. The computer readable storage medium of claim 12, wherein the object manipulation handle is an object movement handle and modifying the user interface object includes moving the user interface object.

26. The computer readable storage medium of claim 12, wherein:
ceasing to display the editing area includes replacing the editing area with a read-only area; and
redisplaying the editing area includes replacing the read-only area with the editing area.

27. The computer readable storage medium of claim 26, wherein:
the user interface object is an event in a calendar;
the editing area includes fields for editing information about the event;
the object manipulation handle is an object resizing handle associated with an end time of the event;
modifying the user interface object includes changing the end time of the event; and,
the read-only area includes a current end time for the event, and is located proximate to an end of the event.

28. The computer readable storage medium of claim 26, wherein:
the user interface object is an event in a calendar;
the editing area includes fields for editing information about the event;
the object manipulation handle is an object resizing handle associated with a start time of the event; and,
modifying the user interface object includes changing the start time of the event; and,
the read-only area includes a current start time for the event, and is located proximate to a beginning of the event.

29. The computer readable storage medium of claim 26, wherein replacing the editing area with the read-only area includes displaying an animation of the editing area transforming into the read-only area.

30. The computer readable storage medium of claim 26, wherein replacing the read-only area with the editing area includes displaying an animation of the read-only area transforming into the editing area.

31. The computer readable storage medium of claim 12, including instructions which, when executed by the multifunction device, cause the device to:
in response to detecting the second input, update an internal state of the multifunction device to reflect the modified user interface object and the ceased display state of the editing area.

32. The computer readable storage medium of claim 12, including instructions which, when executed by the multifunction device, cause the device to:
in response to detecting the end of the second input, update an internal state of the device to reflect the displayed state of the editing area.

33. The computer readable storage medium of claim 12, wherein:
ceasing to display the editing area includes replacing the editing area with a read-only area, wherein replacing the editing area with the read-only area includes displaying an animation of the editing area transforming into the read-only area; and
redisplaying the editing area includes replacing the read-only area with the editing area, wherein replacing the read-only area with the editing area includes displaying an animation of the read-only area transforming into the editing area.

* * * * *